United States Patent
Zhang et al.

(10) Patent No.: US 11,799,370 B2
(45) Date of Patent: Oct. 24, 2023

(54) DC-DC RESONANT CONVERTER AND CONTROL METHOD THEREOF

(71) Applicant: Delta Electronics, Inc., Taipei (TW)

(72) Inventors: Chi Zhang, Apex, NC (US); Zhiyu Shen, Cary, NC (US); Ruxi Wang, Cary, NC (US); Peter Mantovanelli Barbosa, Cary, NC (US)

(73) Assignee: DELTA ELECTRONICS, INC., Taipei (TW)

( * ) Notice: Subject to any disclaimer, the term of this patent is extended or adjusted under 35 U.S.C. 154(b) by 0 days.

(21) Appl. No.: 17/363,129

(22) Filed: Jun. 30, 2021

(65) Prior Publication Data

US 2021/0408927 A1    Dec. 30, 2021

Related U.S. Application Data

(60) Provisional application No. 63/046,158, filed on Jun. 30, 2020.

(51) Int. Cl.
  *H02M 1/00* (2006.01)
  *H02M 3/00* (2006.01)
  *H02M 3/335* (2006.01)

(52) U.S. Cl.
  CPC .......... *H02M 1/0074* (2021.05); *H02M 3/01* (2021.05); *H02M 3/33571* (2021.05);
  (Continued)

(58) Field of Classification Search
  CPC .. H02M 3/33573; H02M 1/0058; H02M 3/01; H02M 3/33592; H02M 1/0009;
  (Continued)

(56) References Cited

U.S. PATENT DOCUMENTS 6,091,049 A    7/2000   Ikeda et al.
6,137,234 A   10/2000   Willaert et al.
(Continued)

FOREIGN PATENT DOCUMENTS

CN    102625548 A    8/2012
CN    105897000 A    8/2016
(Continued)

OTHER PUBLICATIONS

See attached translated version of foreign patent Chen Wu et al. CN111082665 published on Apr. 28, 2020. (Year: 2020).*
(Continued)

*Primary Examiner* — Shawki S Ismail
*Assistant Examiner* — Htet Z Kyaw
(74) *Attorney, Agent, or Firm* — KIRTON McCONKIE; Evan R. Witt

(57) ABSTRACT

The present disclosure provides a series resonant converter and its corresponding control method. In one aspect, the series resonant converter includes m (m=1,2,3, . . . ) sets of primary side stages in parallel, wherein each primary side stage is identical and includes n (n=2,3, . . . ) stacked element circuits, where the primary side stages receive an input voltage; n×m resonant networks coupled to the primary side stages; n×m transformers having n×m primary side windings and n×m secondary side windings, where the primary side windings are coupled to the n×m resonant networks; p (p=1,2,3, . . . ) sets of secondary side stages in parallel, wherein each secondary side stage is identical and includes q (q=n×m/p) stacked element circuits, where the secondary side stages are coupled to n×m secondary side windings; and a control block controlling the primary side switches according to the output voltage, input voltage and input capacitor voltages.

28 Claims, 50 Drawing Sheets

(52) U.S. Cl.
CPC ...... *H02M 3/33592* (2013.01); *H02M 1/0058* (2021.05); *H02M 3/33573* (2021.05)

(58) Field of Classification Search
CPC ........... H02M 1/0074; H02M 3/33571; H02M 3/33584; H02M 3/33569; H02M 7/06; H02M 7/53871; Y02B 70/10; Y02P 80/10
See application file for complete search history.

(56) References Cited

U.S. PATENT DOCUMENTS

| | | |
|---|---|---|
| 6,297,616 B1 | 10/2001 | Kubo et al. |
| 6,344,979 B1 | 2/2002 | Huang et al. |
| 7,518,886 B1 | 4/2009 | Lai et al. |
| 8,842,448 B2 | 9/2014 | Ye et al. |
| 9,148,064 B2 | 9/2015 | Liu et al. |
| 9,520,798 B2 | 12/2016 | Raju et al. |
| 9,935,462 B2 | 4/2018 | Li |
| 10,199,947 B2 | 2/2019 | Ye et al. |
| 10,224,827 B1 | 3/2019 | Zhu et al. |
| 10,283,261 B2 | 5/2019 | Jin et al. |
| 10,491,123 B2 | 11/2019 | Wang et al. |
| 11,088,625 B1* | 8/2021 | Cao .................... H02M 3/33584 |
| 2012/0262953 A1* | 10/2012 | Jungreis ............ H02M 3/33571 363/21.02 |
| 2013/0343089 A1 | 12/2013 | Gupta et al. |
| 2016/0065081 A1 | 3/2016 | Raju et al. |
| 2017/0085183 A1* | 3/2017 | Notsch ..................... H02M 1/44 |
| 2017/0207712 A1* | 7/2017 | Chiang ................... H02M 1/14 |
| 2018/0054130 A1 | 2/2018 | Moon et al. |
| 2018/0205238 A1* | 7/2018 | Uno ..................... H02M 7/5387 |
| 2018/0269795 A1* | 9/2018 | Zhou .................... H02M 7/4826 |
| 2019/0288607 A1 | 9/2019 | Zong et al. |
| 2020/0321878 A1* | 10/2020 | Zhang ................... H02M 7/483 |
| 2021/0067048 A1* | 3/2021 | Zhang ...................... H02J 7/007 |
| 2021/0126550 A1* | 4/2021 | Yenduri .............. H02M 7/2173 |

FOREIGN PATENT DOCUMENTS

| | | | | |
|---|---|---|---|---|
| CN | 107181413 A | | 9/2017 | |
| CN | 107786107 | * | 2/2018 | .............. H02M 1/14 |
| CN | 108736757 | * | 11/2018 | ................ H02J 3/38 |
| CN | 111082665 | * | 4/2020 | ........... H02M 3/335 |
| EP | 1227571 A2 | | 7/2002 | |
| EP | 2262088 A1 | | 12/2010 | |
| KR | 101464478 B1 | | 11/2014 | |
| TW | 201414147 A | | 4/2014 | |
| TW | I601367 B | | 10/2017 | |
| TW | I683523 B | | 1/2020 | |

OTHER PUBLICATIONS

See attached translated version of foreign patent Shi Zhentang et al. CN107786107. (Year: 2018).*

See attached translated version of foreign patent Wang Zheng CN108736757. (Year: 2018).*

B. Yang, F. C. Lee, A. J. Zhang and G. Huang, "LLC resonant converter for front end DC/DC conversion," in APEC. Seventeenth Annual IEEE Applied Power Electronics Conference and Exposition (Cat. No.02CH37335), Dallas, TX, USA, 2002.

J. R. Pinheiro and I. Barbi, "The three-level ZVS PWM converter-a new concept in high voltage DC-to-DC conversion," in Proceedings of the 1992 International Conference on Industrial Electronics, Control, Instrumentation, and Automation, 1992.

Y. Gu, Z. Lu, L. Hang, Z. Qian and G. Huang, "Three-level LLC series resonant DC/DC converter," IEEE Transactions on Power Electronics, vol. 20, No. 4, pp. 781-789, Jul. 2005.

I. Barbi, R. Gules, R. Redl and N. O. Sokal, "DC-DC converter: four switches V/sub pk/=V/sub in//2, capacitive turn-off snubbing, ZV turn-on," IEEE Transactions on Power Electronics, vol. 19, No. 4, pp. 918-927, Jul. 2004.

T. Jin and K. Smedley, "Multiphase LLC Series Resonant Converter for Microprocessor Voltage Regulation," Conference Record of the 2006 IEEE Industry Applications Conference Forty-First IAS Annual Meeting, Tampa, FL, 2006, pp. 2136-2143.

F. Jin, F. Liu, X. Ruan and X. Meng, "Multi phase multi-level LLC resonant converter with low voltage stress on the primary-side switches," 2014 IEEE Energy Conversion Congress and Exposition (ECCE), Pittsburgh, PA, 2014, pp. 4704-4710.

* cited by examiner

DC-DC RESONANT CONVERTER AND CONTROL METHOD THEREOF

RELATED APPLICATION

This application claims the benefit of priority to U.S. Provisional Application No. 63/046,158, filed Jun. 30, 2020, the entire contents of which are incorporated herein by reference for all purposes.

TECHNICAL FIELD

This present disclosure relates to a DC-DC resonant converter and a control method thereof. More particularly, the present disclosure relates to a stacked-bridge resonant converter with switching frequency control and voltage balancing strategies.

BACKGROUND

The resonant converter, which employ a resonant-tank circuit to shape the switch voltage and/or current waveforms to minimize switching losses and allow high-frequency operation, has been widely employed as an isolated DC/DC converter, due to its high efficiency, simple structure achieved by magnetic integration, soft switching on both primary and secondary switches, and capability suitable for applications with wide voltage ranges.

For example, U.S. Pat. No. 6,344,979 to Huang et al, entitled "LLC Series Resonant DC-to-DC Converter", issued Feb. 5, 2002, discloses an LLC resonant converter and its basic operation principles. FIGS. 1A and 1B respectively show a conventional full-bridge LLC resonant converter under closed-loop voltage control and the timing diagrams of control signals for switches $S_1$ to $S_4$ and a primary-side full-bridge output voltage $V_{AB}$. Output voltage $V_{AB}$ may be regulated by controlling the switching frequency of these primary-side switches. Highest efficiency is attained when the LLC resonant converter operates at resonant frequency $f_r$, determined by resonant inductor $L_r$ and resonant capacitor $C_r$, and when DC voltage gain M equals the transformer's turns ratio $N_P/N_S$. DC voltage gain M diminishes when switching frequency $f_{sw}$ is greater than resonant frequency $f_r$. Conversely, gain M becomes greater when switching frequency $f_{sw}$ is less than resonant frequency $f_r$. Efficiency, however, always diminishes as switching frequency $f_{sw}$ moves away from resonant frequency $f_r$. To achieve desired output voltage range, the LLC resonant converter should operate at its corresponding frequency range.

As shown in FIGS. 1A and 1B, the resonant tank includes inductor $L_r$ and capacitors $C_r$ connected in series, and the circuit can be referred to as a series-resonant converter. If the magnetizing inductance $L_m$ of transformer TR is relatively small, i.e., if it is only several times of resonant inductance $L_r$, the converter can operate as an LLC series-resonant converter. It should be noted that the secondary-side diode rectifier (including diodes $D_1$, $D_2$, $D_3$, and $D_4$) can be implemented by a synchronous rectifier (e.g., using low on-resistance MOSFETs) to improve the efficiency. This implementation also makes the converter bidirectional, because controllable switches on both sides of the transformer allow power to flow in both directions. It should also be noted that the secondary-side of the isolated resonant converter can be implemented with a center-tapped secondary side winding instead of employing a full-wave rectifier as shown in FIG. 1A.

Generally, resonant converters are controlled by variable switching-frequency control. During above-resonant-frequency operations, the resonant converters operate with zero-voltage-switching (ZVS) of the primary switches, while during below-resonant-frequency operations, the resonant converters operate with zero-current switching (ZCS). More details about resonant converter topologies and control thereof can be found in Ref. [1].

Typical timing diagrams of switch-control signals for the series-resonant converter in FIG. 1A operating with ZVS are shown in FIG. 1B. As shown in FIG. 1B, all switches $S_1$, $S_2$, $S_3$, and $S_4$ operate with the same duty ratio of 50%. The primary side switches in the same leg (i.e., switches $S_1$ and $S_2$ in leg A and switches $S_3$ and $S_4$ in leg B) operate in a complementary fashion to avoid cross-conduction. The frequency of the primary side switches is determined by a feedback control loop that is employed to regulate the output. To achieve ZVS in practical implementations, the duty ratios of the primary switches are set to a value slightly less than 50% by introducing a short delay (or dead time) between the turn-off and the turn on of the complementary operated same-leg switches. During this dead time, the current is commutated from the switch of the device that is being turned off to the antiparallel diode of the other device which creates a condition for its subsequent ZVS turn on.

The full bridge structure is normally used in less than 800V DC input voltage applications when 1.2 kV devices are applied. In high input voltage applications, three-level topology in Ref. [2] is more attractive, because of the fact that each switching device needs to block only one half of the input voltage. Three-level topology is applied to LLC converters in Ref. [3], in which the proposed converters achieve ZVS for the switches without additional auxiliary circuit. In Ref. [4], a three-level serial half bridge (SHB) topology, also known as stacked buck topology, is proposed for the first time. This topology removes the two clamping diodes in comparison with the conventional three-level topology from Ref. [2].

FIGS. 2A and 2B respectively illustrate an exemplary serial half bridge resonant converter and its timing diagrams of control signals for switches $S_1$ to $S_4$ and a primary-side full-bridge output voltage $V_{AB}$. The serial half bridge resonant converter is also controlled by variable switching-frequency control. As shown in FIG. 2A, all switches $S_1$, $S_2$, $S_3$, and $S_4$ operate operate with the same duty ratio of 50%. The primary side switches in the same leg (i.e., switches $S_1$ and $S_2$ in leg A and switches $S_3$ and $S_4$ in leg B) operate in a complementary fashion to avoid cross-conduction. Switches $S_1$ and $S_4$ have the same switch control signals, while switches $S_2$ and $S_3$ have the same switch control signals. The frequency of the primary side switches is determined by a feedback control loop that is employed to regulate the output.

Generally, the power of a full bridge resonant converter based on a discrete device is limited to a few kilowatts because of the device's power rating. A three-phase LLC resonant converter is proposed in Ref. [5] to further increase the converter power by adding another half bridge phase leg in parallel to the existing legs on the primary side and another half bridge phase leg in parallel to the existing legs on the secondary side. The three-phase converter can have either three separated transformers or a single integrated transformer. The topology of a typical three phase LLC converter and its timing diagrams of switch-control are shown in FIGS. 3A and 3B. The switch-control signals of each primary half bridge are usually interleaved with each other with a 120-degree phase shift. This implementation can reduce the current and voltage ripple, thus reducing the stress on the components.

Recently, high input voltage (>2 kV) power supplies are more and more attractive in high power applications, such as a solid-stage-transformer, because they can deliver more power for the same amount of input current. A multi-phase multi-level LLC resonant converter with a star connection of transformers is proposed in Ref. [6] to satisfy the requirement for high-voltage and high-power applications. The topology of a multi-phase multi-level LLC resonant converter with three modules and its timing diagrams of switch-control shown in FIGS. 4A and 4B. The switch-control signals of each primary side half bridge are usually interleaved with each other with a 120-degree phase shift. However, the resonant capacitors in each phase leg suffer DC voltage bias due to the stacking structure and the star connection of the transformers. The bias voltage further increases when the input voltage increases. In addition, the voltage imbalance issue of the stacked capacitors and the bidirectional operation are not addressed in Ref. [6]. Therefore, there is a need to develop a DC/DC bidirectional resonant converter that is capable of operating in high input voltage and high-power applications, as well as reserving the merit of conventional resonant converters. There is also a need to develop a voltage balancing control strategy applied in multi-phase multi-level LLC resonant converters.

REFERENCES

[1] B. Yang, F. C. Lee, A. J. Zhang and G. Huang, "LLC resonant converter for front end DC/DC conversion," APEC. Seventeenth Annual IEEE Applied Power Electronics Conference and Exposition (Cat. No. 02CH37335), Dallas, Tex., USA, 2002.
[2] J. R. Pinheiro and I. Barbi, "The three-level ZVS PWM converter-a new concept in high voltage DC-to-DC conversion," Proceedings of the 1992 International Conference on Industrial Electronics, Control, Instrumentation, and Automation, 1992.
[3] Y. Gu, Z. Lu, L. Hang, Z. Qian and G. Huang, "Three-level LLC series resonant DC/DC converter," IEEE Transactions on Power Electronics, vol. 20, no. 4, pp. 781-789, July 2005.
[4] I. Barbi, R. Gules, R. Redl and N. O. Sokal, "DC-DC converter: four switches V/sub pk/=V/sub in//2, capacitive turn-off snubbing, ZV turn-on," IEEE Transactions on Power Electronics, vol. 19, no. 4, pp. 918-927, July 2004.
[5] T. Jin and K. Smedley, "Multiphase LLC Series Resonant Converter for Microprocessor Voltage Regulation," Conference Record of the 2006 IEEE Industry Applications Conference Forty-First IAS Annual Meeting, Tampa, Fla., 2006, pp. 2136-2143.
[6] F. Jin, F. Liu, X. Ruan and X. Meng, "Multi-phase multi-level LLC resonant converter with low voltage stress on the primary-side switches," 2014 IEEE Energy Conversion Congress and Exposition (ECCE), Pittsburgh, Pa., 2014, pp. 4704-4710.

SUMMARY

In one embodiment of the present disclosure, a DC-DC resonant converter with improved performance is disclosed. Specifically, the resonant converter of the embodiment of the present disclosure can be used in high power and high voltage applications by stacking a plurality of circuit elements in series.

In one aspect, one embodiment of the present disclosure provides a DC-DC converter including: a primary side including a serial stack of at least two half-bridge inverter cells, each including two active switches in series in one leg and an input capacitor in a parallel leg together forming a loop wherein each inverter cell is connected from a point between the switches to a resonant tank circuit to a primary side winding wound on a transformer core, and through the other end of the winding to a common star connection of the corresponding ends of all the inverter cells, wherein one end of the loop connecting the legs of one inverter cell is directly connected to the opposite end of the corresponding loop in an inverter cell on which it is stacked and a primary side voltage is applied or produced between the two ends of the loops of the serial stack of inverter cells that are not directly connected to another inverter cell and wherein the transformer core is sharable with other inverter cells; a secondary side including at least two sets of rectifier circuit elements each coupled to a secondary side winding wound on a transformer core shared with a corresponding primary side winding and is configured to rectify current induced at the secondary stage by current flowing in the corresponding primary side winding, and wherein a secondary side voltage is produced or applied; and control circuitry that activates switches in the converter to vary the pulse frequency or width or phase shift angle of voltage or current through the inverter cells or rectifier circuit elements.

In one embodiment, the rectifier circuit elements are each a half-bridge rectifier cell including in a leg two diodes in series and oriented in the same direction between which is a connection to the corresponding secondary side winding to a common star connection of the corresponding ends of all the rectifier cells, wherein corresponding ends of the diode legs form common connections with a parallel capacitor legs such that the secondary side voltage is produced between the two ends of the parallel legs.

In one embodiment, the rectifier circuit elements are each an active half-bridge rectifier cell including in a leg two active switches in series, each controlled by the control circuitry, between which switches is a connection to the corresponding secondary side winding to a common star connection of the corresponding ends of all the rectifier cells, wherein corresponding ends of the switch legs form common connections with a parallel capacitor leg such that the secondary side voltage is produced or applied between the two ends of the parallel legs.

In one embodiment, the rectifier circuit elements are each a full-bridge rectifier cell including two parallel legs of two diodes in series oriented in the same direction wherein each rectifier cell is connected from a point between the diodes of one leg to one end of the corresponding secondary side winding wound on the transformer core and through the other end of the winding to a point between the diodes of the other leg, wherein corresponding ends of the diode legs form common connections with a parallel capacitor leg such that the secondary side voltage is produced between the two ends of the parallel legs.

In one embodiment, the rectifier circuit elements are each a full-bridge rectifier cell including two parallel legs of two active switches in series, each controlled by the control circuitry, between which switches in a leg is a connection to one end of the corresponding secondary side winding wound on the transformer core and through the other end of the winding to a point between the switches of the other leg, wherein corresponding ends of the switch legs form common connections with a parallel capacitor leg such that the secondary side voltage is produced or applied between the two ends of the parallel legs.

In one embodiment, the rectifier circuit elements form a serial stack of half-bridge rectifier cells, each including two diodes in series oriented in the same direction in one leg and two capacitors in series in a parallel leg together forming a loop wherein each rectifier cell is connected from a point between the diodes to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier on which it is stacked and a secondary side voltage is produced between the two ends of the loops of the secondary stack of rectifier cells that are not directly connected to another rectifier cell.

In one embodiment, the rectifier circuit elements form a serial stack of half-bridge rectifier cells, each including two active switches in series in one leg, each controlled by the control circuitry, and two capacitors in series in a parallel leg together forming a loop wherein each rectifier cell is connected from a point between the switches to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier cell on which it is stacked and a secondary side voltage is produced or applied between the two ends of the loops of the secondary stack of rectifier cells that are not directly connected to another rectifier cell.

In one embodiment, the rectifier circuit elements form a serial stack of half-bridge rectifier cells, each including two diodes in series oriented in the same direction in one leg and a capacitor in a parallel leg together forming a loop wherein each rectifier cell is connected from a point between the diodes through a blocking capacitor to one end of the corresponding secondary side winding wound on the transformer core and through the other end of the winding to a common star connection of the corresponding ends of all the rectifier cells, wherein one end of the loop connecting the parallel legs of one rectifier cell is directly connected to the opposite end of the corresponding loop in a rectifier cell on which it is stacked and a secondary side voltage is produced between the two ends of the loops of the secondary stack of rectifier cells that are not directly connected to another rectifier cell.

In one embodiment, the rectifier circuit elements form a serial stack of half-bridge rectifier cells, each including two active switches in series in one leg, each controlled by the control circuitry, and a capacitors in a parallel leg together forming a loop wherein each rectifier cell is connected from a point between the switches through a blocking capacitor to one end of the corresponding secondary side winding wound on the transformer core and through the other end of the winding to a common star connection of the corresponding ends of all the rectifier cells, wherein one end of the loop connecting the parallel legs of one rectifier cell is directly connected to the opposite end of the corresponding loop in a rectifier cell on which it is stacked and a secondary side voltage is produced or applied between the two ends of the loops of the secondary stack of rectifier cells that are not directly connected to another rectifier cell.

In one embodiment, the rectifier circuit elements form a serial stack of full-bridge rectifier cells, each including two legs of two diodes in series oriented in the same direction and a capacitor leg in parallel connected at each end of the respective legs wherein each rectifier cell is connected from a point between the diodes of one leg to one end of the corresponding secondary side winding wound on the transformer core and through the other end of the winding to a point between the diodes of the other leg, wherein one connection of the parallel legs of one rectifier cell is directly connected to the opposite side connection of the parallel legs of a rectifier cell on which it is stacked and a secondary side voltage is produced or applied between the two connections of parallel legs of the secondary stack of rectifier cells that are not directly connected to another rectifier cell.

In one embodiment, the rectifier circuit elements form a serial stack of full-bridge rectifier cells, each including two legs of two active switches in series, each controlled by the control circuitry, and a capacitor leg in parallel connected at each end of the respective legs wherein each rectifier cell is connected from a point between the switches of one leg to one end of the corresponding secondary side winding wound on the transformer core and through the other end of the winding to a point between the switches of the other leg, wherein one connection of the parallel legs of one rectifier cell is directly connected to the opposite side connection of the parallel legs of a rectifier cell on which it is stacked and a secondary side voltage is produced or applied between the two connections of parallel legs of the secondary stack of rectifier cells that are not directly connected to another rectifier cell.

In one embodiment, the rectifier circuit elements form a serial stack of serial-half-bridge rectifier cells, each including a first set of two diodes oriented in the same direction in a first series leg and a capacitor in a parallel leg connected at each end of the legs to form a first loop connecting at its reverse end to the forward end of a second loop of two diodes oriented in the same direction in a second series leg and a capacitor in a parallel leg, wherein each rectifier cell is connected from a point between the diodes of the first series leg through a blocking capacitor to one end of the corresponding secondary side winding wound on the transformer core and through the other end of the winding to a point between the diodes of the second series leg, wherein the reverse end of the stacked loops of one rectifier cell is directly connected to the forward end of the stacked loops of a rectifier cell on which it is stacked and a secondary side voltage is produced between the two ends of the loops of the secondary stack of rectifier cells that are not directly connected to another loop.

In one embodiment, the rectifier circuit elements form a serial stack of serial-half-bridge rectifier cells, each including a first set of two active switches, each controlled by the control circuitry, in a first series leg and a capacitor in a parallel leg connected at each end of the legs to form a first loop connecting at a reverse end to a forward end of a second loop of two active switches, each controlled by the control circuitry, in a second series leg and a capacitor in a parallel leg, wherein each rectifier cell is connected from a point between the switches of the first series leg through a blocking capacitor to one end of the corresponding secondary side winding wound on the transformer core and through the other end of the winding to a point between the switches of the second series leg, wherein the reverse end of the stacked loops of one rectifier cell is directly connected to the forward end of the stacked loops of a rectifier cell on which it is stacked and a secondary side voltage is produced or applied between the two ends of the loops of the secondary stack of rectifier cells that are not directly connected to another loop.

In one embodiment, the control circuitry determines whether the voltage detected across the input capacitor of an inverter cell is greater than a reference voltage and, if so, adjusts the inverter cell duty cycles through the two switches to balance the capacitor voltage.

In one embodiment, the control circuitry determines whether any of the average voltages across the input capacitors of each inverter cell minus a reference voltage is greater than a threshold voltage and, if so, determines the greatest difference among the cells and adjusts the phase shift angle to each phase leg through the two switches to balance the capacitor voltages.

In another aspect, one embodiment of the present disclosure provides a DC-DC converter including: a primary side including a serial stack of at least two full-bridge inverter cells, each including in parallel a capacitor leg and two half bridge legs each including two active switches in series, connected at each end of the respective legs, wherein each inverter cell is connected from a point between the switches of one half bridge leg through a resonant tank circuit, through the primary side winding wound on a transformer core, and to a point between the switches of the second half-bridge leg, wherein a primary side voltage is applied or produced between each end of the serial stack, wherein one connection of the parallel legs of one inverter cell is directly connected to the opposite side connection of the parallel legs of an inverter cell on which it is stacked and a primary side voltage is applied or produced between the two connections of parallel legs of the serial stack of inverter cells that are not directly connected to another inverter cell, wherein the transformer core is sharable with other inverter cells; a secondary side including at least two sets of rectifier circuit elements each coupled to a secondary side winding wound on a transformer core shared with a corresponding primary side winding and is configured to rectify current induced at the secondary stage by current flowing in the corresponding primary side winding, and wherein a secondary side voltage is produced or applied; and control circuitry that activates switches in the converter to vary the pulse frequency or width or phase shift angle of voltage or current through the inverter cells or rectifier circuit elements.

In one embodiment, the rectifier circuit elements are each a half-bridge rectifier cell including in a leg two diodes in series and oriented in the same direction between the two diodes being a connection to the corresponding secondary side winding to a common star connection of the corresponding ends of all the rectifier cells, wherein corresponding ends of the diode legs form common connections with a parallel capacitor legs such that the secondary side voltage is produced between the two ends of the parallel legs.

In one embodiment, the rectifier circuit elements are each an active half-bridge rectifier cell including in a leg two active switches in series, each controlled by the control circuitry, between which switches is a connection to the corresponding secondary side winding to a common star connection of the corresponding ends of all the rectifier cells, wherein corresponding ends of the switch legs form common connections with a parallel capacitor leg such that the secondary side voltage is produced or applied between the two ends of the parallel legs.

In one embodiment, the rectifier circuit elements are each a full-bridge rectifier cell including two parallel legs of two diodes in series oriented in the same direction wherein each rectifier cell is connected from a point between the diodes of one leg to one end of the corresponding secondary side winding wound on the transformer core and through the other end of the winding to a point between the diodes of the other leg, wherein corresponding ends of the diode legs form common connections with a parallel capacitor leg such that the secondary side voltage is produced between the two ends of the parallel legs.

In one embodiment, the rectifier circuit elements are each a full-bridge rectifier cell including two parallel legs of two active switches in series, each controlled by the control circuitry, between which switches in a leg is a connection to one end of the corresponding secondary side winding wound on the transformer core and through the other end of the winding to a point between the switches of the other leg, wherein corresponding ends of the switch legs form common connections with a parallel capacitor leg such that the secondary side voltage is produced or applied between the two ends of the parallel legs.

In one embodiment, the rectifier circuit elements form a serial stack of half-bridge rectifier cells, each including two diodes in series oriented in the same direction in one leg and two capacitors in series in a parallel leg together forming a loop wherein each rectifier cell is connected from a point between the diodes to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier on which it is stacked and a secondary side voltage is produced between the two ends of the loops of the secondary stack of rectifier cells that are not directly connected to another rectifier cell.

In one embodiment, the rectifier circuit elements form a serial stack of half-bridge rectifier cells, each including two active switches in series in one leg, each controlled by the control circuitry, and two capacitors in series in a parallel leg together forming a loop wherein each rectifier cell is connected from a point between the switches to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier cell on which it is stacked and a secondary side voltage is produced or applied between the two ends of the loops of the secondary stack of rectifier cells that are not directly connected to another rectifier cell.

In one embodiment, the rectifier circuit elements form a serial stack of half-bridge rectifier cells, each including two diodes in series oriented in the same direction in one leg and a capacitor in a parallel leg together forming a loop wherein each rectifier cell is connected from a point between the diodes through a blocking capacitor to one end of the corresponding secondary side winding wound on the transformer core and through the other end of the winding to a common star connection of the corresponding ends of all the rectifier cells, wherein one end of the loop connecting the parallel legs of one rectifier cell is directly connected to the opposite end of the corresponding loop in a rectifier cell on which it is stacked and a secondary side voltage is produced between the two ends of the loops of the secondary stack of rectifier cells that are not directly connected to another rectifier cell.

In one embodiment, the rectifier circuit elements form a serial stack of half-bridge rectifier cells, each including two active switches in series in one leg, each controlled by the control circuitry, and a capacitors in a parallel leg together forming a loop wherein each rectifier cell is connected from a point between the switches through a blocking capacitor to one end of the corresponding secondary side winding wound on the transformer core and through the other end of the winding to a common star connection of the corresponding ends of all the rectifier cells, wherein one end of the loop connecting the parallel legs of one rectifier cell is directly connected to the opposite end of the corresponding loop in a rectifier cell on which it is stacked and a secondary side voltage is produced or applied between the two ends of the loops of the secondary stack of rectifier cells that are not directly connected to another rectifier cell.

In one embodiment, the rectifier circuit elements form a serial stack of full-bridge rectifier cells, each including two legs of two diodes in series oriented in the same direction and a capacitor leg in parallel connected at each end of the respective legs wherein each rectifier cell is connected from a point between the diodes of one leg to one end of the corresponding secondary side winding wound on the transformer core and through the other end of the winding to a point between the diodes of the other leg, wherein one connection of the parallel legs of one rectifier cell is directly connected to the opposite side connection of the parallel legs of a rectifier cell on which it is stacked and a secondary side voltage is produced or applied between the two connections of parallel legs of the secondary stack of rectifier cells that are not directly connected to another rectifier cell.

In one embodiment, the rectifier circuit elements form a serial stack of full-bridge rectifier cells, each including two legs of two active switches in series, each controlled by the control circuitry, and a capacitor leg in parallel connected at each end of the respective legs wherein each rectifier cell is connected from a point between the switches of one leg to one end of the corresponding secondary side winding wound on the transformer core and through the other end of the winding to a point between the switches of the other leg, wherein one connection of the parallel legs of one rectifier cell is directly connected to the opposite side connection of the parallel legs of a rectifier cell on which it is stacked and a secondary side voltage is produced or applied between the two connections of parallel legs of the secondary stack of rectifier cells that are not directly connected to another rectifier cell.

In one embodiment, the rectifier circuit elements form a serial stack of serial-half-bridge rectifier cells, each including a first set of two diodes oriented in the same direction in a first series leg and a capacitor in a parallel leg connected at each end of the legs to form a first loop connecting at its reverse end to the forward end of a second loop of two diodes oriented in the same direction in a second series leg and a capacitor in a parallel leg, wherein each rectifier cell is connected from a point between the diodes of the first series leg through a blocking capacitor to one end of the corresponding secondary side winding wound on the transformer core and through the other end of the winding to a point between the diodes of the second series leg, wherein the reverse end of the stacked loops of one rectifier cell is directly connected to the forward end of the stacked loops of a rectifier cell on which it is stacked and a secondary side voltage is produced between the two ends of the loops of the secondary stack of rectifier cells that are not directly connected to another loop.

In one embodiment, the rectifier circuit elements form a serial stack of serial-half-bridge rectifier cells, each including a first set of two active switches, each controlled by the control circuitry, in a first series leg and a capacitor in a parallel leg connected at each end of the legs to form a first loop connecting at a reverse end to a forward end of a second loop of two active switches, each controlled by the control circuitry, in a second series leg and a capacitor in a parallel leg, wherein each rectifier cell is connected from a point between the switches of the first series leg through a blocking capacitor to one end of the corresponding secondary side winding wound on the transformer core and through the other end of the winding to a point between the switches of the second series leg, wherein the reverse end of the stacked loops of one rectifier cell is directly connected to the forward end of the stacked loops of a rectifier cell on which it is stacked and a secondary side voltage is produced or applied between the two ends of the loops of the secondary stack of rectifier cells that are not directly connected to another loop.

In one embodiment, the control circuitry determines for each inverter cell whether a detected voltage difference across the two input capacitors is greater than a threshold voltage, and if so, adjusts the phase shift angle through the four switches in the corresponding cell; and determines for each inverter cell whether the average voltage across the two input capacitors is greater than a reference voltage, and if so, generates an extra duty cycle through the four switches in the corresponding cell.

The use of the word "a" or "an" when used in conjunction with the term "comprising/including" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternative are mutually exclusive, although the disclosure supports a definition that refers to only alternatives and "and/or."

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The present disclosure is better understood upon consideration of the following detailed description and the accompanying drawings.

DETAILED DESCRIPTION

Figure 1A:
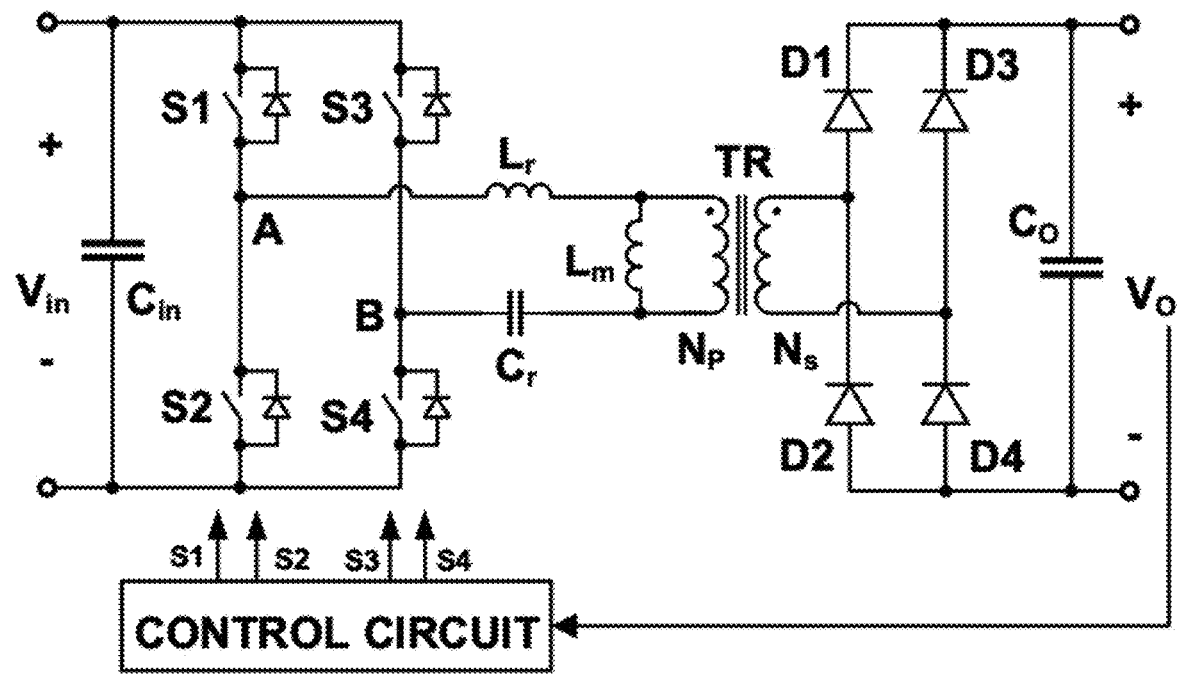
FIGS. 1A and 1B respectively show a conventional full-bridge LLC resonant converter under closed-loop voltage control and the timing diagrams of control signals for switches $S_1$ to $S_4$ and a primary-side full-bridge output voltage $V_{AB}$.
Figure 1B:
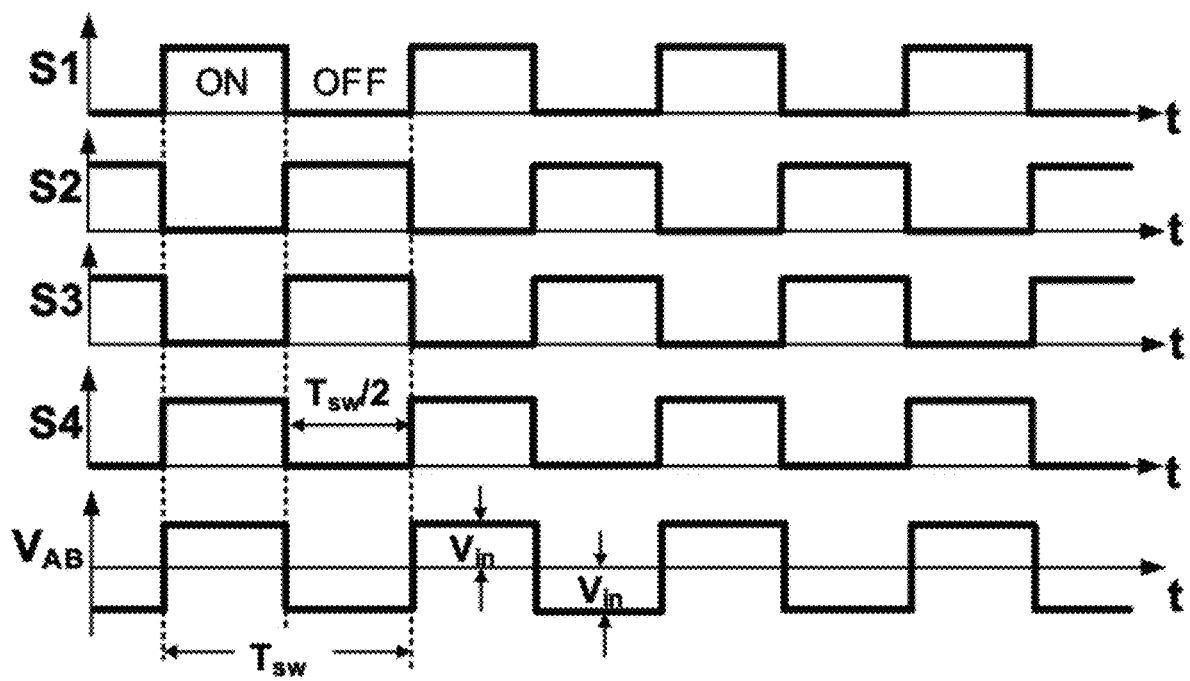

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. While the numerical ranges and parameters set forth for the broad scope of the present invention are approximations, the numerical value reported in the specific examples set forth as accurately as possible. However, any numerical values inherently contain certain errors necessarily the standard deviation found in the respective testing measurements caused. Also, as used herein, the term "about" generally means away from a given value or a range of 10%, 5%, 1% or 0.5%. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

A. Stacked Half Bridge Resonant Converter

Three Stacked Half Bridge Resonant Converter

Figure 5A:
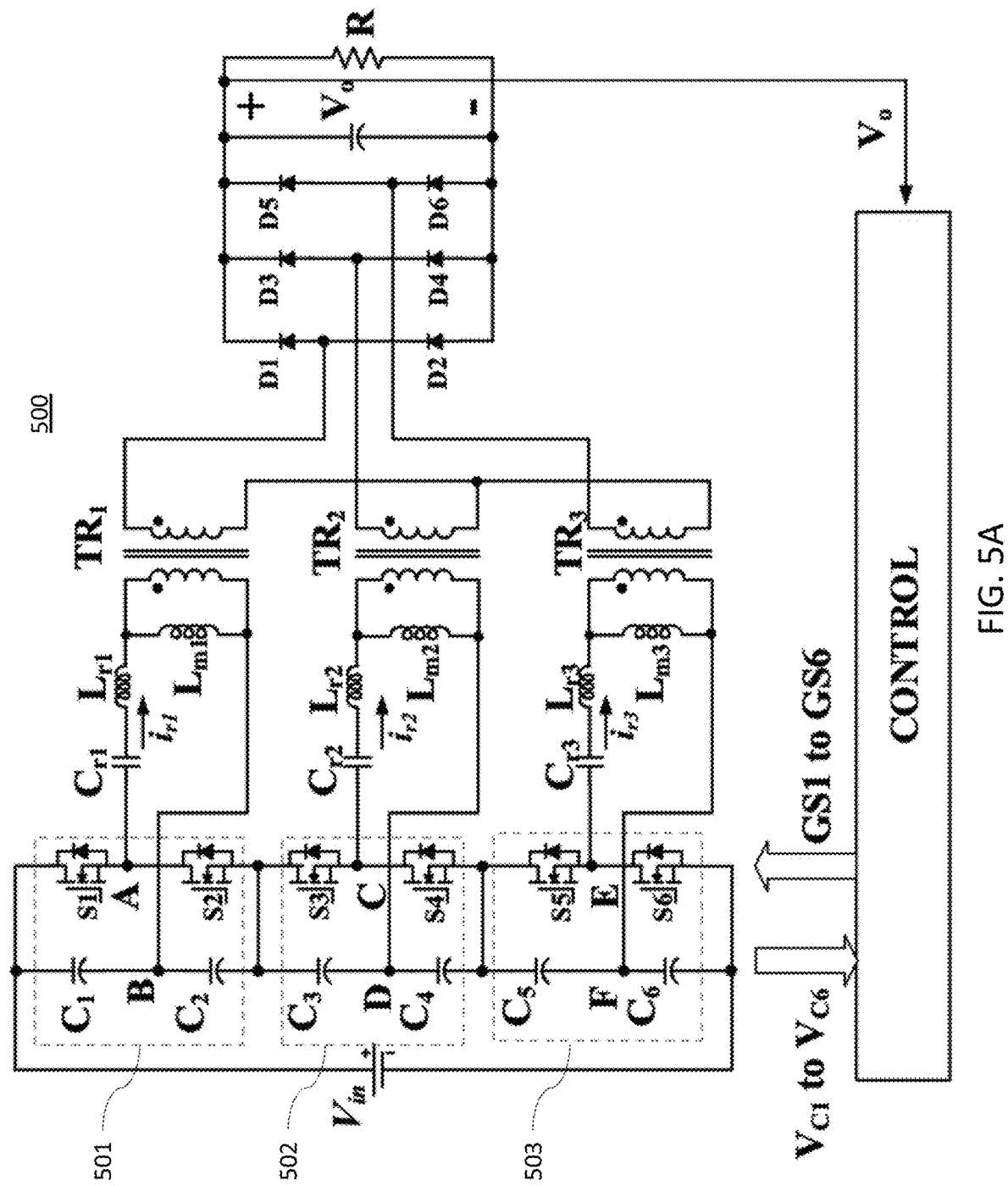
FIG. 5A illustrates a three-stacked half bridge LLC resonant converter, in accordance with an embodiment of the present disclosure.
Figure 5B:
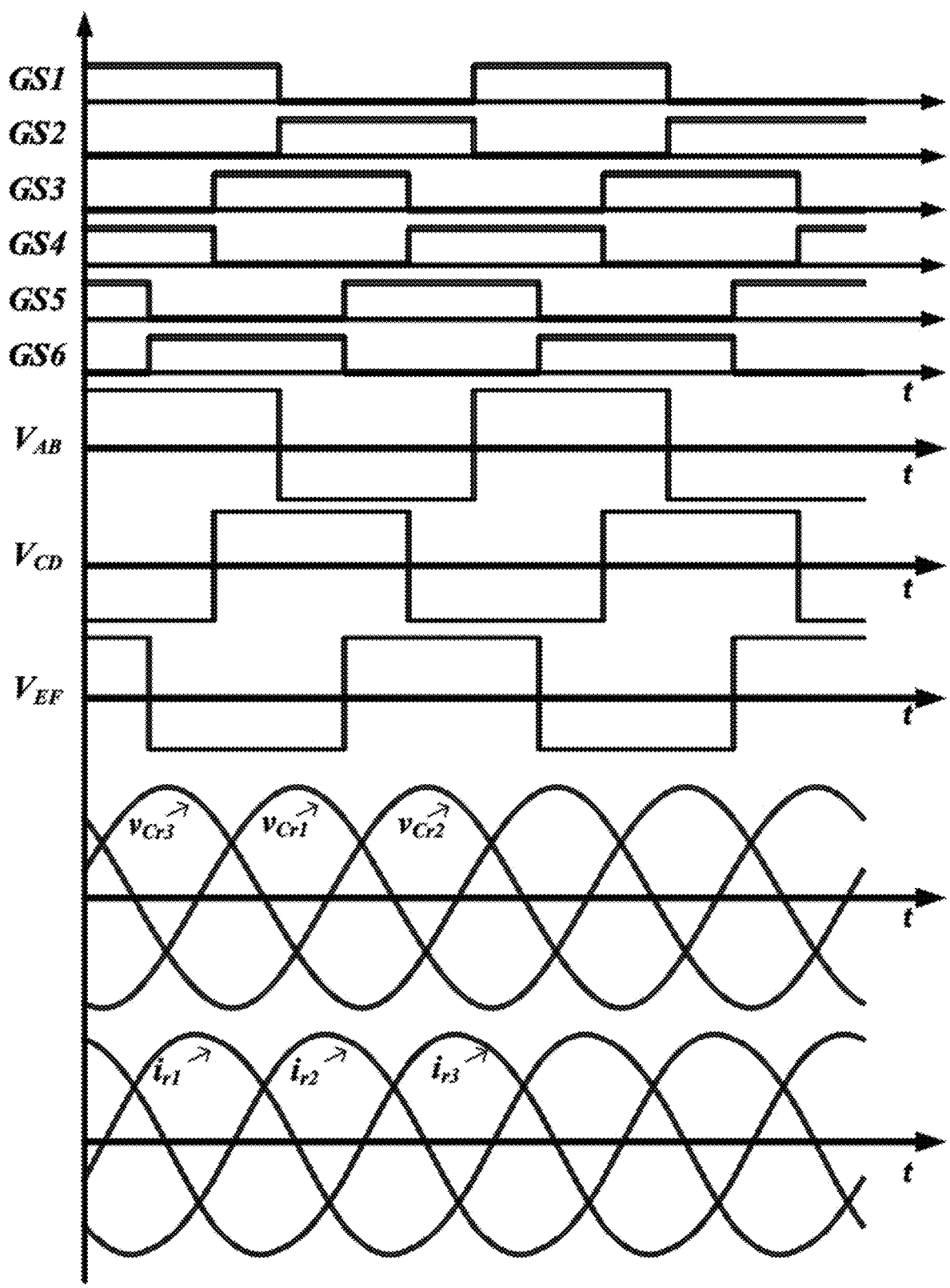
FIG. 5B illustrates the timing diagrams for the converter in FIG. 5A under variable frequency control for switch control signals GS1 to GS6, resonant tank input voltages $V_{AB}$, $V_{CD}$, and $V_{EF}$, resonant capacitor voltages $V_{cr1}$, $V_{cr2}$, and $V_{cr3}$, and resonant currents $i_{r1}$, $i_{r2}$, and $i_{r3}$, in accordance with an embodiment of the present disclosure.
Figure 5C:
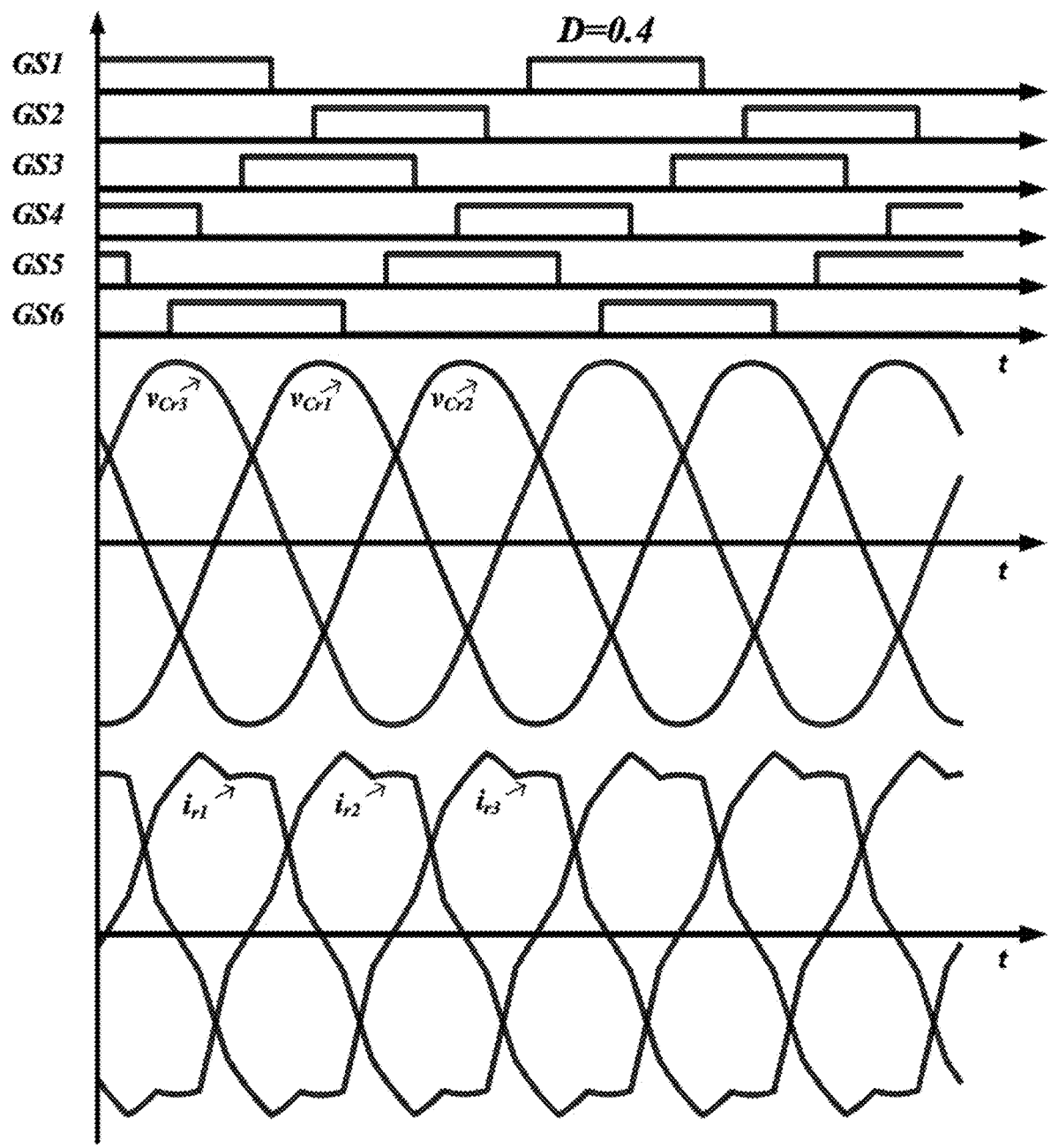
FIG. 5C illustrates the timing diagrams for the converter in FIG. 5A under variable duty cycle control for switch control signals GS1 to GS6, resonant capacitor voltages $V_{cr1}$ to $V_{cr3}$, and resonant currents $i_{r1}$ to $i_{r3}$, in accordance with an embodiment of the present disclosure.

FIG. 5A illustrates a stacked half bridge resonant converter 500, in accordance with an embodiment of the present disclosure. FIG. 5B illustrates the timing diagrams for converter 500 in FIG. 5A under variable frequency control for switch control signals GS1 to GS6, resonant tank input voltages $V_{AB}$, $V_{CD}$, and $V_{EF}$, resonant capacitor voltages $V_{cr1}$, $V_{cr2}$, and $V_{cr3}$, and resonant currents $i_{r1}$, $i_{r2}$, and $i_{r3}$, in accordance with an embodiment of the present disclosure. FIG. 5C illustrates the timing diagrams for converter 500 in FIG. 5A under variable duty cycle control for switch control signals GS1 to GS6, resonant capacitor voltage $V_{cr1}$ to $V_{cr3}$, and resonant current $i_{r1}$ to $i_{r3}$, in accordance with an embodiment of the present disclosure.

In the embodiment, the DC-DC converter 500 includes a primary side, a secondary side, a control circuitry, a transformer stage electrically connected to the primary side and the secondary side, and at least one resonant tank circuit electrically connected between the primary side and the at least one transformer TR. The primary side includes a serial stack of at least two half-bridge inverter cells 501, 502, and 503. The inverter cells 501 includes two active switches S1 and S2 in series in one leg and two input capacitors $C_1$ and $C_2$ in series in a parallel leg. The inverter cells 502 includes two active switches $S_3$ and $S_4$ in series in one leg and two input capacitors $C_3$ and $C_4$ in series in a parallel leg. The inverter cells 503 includes two active switches $S_5$ and $S_6$ in series in one leg and two input capacitors $C_5$ and $C_6$ in series in a parallel leg. In the embodiment, the transformer stage includes a first transformer $TR_1$, a second transformer $TR_2$, and a third transformer $TR_3$, and the at least one resonant tank circuit includes a first resonant tank circuit, a second resonant tank circuit, and a third resonant tank circuit. In the embodiment, each of the transformers $TR_1$, $TR_2$, and $TR_3$ includes a transformer core, a primary side winding wound on the transformer core, and a secondary side winding wound on the transformer core. The control circuitry is configured to activate the active switches $S_1$, $S_2$, $S_3$, $S_4$, $S_5$, and $S_6$ to vary the pulse frequency or width or phase shift angle of voltage or current through the inverter cells or the rectifier circuit elements.

It should be noted that the terms "rectifier," "rectifier circuit element," "rectifier cell," and the like in the disclosure may mean the same in some embodiments and may be used herein for ease of description to describe one element or feature utilized for providing rectification function.

Converter 500 employs three half bridges 501, 502, and 503 in stack on the primary side including active switches S1 to S6 and also includes six input capacitors $C_1$, $C_2$, $C_3$, $C_4$, $C_5$, and $C_6$ in stack. As shown in FIG. 5A, first half bridge 501 includes switches S1 and S2 connected in series and input capacitors $C_1$ and $C_2$ connected in series. Switches S1 and S2 and input capacitors $C_2$ and $C_1$ are connected together in series to form a first circuit loop. Point A between switches S1 and S2 is connected to one end of a first resonant tank including a resonant capacitor $C_{r1}$ and a resonant inductor $L_{r1}$. The other end of the first resonant tank is connected to one end of the primary side winding of transformer $TR_1$. The other end of the primary side winding of transformer $TR_1$ is connected to point B between input capacitors $C_1$ and $C_2$.

Likewise, as shown in FIG. 5A, second half bridge 502 includes switches S3 and S4 connected in series and input capacitors $C_3$ and $C_4$ connected in series. Switches S3 and S4 and input capacitors $C_4$ and $C_3$ are connected together in series to form a second circuit loop. Point C between switches S3 and S4 is connected to one end of a second resonant tank including a resonant capacitor $C_{r2}$ and a resonant inductor $L_{r2}$. The other end of the second resonant tank is connected to one end of the primary side winding of transformer $TR_2$. The other end of the primary side winding of transformer $TR_2$ is connected to point D between input capacitors $C_3$ and $C_4$. It is appreciated that the first and second circuit loops are directly connected.

Further, as shown in FIG. 5A, third half bridge 503 includes switches S5 and S6 connected in series and input capacitors $C_5$ and $C_6$ connected in series. Switches S5 and S6 and input capacitors $C_6$ and $C_5$ are connected together in series to form a third circuit loop. Point E between switches S5 and S6 is connected to one end of a third resonant tank including a resonant capacitor $C_{r3}$ and a resonant inductor $L_{r3}$. The other end of the second resonant tank is connected to one end of the primary side winding of transformer $TR_3$. The other end of the primary side winding of transformer $TR_3$ is connected to point F between input capacitors $C_5$ and $C_6$. It is appreciated that the second and third circuit loops are directly connected, but the first and third circuit loops are not directly connected.

In sum, in this embodiment, three separated transformers $TR_1$, $TR_2$, and $TR_3$ are used where one end of each transformer's primary side winding is connected to a resonant tank which in turn is connected to the middle point of the corresponding switches, while the other end of each transformer's primary side winding is coupled to the middle point of the corresponding input capacitors.

In one embodiment, a first terminal (between switch S1 and input capacitor $C_1$) of first half bridge 501 is connected to a positive electrode of input voltage $V_{in}$ and a second terminal (between switch S2 and input capacitor $C_2$) of first half bridge 501 is connected to a first terminal (between switch S3 and input capacitor $C_3$) of second half bridge 502. A second terminal (between switch S4 and input capacitor $C_4$) of second half bridge 502 is connected to a first terminal (between switch S5 and input capacitor $C_5$) of third half bridge 503. A second terminal (between switch S6 and input capacitor $C_6$) of third half bridge 503 is connected to a negative electrode of input voltage $V_{in}$. In other words, first, second, and third half bridges 501, 502, 503, each forming a circuit loop, are "stacked" vertically to form a stacked half bridge.

In one embodiment, the secondary side includes at least two sets of rectifier circuit elements each coupled to a secondary side winding wound on the transformer core shared with a corresponding primary side winding and is configured to rectify current induced at the secondary side by current flowing in the corresponding primary side winding, and wherein a secondary side voltage $V_o$ is produced or applied. In the embodiment, conventional three phase diode bridges (including diodes $D_1$, $D_2$, $D_3$, $D_4$, $D_5$, and $D_6$) are used in secondary side to provide rectification function.

Variable Switching Frequency Control for Three Stacked Half Bridge Resonant Converter FIG. 5B illustrates the timing diagrams for converter 500 in FIG. 5A under variable frequency control for switch control signals GS1 to GS6, resonant tank input voltages $V_{AB}$, $V_{CD}$, and $V_{EF}$, resonant capacitor voltages $V_{cr1}$, $V_{cr2}$, and $V_{cr3}$, and resonant currents $i_{r1}$, $I_{r2}$, and $i_{r3}$, in accordance with an embodiment of the present disclosure. Switch control signals GS1 to GS6 are the respective control signals of switches S1 to S6. In this embodiment, variable switching frequency control is used to regulate the output voltage and output power of stacked half bridge resonant converter 500.

As shown in FIG. 5B, all switches operate with the same switching frequency (e.g., 100 kHz or greater than 20 kHz) and have identical duty cycles of approximately 50%. To achieve zero-voltage-switching of the complementary-operated primary side switches of the same leg, a small dead time is provided between the turn-on and turn-off instants of these complementary-operated switches. The switch control signals of each half bridge are interleaved with each other with a phase shift of 120°. For example, switch control signals GS1 and GS2 are phase shifted with respect to switch control signals GS3 and GS4 by 120 degrees. In this embodiment, the resonant tank input voltages $V_{AB}$, $V_{CD}$ and $V_{EF}$ are in a square waveform with no DC bias voltage. For the same reason, resonant capacitor voltages $V_{cr1}$, $V_{cr2}$, and $V_{cr3}$ are in a sinusoidal waveform with no DC bias voltage. Resonant currents $i_{r1}$, $i_{r2}$, and $i_{r3}$ for all three resonant tanks are pure sinusoid, if the resonant converter operates at its resonant frequency and the magnetizing current is negligible. Each resonant current is interleaved with each other with a phase shift of 120° due to the interleaved switch control signals. The interleaved currents can provide minimal ripple on the components to further improve the converter performance.

Pulse Width Modulation (PWM) for Stacked Half Bridge Resonant Converter

If wide input and/or output voltage range is required in specific applications, such as in battery charging applications, implementing only the variable switching frequency control may not be able to achieve the required gain range. Pulse width modulation (PWM) or variable duty cycle control is proposed to regulate the gain of the resonant circuit in this situation, when switching frequency control reaches its upper limit.

FIG. 5C illustrates the timing diagrams for converter 500 in FIG. 5A under variable duty cycle control for switch control signals GS1 to GS6, resonant capacitor voltages $V_{cr1}$ to $V_{cr3}$, and resonant currents $i_{r1}$ to $i_{r3}$, in accordance with an embodiment of the present disclosure. Switch control signals GS1 to GS6 are the respective control signals of switches S1 to S6. As shown in FIG. 5C, the switch control signals of each half bridge are interleaved with each other with a phase shift of 120°. For example, switch control signals GS1 and GS2 in the first leg are phase shifted with switch control signals GS3 and GS4 in the second leg by a phase shift angle of 120°. The duty cycle for switch control signals GS1 to GS6 are reduced from the nominal 50% to 40%, so as to further reduce the output voltage. The resonant currents $i_{r1}$ to $i_{r3}$ may become discontinuous in this modulation.

Phase Shift Modulation for Stacked Half Bridge Resonant Converter

Figure 6A:
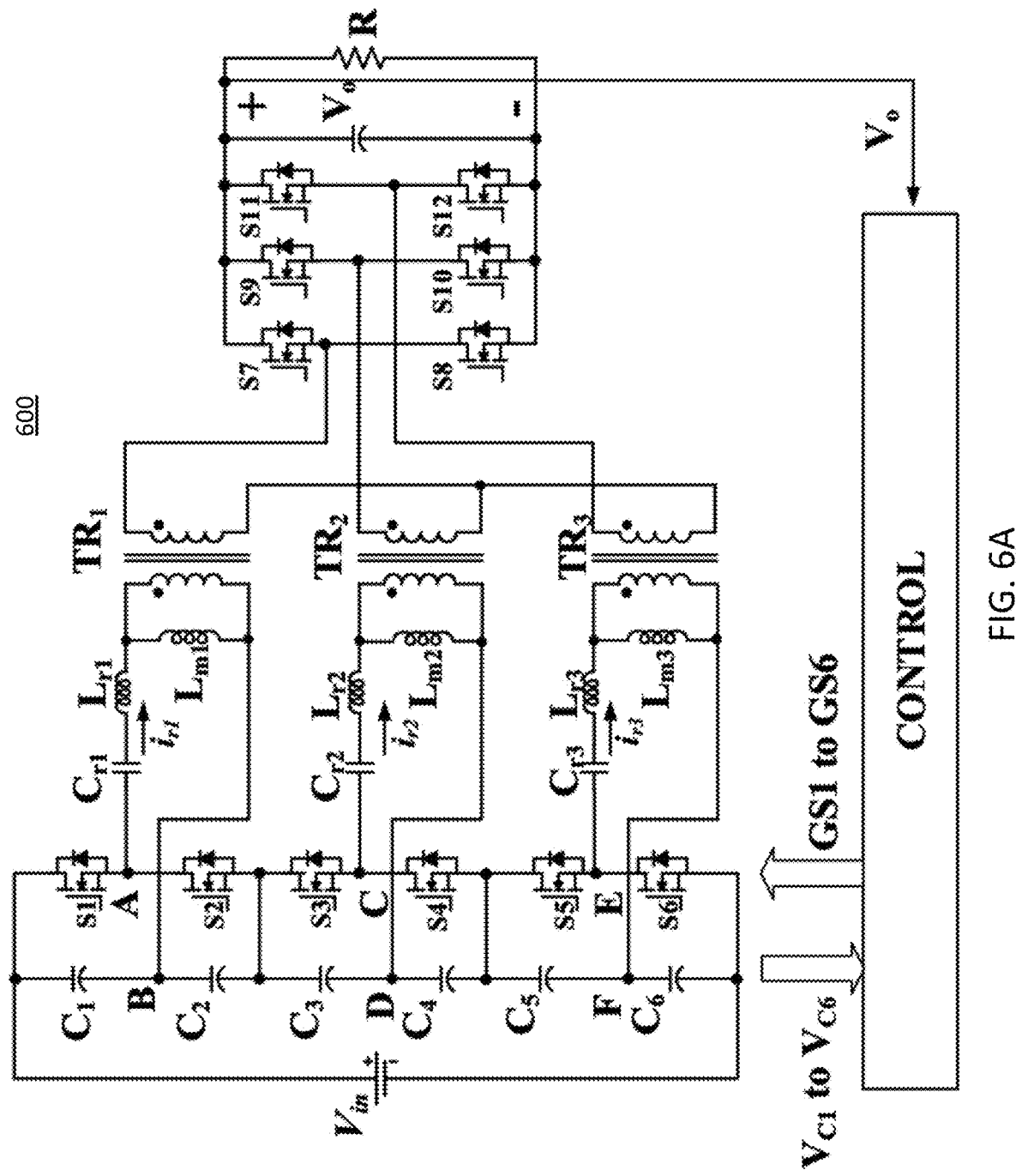
FIG. 6A illustrates a three-stacked half bridge LLC resonant converter with active switches on the secondary side for bidirectional operation, in accordance with an embodiment of the present disclosure.

FIG. 6A illustrates a stacked half bridge LLC resonant converter 600 with active switches S7 to S12 on the secondary side for bidirectional operation, in accordance with an embodiment of the present disclosure. Converter 600 in FIG. 6A is substantially identical to converter 500 in FIG. 5A on the primary side. However, instead of diodes, converter 600 in FIG. 6A employs three active half bridges in parallel on the secondary side including switches S7 to S12 for bidirectional operation.

Figure 6B:
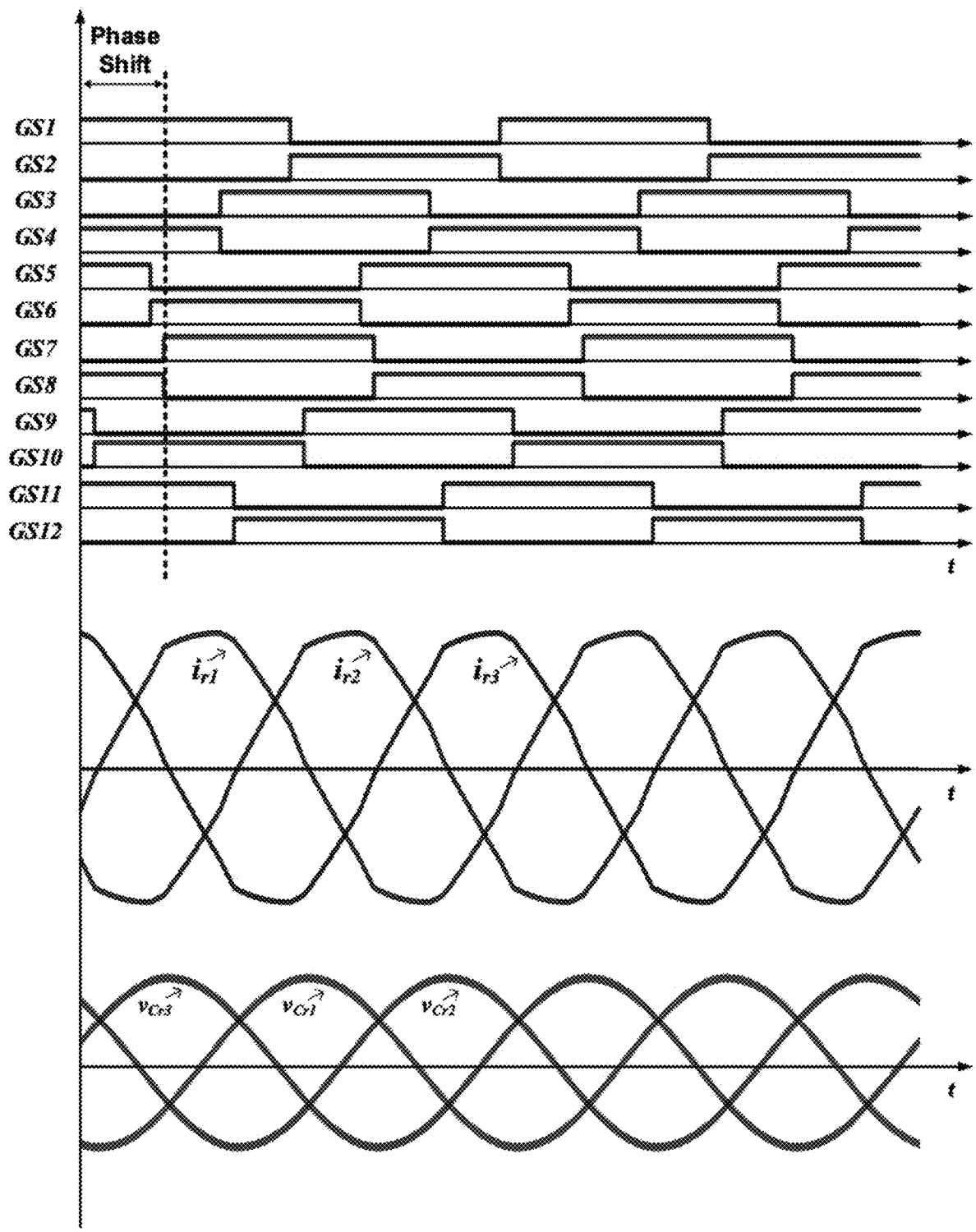
FIG. 6B illustrates the timing diagrams for the converter in FIG. 6A under variable frequency control and phase shift control for switch control signals GS1 to GS12, resonant capacitor voltages $V_{cr1}$ to $V_{cr3}$, and resonant currents $i_{r1}$ to $i_{r3}$, in accordance with an embodiment of the present disclosure.

FIG. 6B illustrates the timing diagrams for converter 600 in FIG. 6A under variable frequency control and phase shift control for switch control signals GS1 to GS12, resonant capacitor voltages $V_{cr1}$ to $V_{cr3}$, and resonant currents $i_{r1}$ to $i_{r3}$, in accordance with an embodiment of the present disclosure. Switch control signals GS1 to GS12 are the control signals of switches S1 to S12.

Variable switching frequency control is normally used to regulate the output voltage and output power in resonant converter. If wide input and/or output voltage range is required in specific applications, such as battery charging applications, implementing only the variable switching frequency control may not be able to achieve the required gain range. Phase shift modulation can be used to achieve wide input and/or output voltage range as well as bidirectional operation. As shown in FIG. 6B, all switches operate with the same switching frequency and have identical duty cycles of approximately 50%. To achieve zero-voltage-switching of the complementary-operated primary side switches of the same leg, a small dead time is provided between the turn-on and turn-off instants of these complementary-operated switches.

On the primary side, the switch control signals of each half bridge are interleaved with each other with a phase shift of about 120°. On the secondary side, the switch control signals of each half bridge are also interleaved with each other with a phase shift of about 120°. In addition, in one embodiment, the control signals of the first bridge on the primary side may be phase shifted with the control signals of the first bridge on the secondary side. Such a phase shift angle becomes another critical control variable besides the switching frequency. In other words, the output voltage and power are controlled by both the switching frequency and the phase shift angle. In this embodiment, resonant capacitor voltages $V_{cr1}$ to $V_{cr3}$ have no DC-bias voltage due to the primary side circuit structure. Resonant currents $i_{r1}$ to $i_{r3}$ are interleaved with each other for 120° due to the interleaved switch control signals. These interleaved currents can provide minimal ripple on the components to further improve the converter performance.

n-Stacked Half Bridge Resonant Converter

Figure 7A:
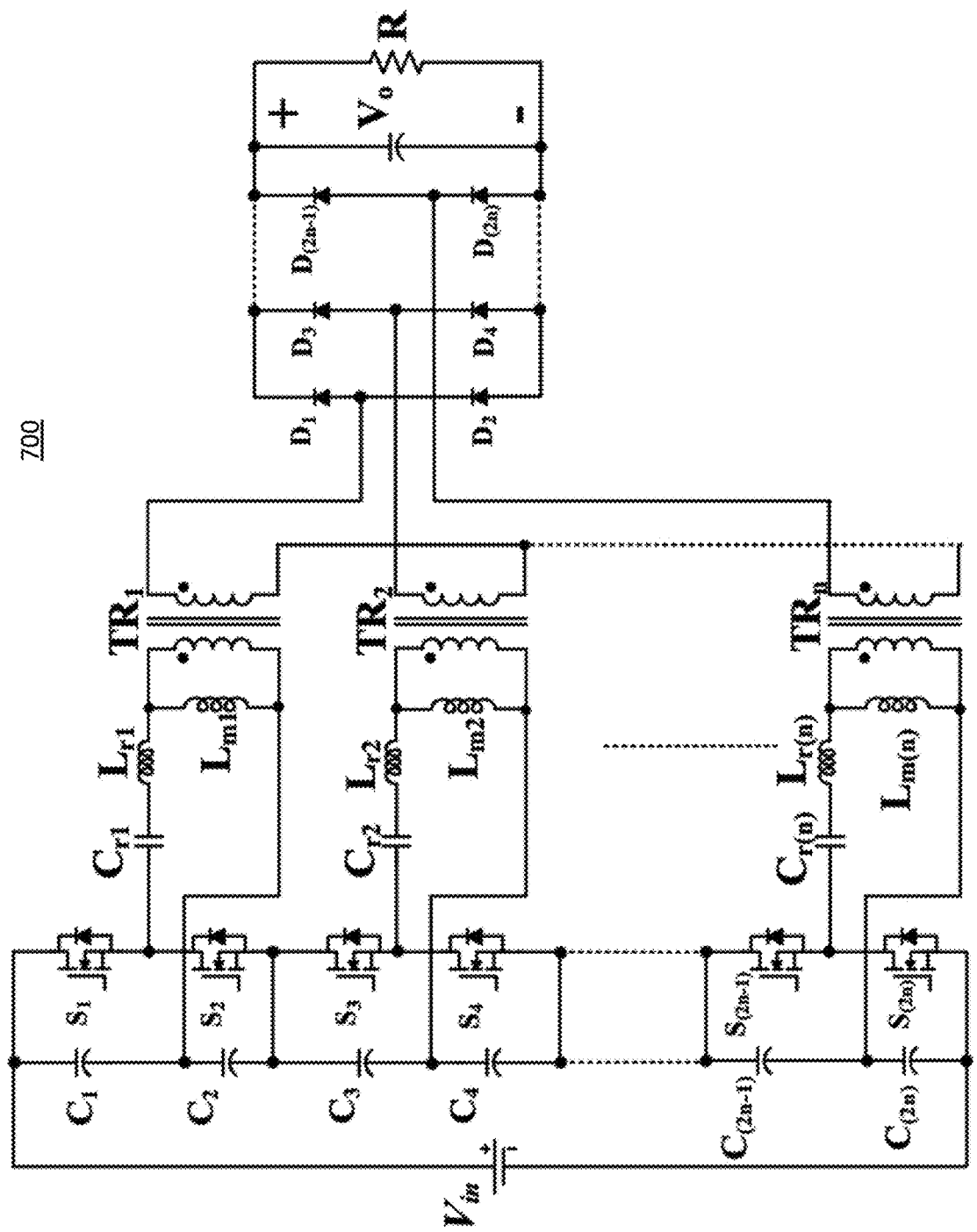
FIG. 7A illustrates an n-stacked half bridge resonant converter, in accordance with an embodiment of the present disclosure.

FIG. 7A illustrates an n-stacked half bridge resonant converter 700, in accordance with an embodiment of the present disclosure. Converter 700 employs n "stacked" half bridges on the primary side, including 2n switches $S_1$ to $S_{(2n)}$ and 2n input capacitors $C_1$ to $C_{(2n)}$, where n is a natural number corresponding to the number of phases or resonant tanks in converter 700. The middle point of each half bridge is connected to a resonant tank which includes a resonant capacitor and a resonant inductor. A total of n separated transformers may be used, and each transformer has a primary side winding and a secondary side winding. The first end of each transformer's primary side winding is connected to its corresponding middle point of the input capacitors and the second end of each transformer's primary side winding is connected to the other end of each resonant tank. A total of n half-wave diode bridges in parallel perform the secondary side rectification.

Variable switching frequency control can be used to regulate the output voltage and output power of resonant converter 700. All switches $S_1$ to $S_{(2n)}$ operate with the same switching frequency and have identical duty cycles of approximately 50%. To achieve zero-voltage-switching of the complementary-operated primary side switches of the same half bridge, a small dead time is provided between the turn-on and turn-off instants of these complementary-operated switches. The switch control signals of each half bridge are interleaved with each other with a phase shift of 360°/n, where n stands for the number of phases in converter 700. The resonant currents for all resonant tanks are sinusoid if the magnetizing current is negligible when resonant converter 700 operates at its resonant frequency. Each resonant current is interleaved with each other with 360°/n phase shift angle due to the interleaved switch control signals. This interleaved current can provide the minimal ripple on the components to further improve the converter performance.

Figure 7B:
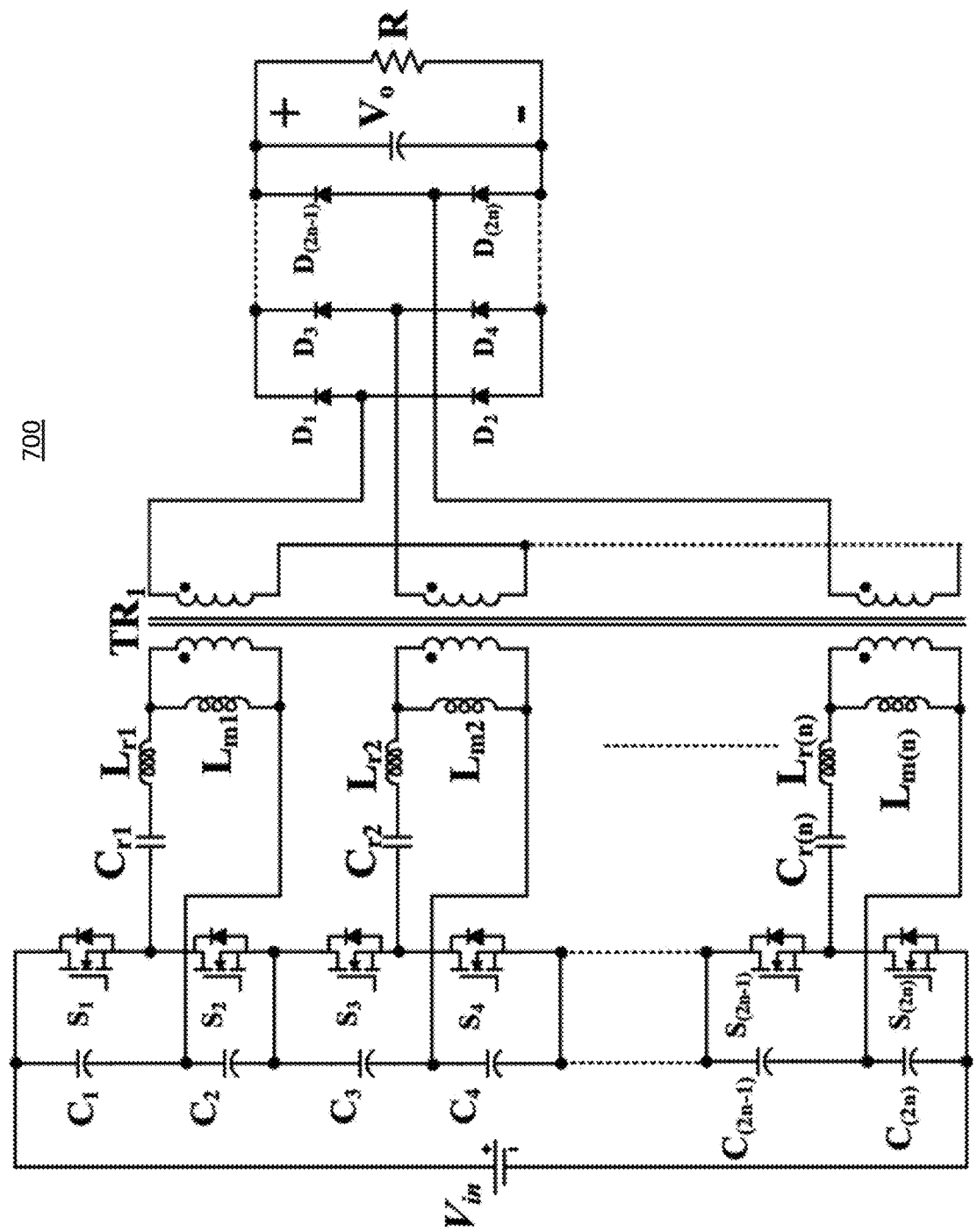
FIG. 7B illustrates an n-stacked half bridge resonant converter with an integrated transformer.

The total n number of the separated transformer can be integrated to less than n number of transformers. For example, FIG. 7B shows an n-stacked half bridge resonant converter 700 that employs only one integrated transformer, which has total n windings on the primary side and n windings on the secondary side.

Figure 7C:
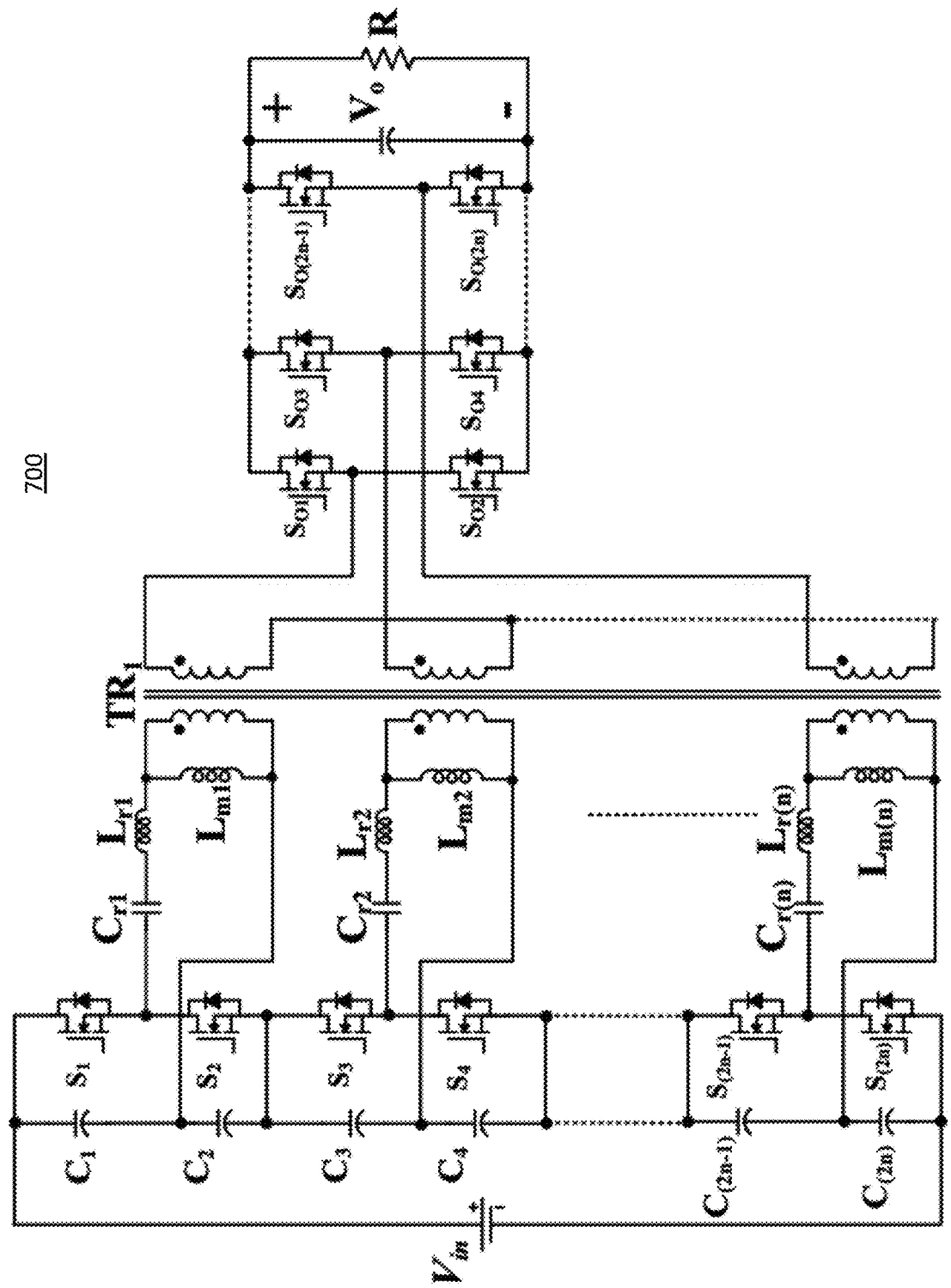
FIG. 7C illustrates an n-stacked half bridge resonant converter with active switches on the secondary side for synchronous rectification and bidirectional operation.

FIG. 7C illustrates an n-stacked half bridge resonant converter 700 with active switches on the secondary side for synchronous rectification and bidirectional operation. As shown in FIG. 7C, the 2n diodes on the secondary side as shown in FIGS. 7A and 7B are replaced by 2n active switches $S_{O1}$ to $S_{O(2n)}$ for synchronous rectification to improve the operation efficiency. In this matter, the resonant converter can also provide bidirectional power flow with the active switches.

All of the control methods disclosed herein can be implemented in the n-stacked half bridge resonant converter.

B. Stacked Serial-Half-Bridge Resonant Converter

Three-Stacked Serial-Half-Bridge Resonant Converter

Figure 8A:
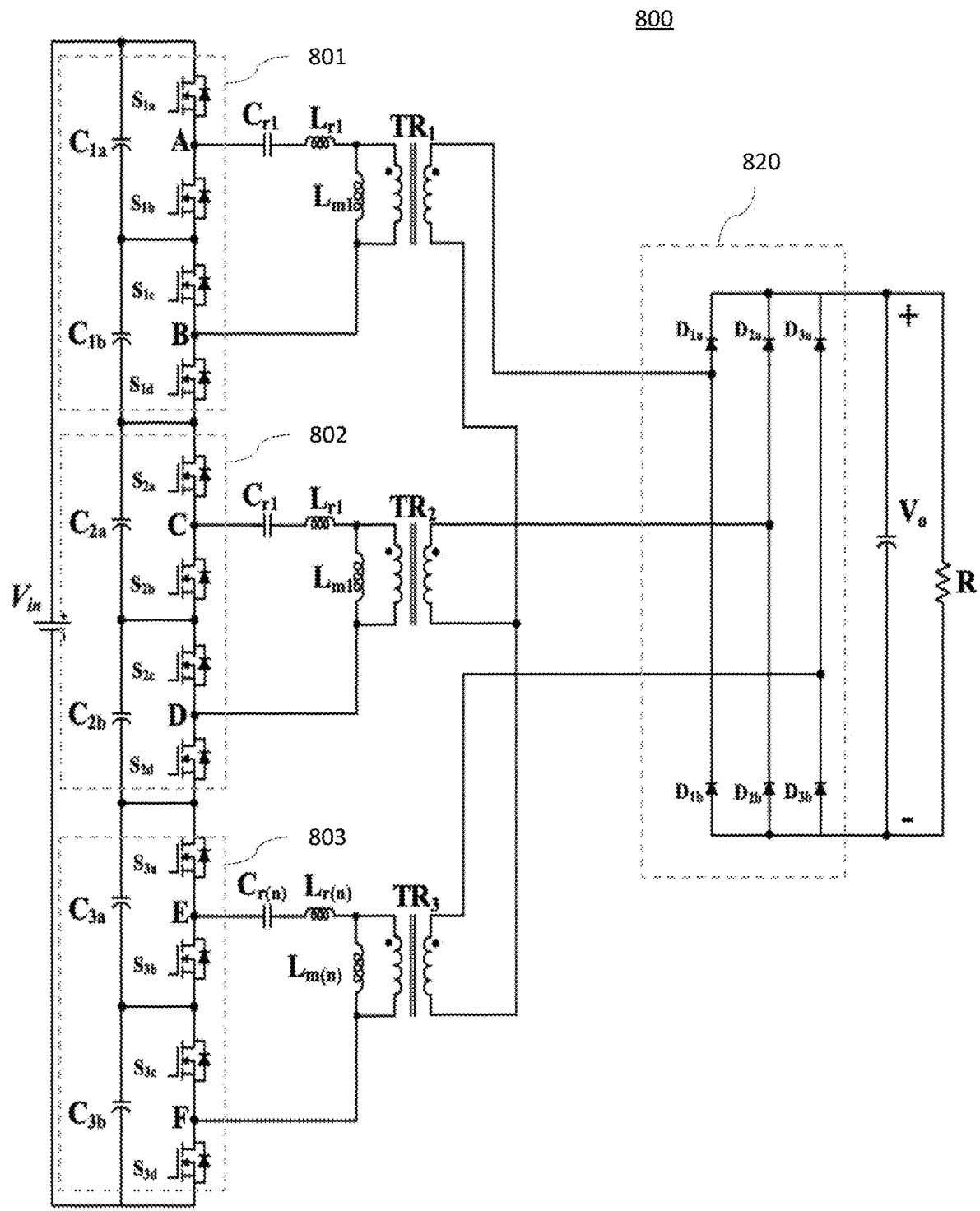
FIG. 8A illustrates a three-stacked serial half bridge resonant converter with a three-phase diode bridge rectifier, in accordance with an embodiment of the present disclosure.

FIG. 8A illustrates a three-stacked serial half bridge resonant converter 800 with a three-phase diode bridge rectifier, in accordance with an embodiment of the present disclosure. Instead of applying half bridge inverter cells 501, 502, and 503 as basic elements in stacked half bridge resonant converter 500 as shown in FIG. 5A, resonant converter 800 employs three serial half bridge inverter cells 801, 802, and 803 in stack, where each serial half bridge inverter cell includes two half bridges (an upper half bridge and a lower half bridge) connected in series in a stacked structure.

As shown in FIG. 8A, first serial half bridge inverter cell 801 includes four active switches $S_{1a}$, $S_{1b}$, $S_{1c}$ and $S_{1d}$ and two input capacitors $C_{1a}$ and $C_{1b}$. Switches $S_{1a}$ and $S_{1b}$, which constitute an upper half bridge, are connected in parallel with input capacitor $C_{1a}$ to form a circuit loop. Switches $S_{1c}$ and $S_{1d}$, which constitute a lower half bridge, are connected in parallel with input capacitor Cu, to form another circuit loop. Likewise, second serial half bridge inverter cell 802 includes four active switches $S_{2a}$, $S_{2b}$, $S_{2c}$ and $S_{2d}$ and two input capacitors $C_{2a}$ and $C_{2b}$. Switches $S_{2a}$ and $S_{2b}$, which constitute an upper half bridge, are connected in parallel with input capacitor $C_{2a}$ to form a circuit loop. Switches $S_{2c}$ and $S_{2d}$, which constitute a lower half bridge, are connected in parallel with input capacitor $C_{2b}$ to form another circuit loop. Moreover, third serial half bridge inverter cell 803 includes four active switches $S_{3a}$, $S_{3b}$, $S_{3c}$ and $S_{3d}$ and two input capacitors $C_{3a}$ and $C_{3b}$. Switches $S_{3a}$ and $S_{3b}$, which constitute an upper half bridge, are connected in parallel with input capacitor $C_{3a}$ to form a circuit loop. Switches $S_{2c}$ and $S_{2d}$, which constitute a lower half bridge, are connected in parallel with input capacitor $C_{2b}$ to form another circuit loop.

As shown in FIG. 8A, a middle point (point A) of the upper half bridges of first serial half bridge inverter cell 801 is connected to a resonant tank which includes a resonant capacitor $C_{r1}$ and resonant inductor $L_{r1}$ in series. A middle point (point C) of the upper half bridges of second serial half bridge inverter cell 802 is connected to a resonant tank which includes a resonant capacitor $C_{r2}$ and resonant inductor $L_{r2}$ in series. A middle point (point E) of the upper half bridges of third serial half bridge inverter cell 803 is connected to a resonant tank which includes a resonant capacitor $C_{r3}$ and resonant inductor $L_{r3}$ in series.

In this embodiment, three separated transformers $TR_1$, $TR_2$, and $TR_3$ are used. Each transformer has one primary side winding and one secondary side winding. A first end of each transformer's primary side winding is connected to a middle point (points B, D and F) of the lower half bridge of each serial-half-bridge. A second end of each transformer's primary side winding is coupled to the other side of each resonant tank. Three phase diode bridges 820 in parallel perform the secondary side rectification.

Figure 8B:
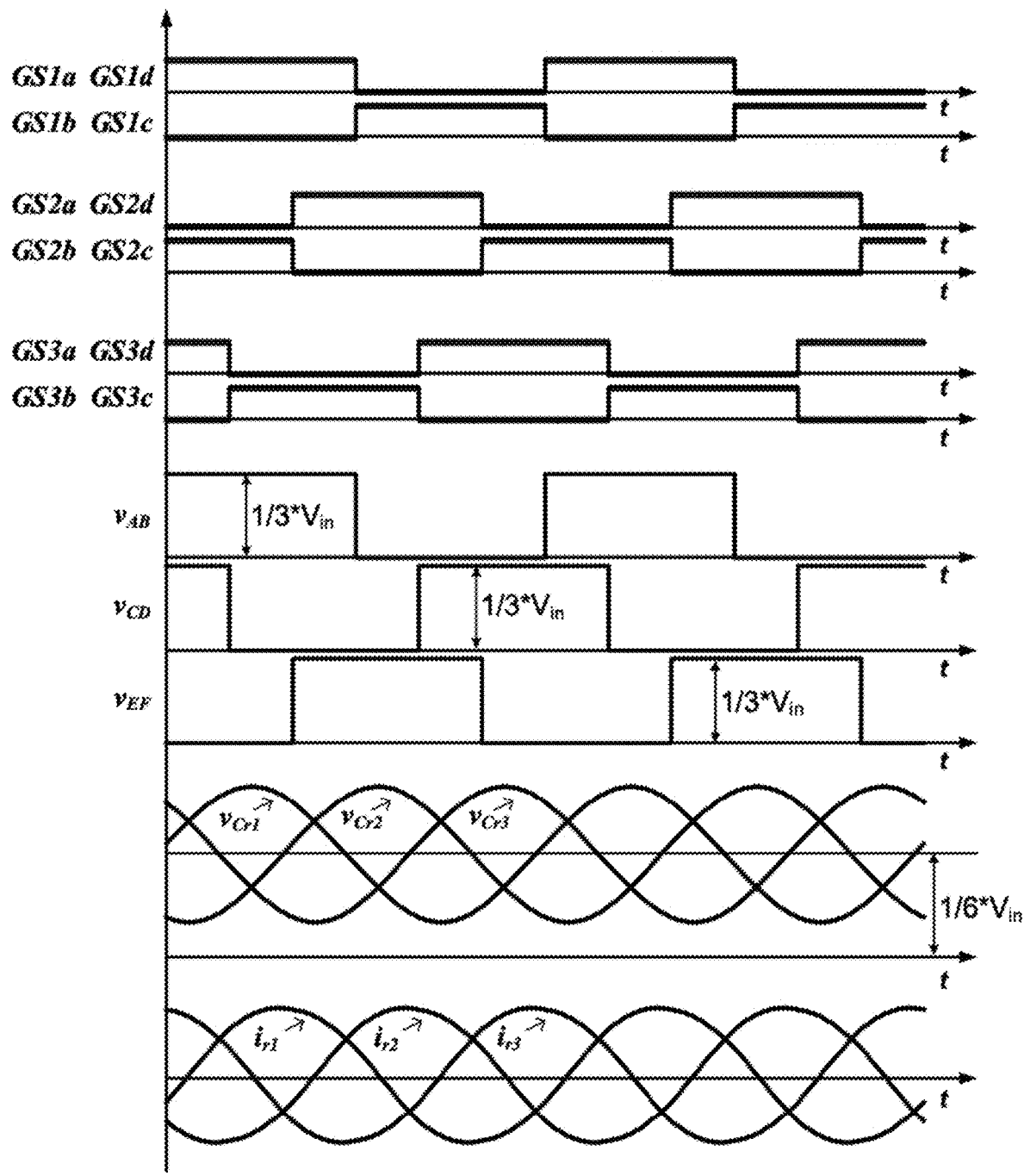
FIG. 8B illustrates the timing diagrams for the converter in FIG. 8A under variable frequency control for switch control signals GS1 to GS6, full bridge output voltage $V_{AB}$ to $V_{EF}$, resonant capacitor voltage $V_{cr1}$ to $V_{cr3}$, and resonant current $i_{r1}$ to $i_{r3}$.

Variable switching frequency control can be used to regulate the output voltage and output power of the stacked serial half bridge resonant converter 800. FIG. 8B illustrates the timing diagrams for the converter in FIG. 8A under variable frequency control for switch control signals GS1 to GS6, full bridge output voltage $V_{AB}$ to $V_{EF}$, resonant capacitor voltage $V_{cr1}$ to $V_{cr3}$, and resonant current $i_{r1}$ to $i_{r3}$. As shown in FIG. 8B, all switches operate with the same switching frequency and have identical duty cycles of approximately 50%. To achieve zero-voltage-switching of the complementary-operated primary side switches of the same leg, a small dead time is provided between the turn-on and turn-off instants of these complementary-operated switches. The switch control signals of each serial half bridge are interleaved with each other with a phase shift angle of 120°. The peak-to-peak output voltage of each serial-half-bridge is ⅓ of the input voltage. The resonant capacitor voltages $v_{cr1}$ to $v_{cr3}$ have a DC bias voltage, which is equal to ⅙ of the input voltage. The resonant currents in three resonant tanks are sinusoid if the magnetizing current is negligible, when the resonant converter operates at its resonant frequency. Due to the interleaved switch control signals, the resonant currents are interleaved with each other with a phase shift angle of 120°. The interleaved currents provide the minimal ripple on the components to further improve the converter performance.

Figure 8C:
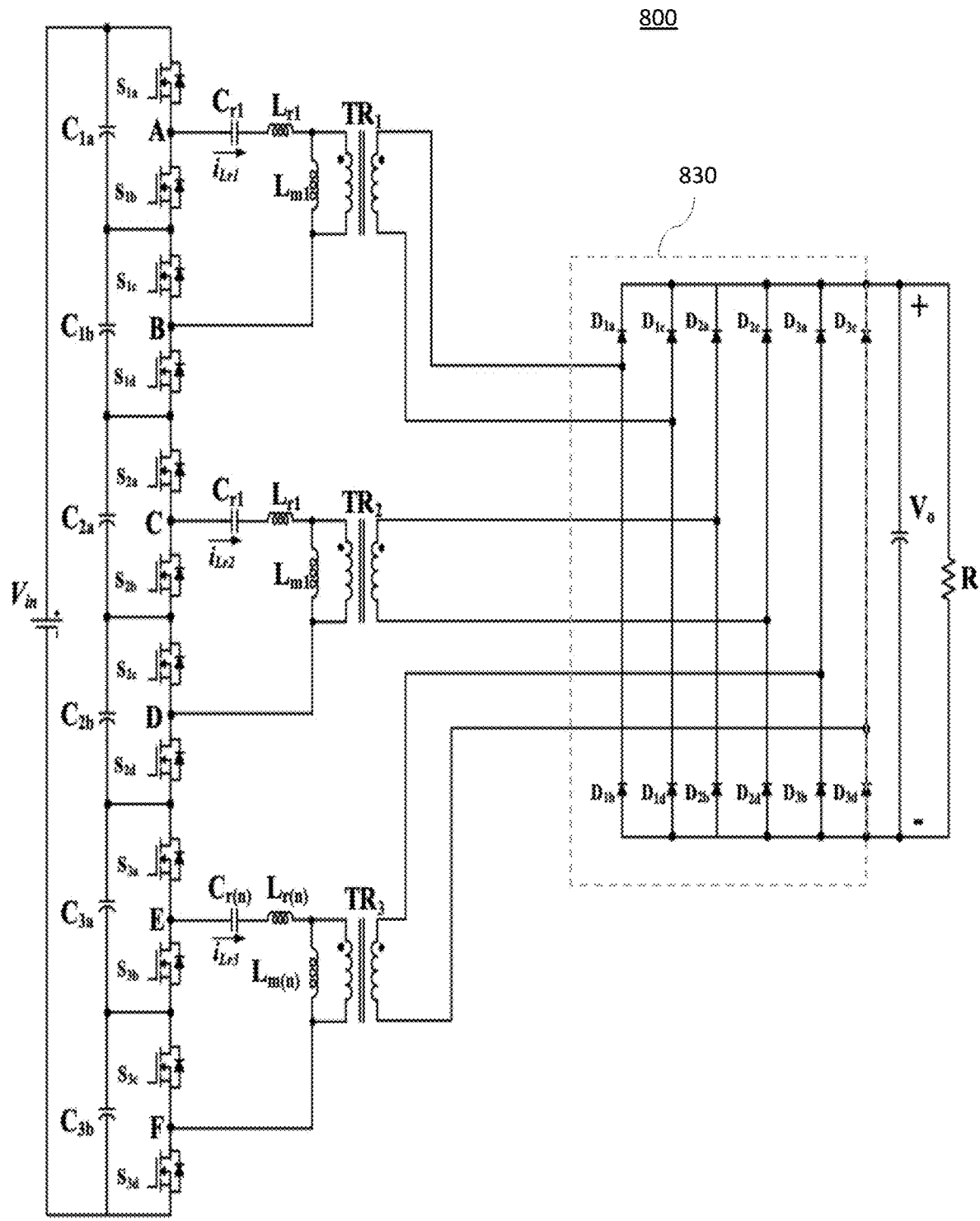
FIG. 8C illustrates a three-stacked serial half bridge resonant converter with three full-wave diode bridges in parallel for rectification, in accordance with an embodiment of the present disclosure.

FIG. 8C illustrates a three-stacked serial half bridge resonant converter 800 with three full-wave diode bridges 830 in parallel for rectification, in accordance with an embodiment of the present disclosure. As shown in FIG. 8B, a total of three full-wave diode bridges are implemented on the secondary side in order to reduce the current stress of the secondary diodes in FIG. 8A. The control signals of the primary side switches are the same as those shown in FIG. 8B.

n-Stacked Serial-Half-Bridge Resonant Converter

Figure 9A:
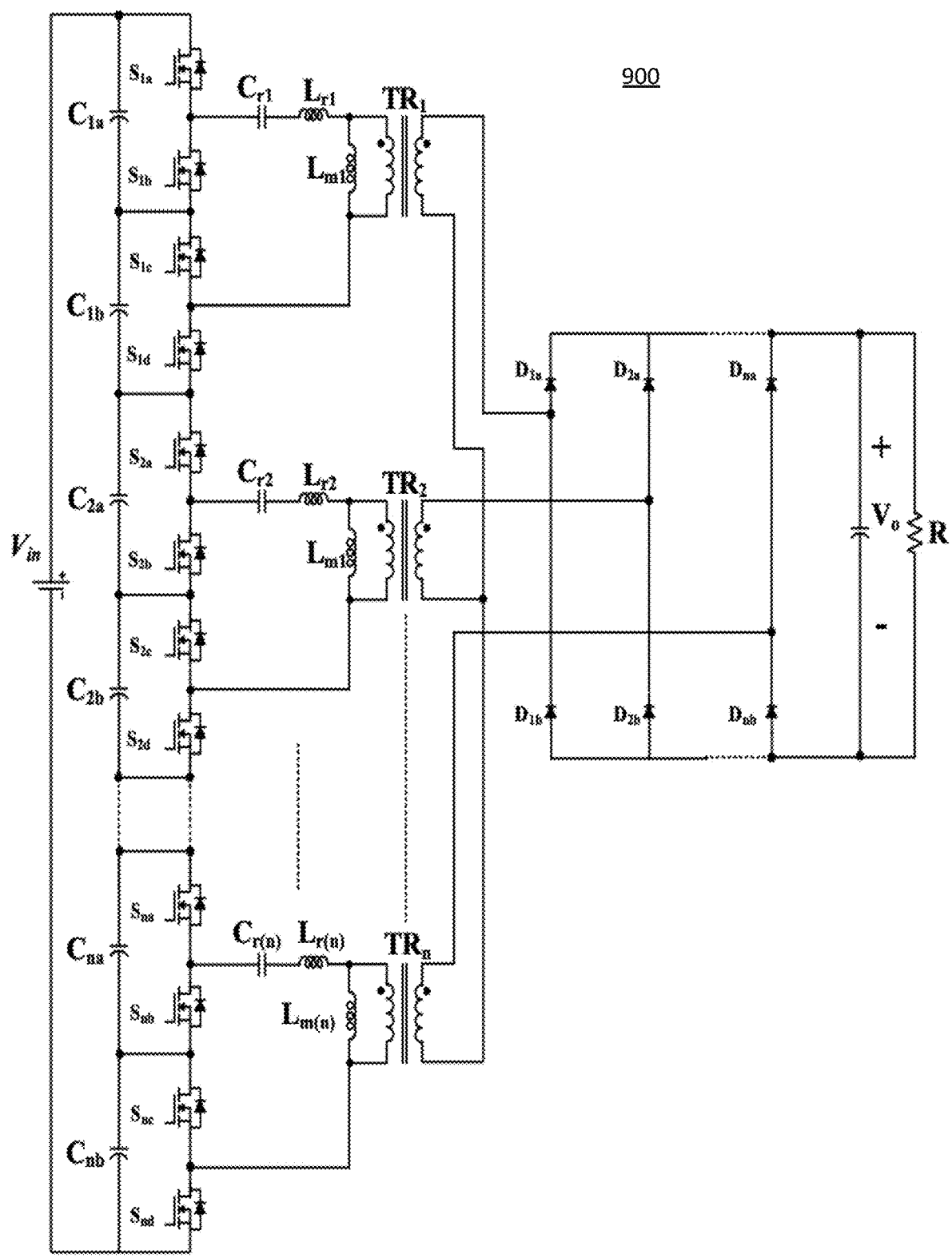
FIG. 9A illustrates an n-stacked serial half bridge resonant converter with total n half-wave diode bridges in parallel for rectification, in accordance with an embodiment of the present disclosure.

FIG. 9A illustrates an n-stacked serial half bridge resonant converter 900 with a total of n half-wave diode bridges in parallel for rectification, in accordance with an embodiment of the present disclosure. Resonant converter 900 employs n serial half bridges in stack, where each serial half bridge includes two half bridge in series. The (m)th serial half bridge has four active switches $S_{ma}$, $S_{mb}$, $S_{mc}$ and $S_{md}$, together with two input capacitors $C_{ma}$ and $C_{mb}$, where m can be any positive integer not larger than n. One of the two middle points of the (m)th serial half bridge is connected to a resonant tank which includes a resonant capacitor $C_{rm}$ and resonant inductor $L_{rm}$ in series. A total of n separated transformers are used, and each transformer has one primary side winding and one secondary side winding. A first end of each transformer's primary side winding is connected to the other middle point of each serial half bridge and a second end of each transformer's primary side winding is connected to the other side of each resonant tank. A total of n half-wave diode bridges in parallel perform the secondary side rectification.

Variable switching frequency control can be used to regulate the output voltage and output power of the stacked serial half bridge resonant converter 900. All switches operate with the same switching frequency and have identical duty cycles of approximately 50%. To achieve zero-voltage-switching of the complementary-operated primary side switches of the same leg, a small dead time is provided between the turn-on and turn-off instants of these complementary-operated switches. The switch control signals of each serial half bridge are interleaved with each other with a phase shift of 360°/n. For example, the four control signals of the first serial half bridge have 360°/n degree phase shift angle with the four control signals of the second serial half bridge. The resonant currents for all n resonant tanks are sinusoid if the magnetizing current is negligible, when the resonant converter operates at its resonant frequency. Due to the interleaved switch control signals, each resonant current is interleaved with each other with a phase shift angle of 360°/n. The interleaved currents provide the minimal ripple on the components to further improve the converter performance.

The total n number of separated transformers can be integrated to less than n transformers. For example, FIG. 9B illustrates an n-stacked serial half bridge resonant converter with an integrated transformer, in accordance with an embodiment of the present disclosure.

Figure 9B:
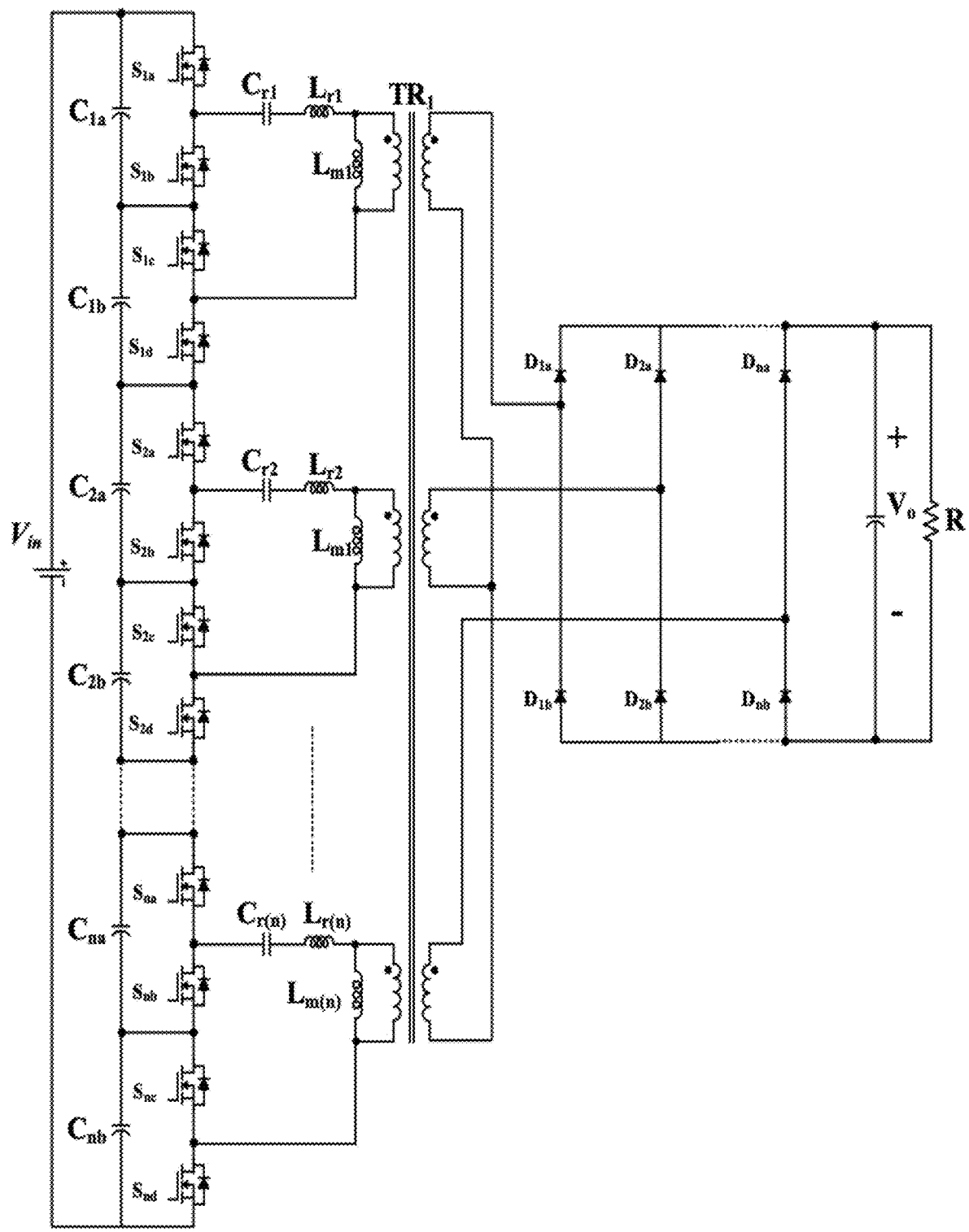
FIG. 9B illustrates an n-stacked serial half bridge resonant converter with an integrated transformer, in accordance with an embodiment of the present disclosure.
Figure 9C:
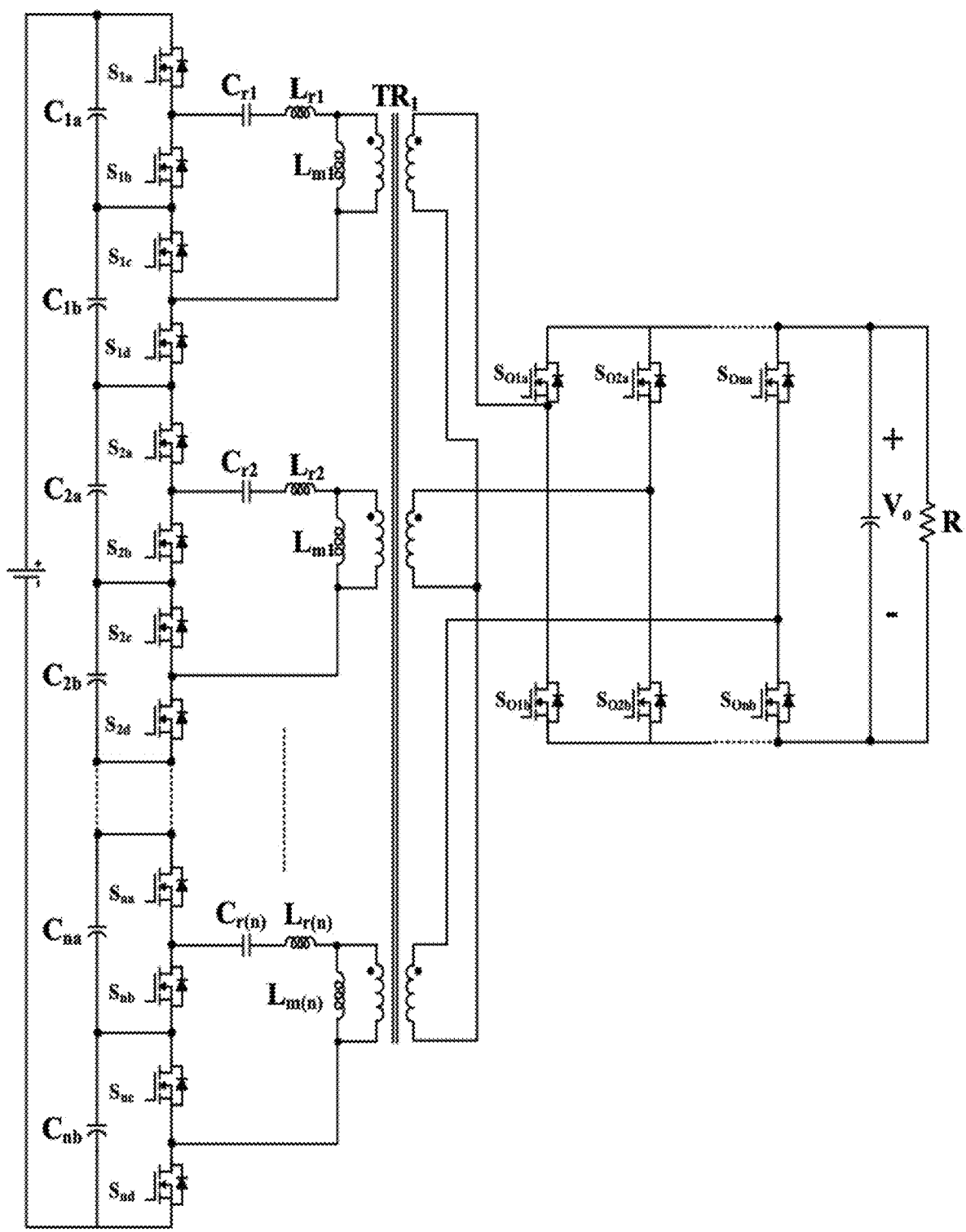
FIG. 9C illustrates an n serial half bridge resonant converter with active switches on the secondary side for synchronous rectification and bidirectional operation, in accordance with an embodiment of the present disclosure.

All of the secondary side diodes in FIG. 9B can be replaced with active switches for synchronous rectification to improve the converter efficiency. Resonant converter 900 can provide bidirectional power flow with the active switches on both input and output sides. FIG. 9C illustrates an n-stacked serial half bridge resonant converter with active switches on the secondary side for synchronous rectification and bidirectional operation, in accordance with an embodiment of the present disclosure. As shown in FIG. 9C, the 2n diodes on the secondary side in FIG. 9B are replaced with 2n active switches.

Figure 9D:
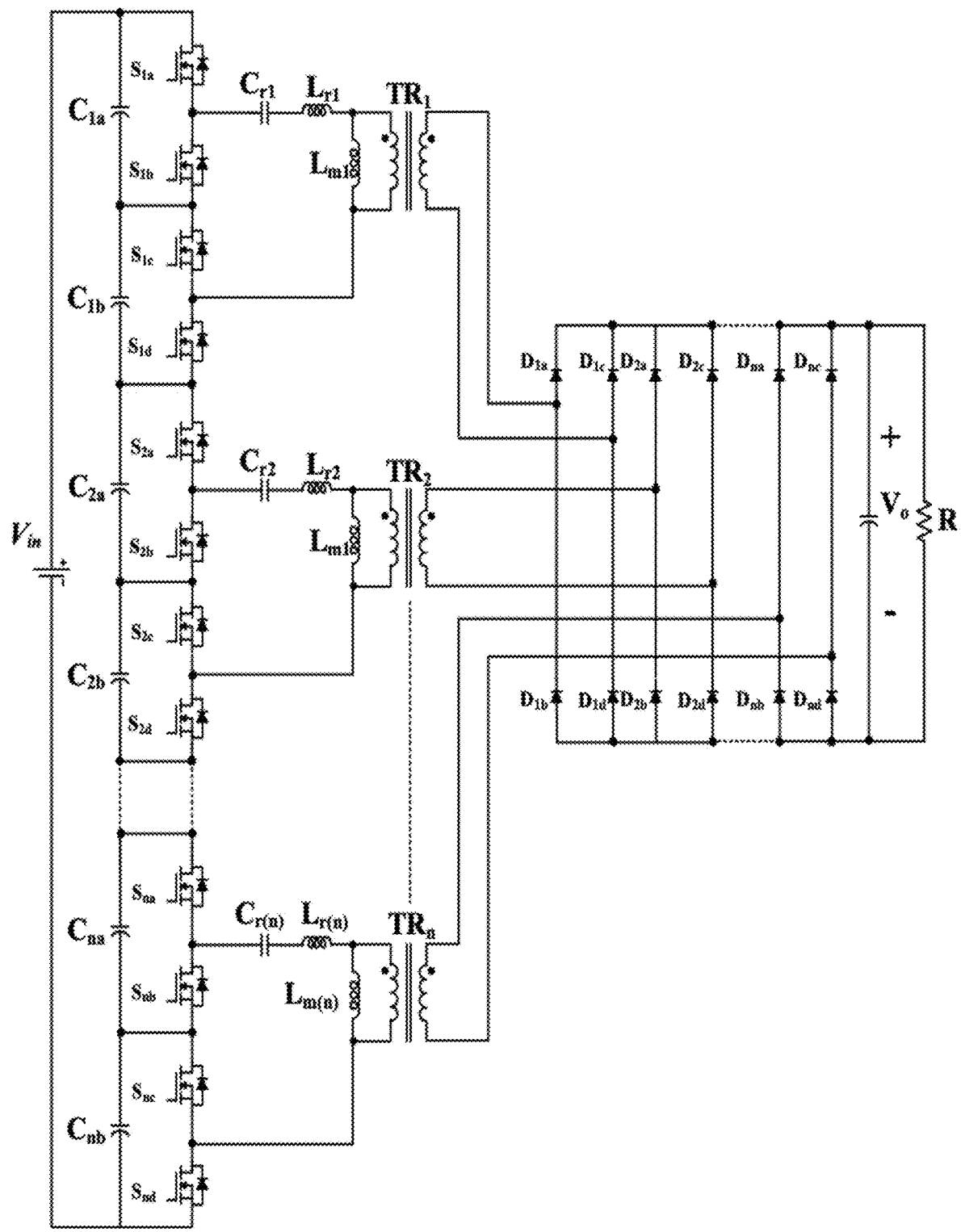
FIG. 9D illustrates an n-stacked serial half bridge resonant converter with total n full-wave diode bridges in parallel for rectification, in accordance with an embodiment of the present disclosure.

FIG. 9D illustrates an n-stacked serial half bridge resonant converter with total n full-wave diode bridges in parallel for rectification, in accordance with an embodiment of the present disclosure. A total of n full-wave diode bridges (i.e., a total of 4n diodes) is implemented on the secondary side in order to reduce the current stress of the secondary side diodes in FIG. 9A. The control signals of the primary side switches are the same as those in FIG. 9A. The transformer integration and active switches on the secondary side can also be implemented in this structure.

C. Input Capacitor Voltage Balancing Control Method
Voltage Balancing Control Method for Stacked Half Bridge Resonant Converter One challenge to operate a stacked half bridge resonant converter is to balance the input capacitor voltages when mismatches exist in the practical circuit, like capacitor equivalent series resistances (ESR) mismatch, timing mismatch of gate signals for the switches and the resonant parameters mismatch under practical tolerance.

Figure 4A:
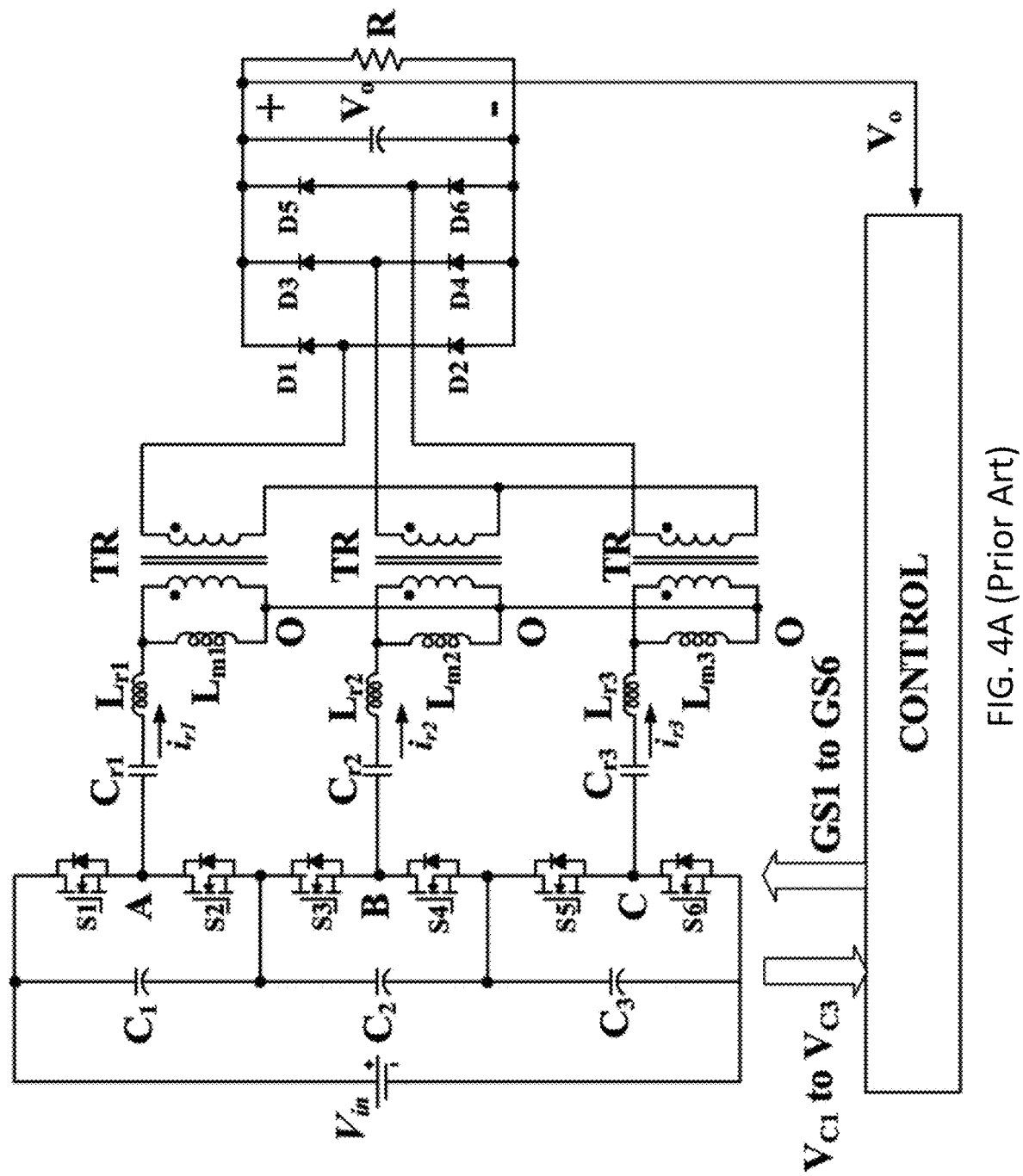
FIGS. 4A and 4B respectively illustrate the topology of a multi-phase multi-level LLC resonant converter with three modules and its timing diagrams of switch-control.
Figure 4B:
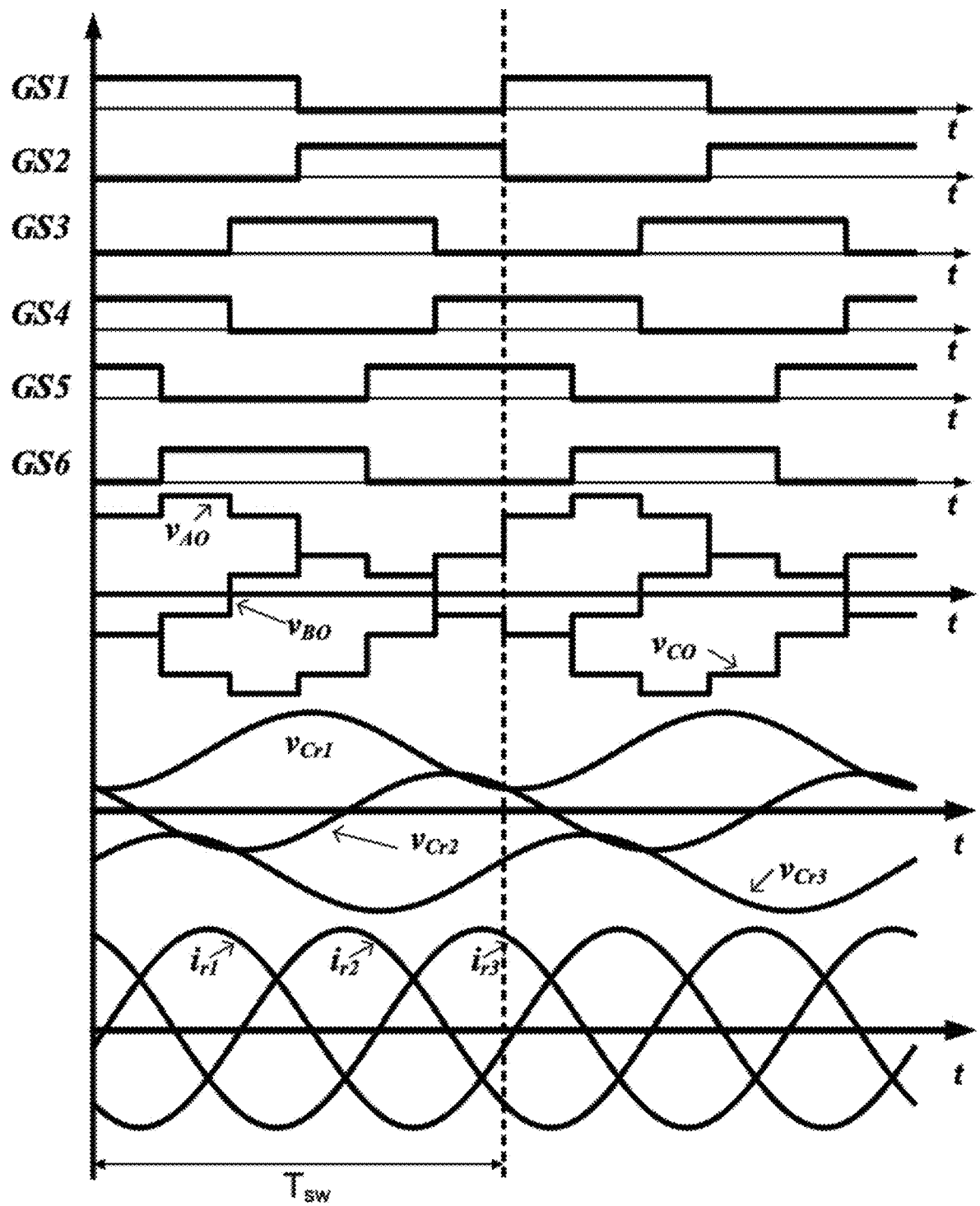
Figure 10A:
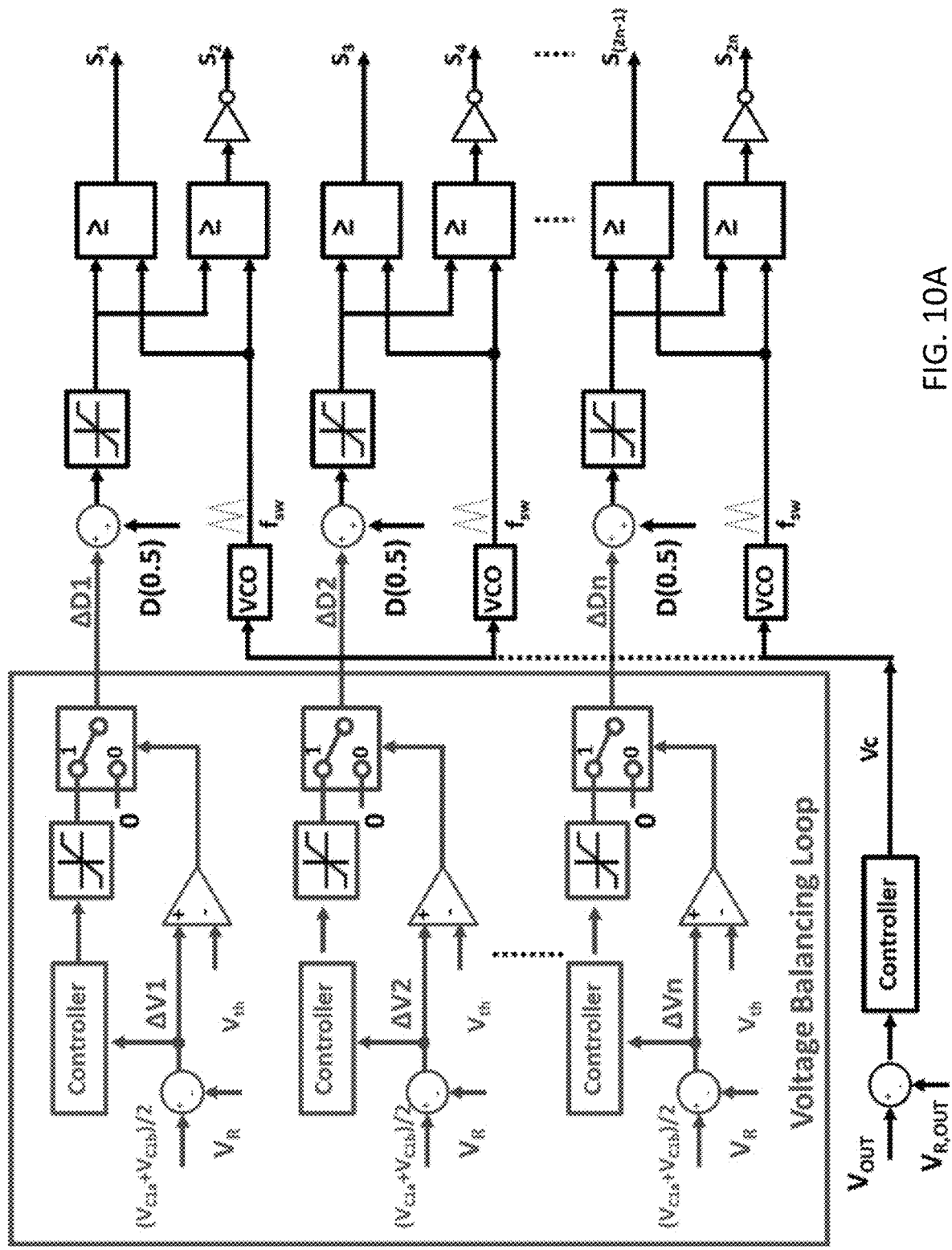
FIG. 10A illustrates a voltage balancing control diagram based on duty cycle method for a stacked half bridge resonant converter, in accordance with an embodiment of the present disclosure.
Figure 10B:
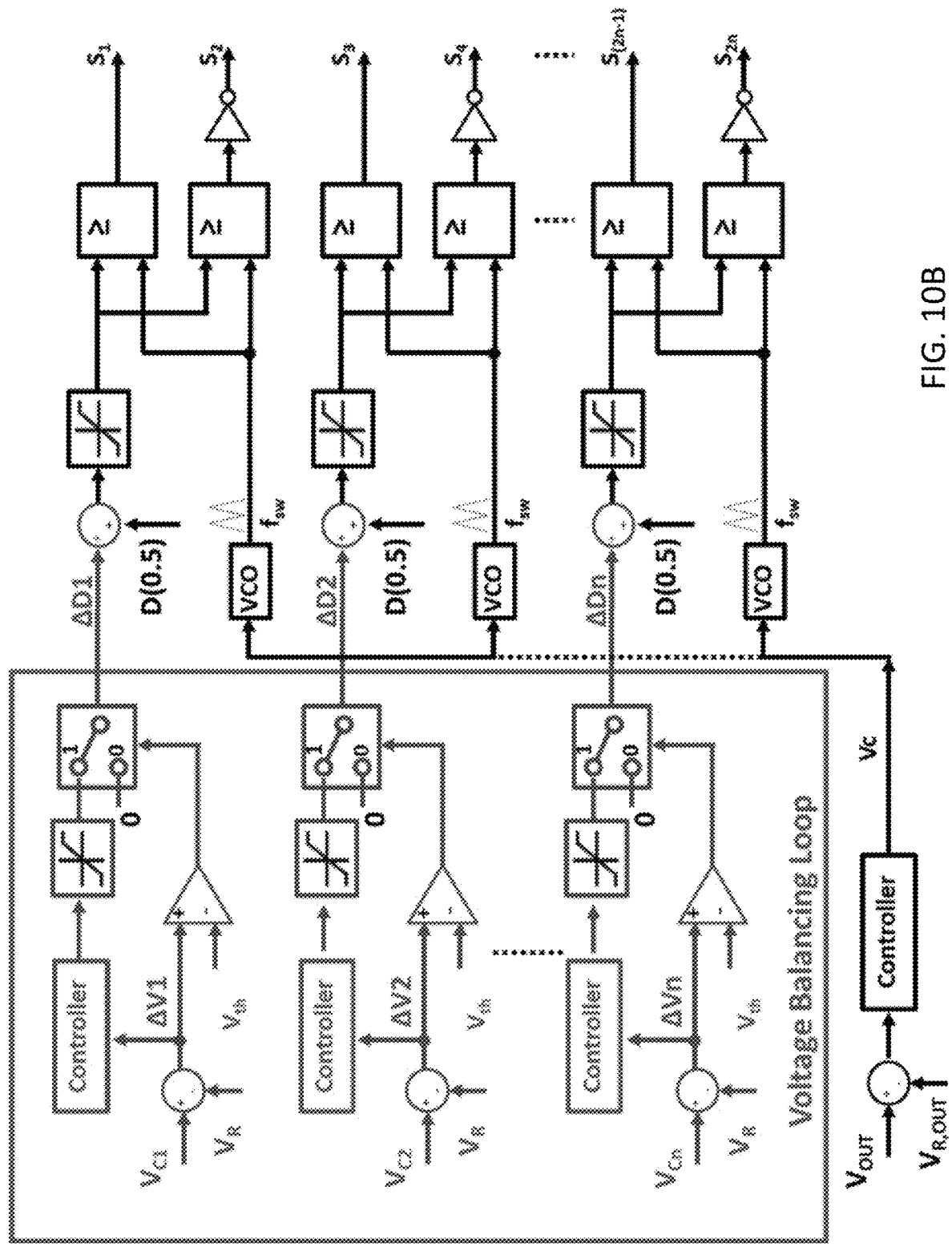
FIG. 10B illustrates a voltage balancing control diagram based on duty cycle method for a stacked half bridge resonant converter with star connection of transformers, in accordance with an embodiment of the present disclosure.

Various approaches are possible to balance the input capacitor voltages for different primary stacking structures. The first one is to adjust the duty cycle of the control signals of the switches. FIG. 10A illustrates a voltage balancing control diagram based on duty cycle method for the stacked half bridge resonant converter in FIG. 7A, in accordance with an embodiment of the present disclosure. The voltages of the two capacitors for the (m)th half bridge cell are sensed as $V_{Cma}$ and $V_{Cmb}$. Average value of the capacitor voltages of each half bridge cell is calculated and compared with a reference voltage $V_R$. When the difference is greater than a predefined threshold voltage $V_{th}$, a proper modified duty cycle is then generated by a dedicated controller and then implemented to balance the capacitor voltage. This approach can also be implemented in the converter in FIG.4 with a star connection of the transformers. Because each half bridge cell is coupled with only one input capacitor, the capacitor voltage is directly sensed and compared with the reference voltage. FIG. 10B illustrates a voltage balancing control diagram based on duty cycle method for a stacked half bridge resonant converter with star connection of transformers, in accordance with an embodiment of the present disclosure.

Another approach is to adjust the phase shift angle between the control signals of each half bridge cell. Ideally, 360°/n phase shift angle is implemented between the control signals of each half bridge cell. When detected voltage imbalance by the sensing circuit is greater than a predefined threshold voltage $V_{th}$, a proper modified phase shift angle is then implemented to each phase leg to balance the capacitor voltage by changing the power delivered from each phase capacitor to the resonant tank.

Figure 10C:
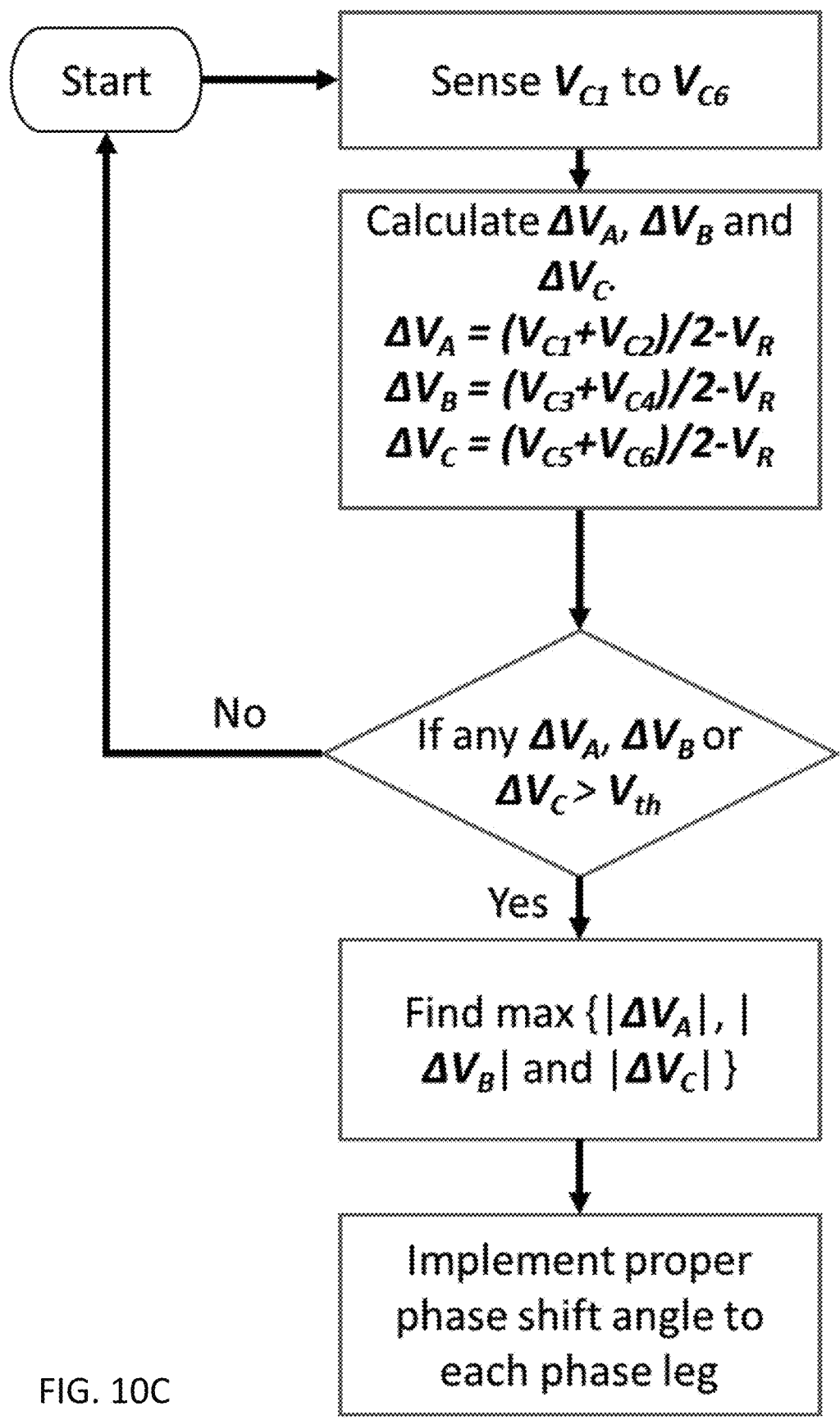
FIG. 10C illustrates a voltage balancing control flow chart based on phase shift method for a three-stacked half bridge resonant converter, in accordance with an embodiment of the present disclosure.

FIG. 10C illustrates a voltage balancing control flow chart based on phase shift method for a three-stacked half bridge resonant converter, in accordance with an embodiment of the present disclosure. As shown in FIG. 10C, the voltages of a total of six input capacitors are sensed. Then, imbalance voltage for each phase $\Delta V_A$, $\Delta V_B$, and $\Delta V_C$, is calculated. If any of the imbalance voltage is greater than a threshold voltage $V_{th}$, proper modified phase shift angle is then implemented to each phase leg.

Figure 10D:
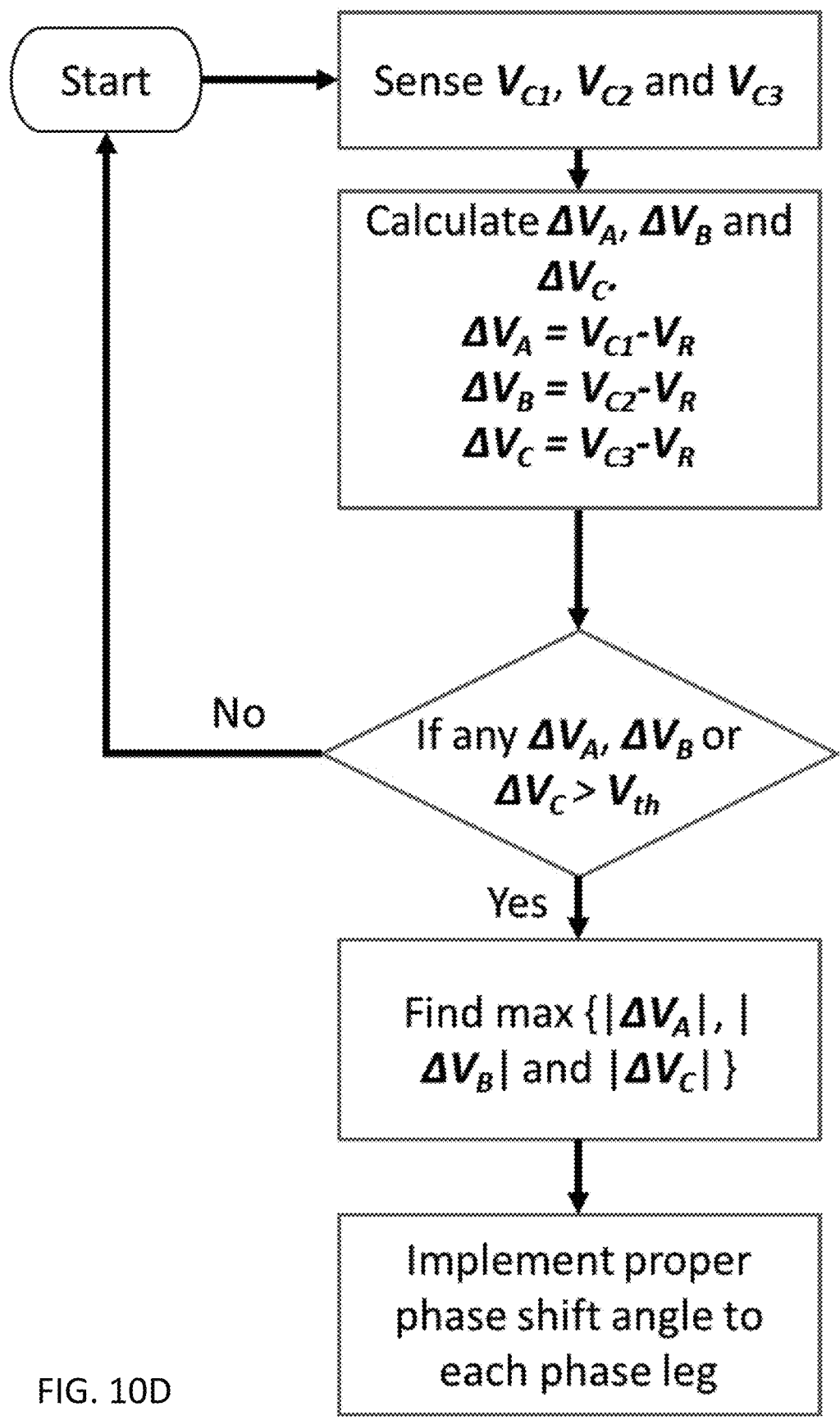
FIG. 10D illustrates a voltage balancing control flow chart based on phase shift method for a three-stacked half bridge resonant converter with star connection of transformers, in accordance with an embodiment of the present disclosure.

FIG. 10D illustrates a voltage balancing control flow chart based on phase shift method for a three-stacked half bridge resonant converter with star connection of transformers, in accordance with an embodiment of the present disclosure. As shown in FIG. 10D, the voltages of three input capacitors are sensed and imbalance voltage for each phase, $\Delta V_A$, $\Delta V_B$ and $\Delta V_C$, is then calculated. If any of the imbalance voltage is greater than a threshold voltage $V_{th}$, proper modified phase shift angle is then implemented to each phase leg.

Figure 10E:
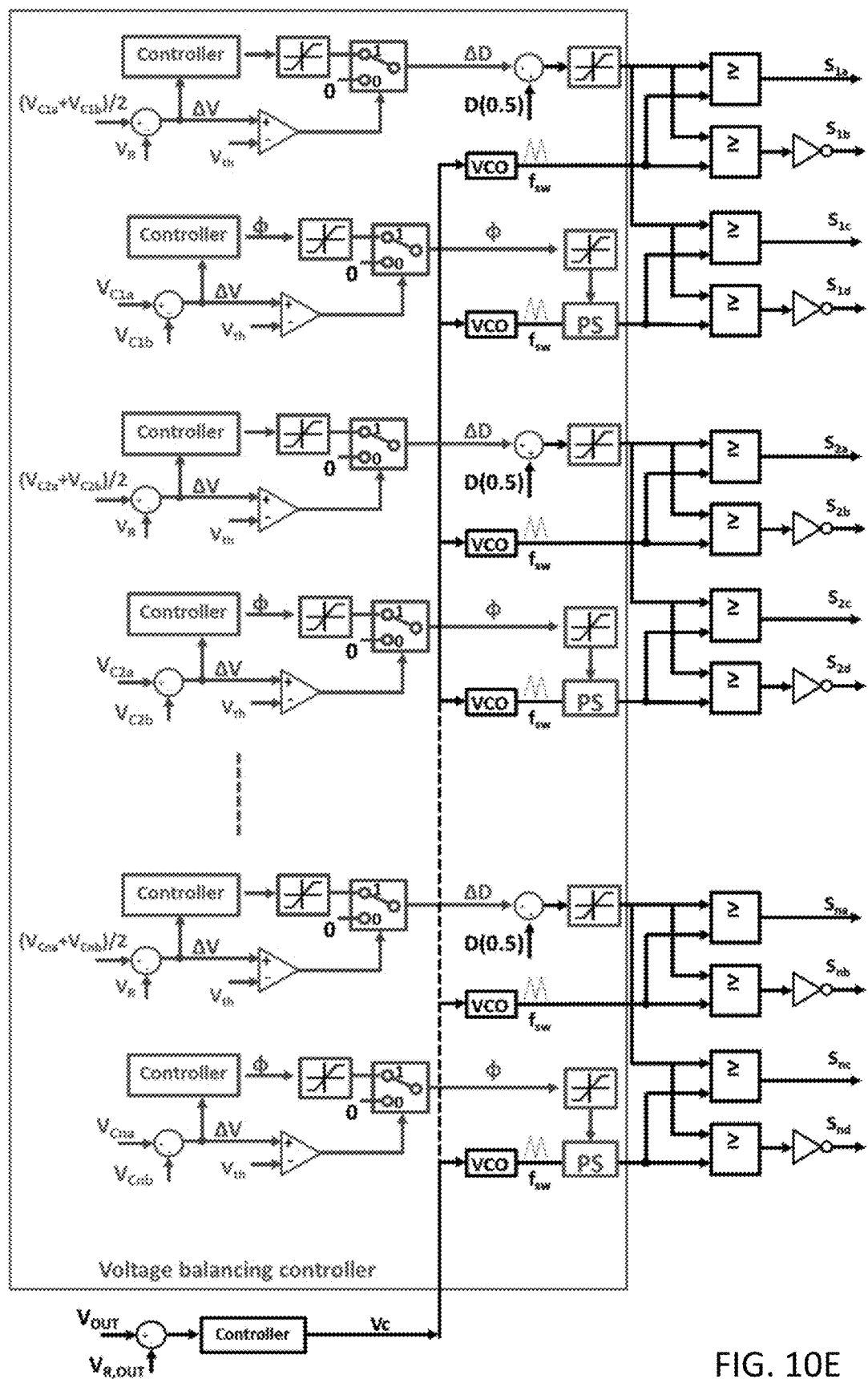
FIG. 10E illustrates a voltage balancing control diagram based on a hybrid method for a stacked serial half bridge resonant converter, in accordance with an embodiment of the present disclosure.

Voltage Balancing Control Method for Stacked Serial-Half-Bridge Resonant Converter A hybrid control scheme including two control loops can balance the input capacitor voltages in stacked serial-half-bridge resonant converter. FIG. 10E illustrates a voltage balancing control diagram based on a hybrid method for a stacked serial half bridge resonant converter, in accordance with an embodiment of the present disclosure. The first loop of the hybrid control scheme is the internal voltage balancing loop in each serial half bridge cell aiming to balance the two capacitor voltages inside each cell. The voltages of the two capacitors in each serial half bridge cell are sensed and compared with each other. If a voltage difference between these two capacitors is greater than a predefined threshold voltage $V_{th}$, a phase shift angle command is generated by a dedicated controller. The phase shift angle is then implemented between the switch control signals of the first half bridge and the second half bridge. In other words, each serial half bridge cell has its own internal phase shift angle between the switch signals of its first half bridge and its second half bridge, where the phase shift angle is calculated based on the voltage difference between its first input capacitor voltage and its second input capacitor voltage.

The second loop of the control scheme is the external voltage balancing loop between all serial-half-bridge cells aiming to balance the average capacitor voltage of each cell. The voltages of the two capacitors in each serial-half-bridge cell are sensed and the average voltage of each cell is then calculated. The average voltage in then compared with the reference voltage. If the voltage difference is greater than the predefined threshold voltage, an extra duty cycle is generated by a dedicated controller. The extra duty cycle is implemented to all four switch control signals in a corresponding serial-half-bridge cell. In other words, each-serial-half bridge cell has its own extra duty cycle, where the extra duty cycle is calculated based on the voltage difference between its average capacitor voltage and the reference voltage. It is appreciated that the extra duty cycle can have a positive value or negative value with respect to the original duty cycle.

Figure 11A:
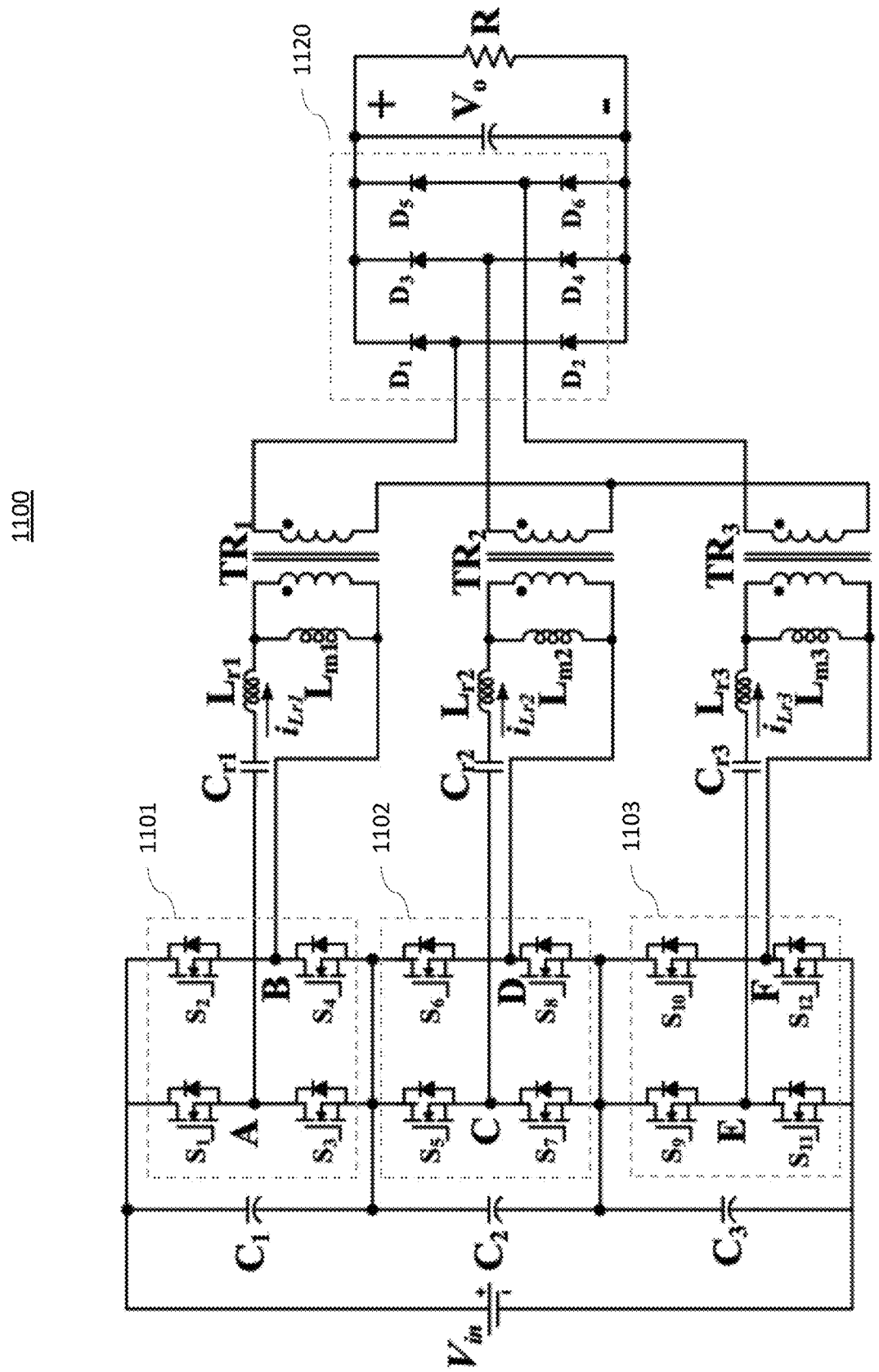
FIG. 11A illustrates a three stacked full bridge resonant converter, in accordance with an embodiment of the present disclosure.

D. Stacked Full Bridge Resonant Converter
Three Stacked Full Bridge Resonant Converter FIG. 11A illustrates a three stacked full bridge resonant converter 1100, in accordance with an embodiment of the present disclosure. Converter 1100 employs three full bridge inverter cells 1101, 1102, and 1103 stacked together with three input capacitors $C_1$ to $C_3$ in series to block the DC input voltage. In this embodiment, a transformer stage includes three separated transformers $TR_1$, $TR_2$, and $TR_3$, and each transformer includes a primary side winding, a secondary side winding, and a transformer core.

As shown in FIG. 11A, first full bridge inverter cell 1101 includes four switches $S_1$, $S_2$, $S_3$, and $S_4$. Point A between switches $S_1$ and $S_3$ is connected to one end of a resonant tank including a resonant capacitor $C_{r1}$ and a resonant inductor $L_{r1}$ in series. A first end of the primary side winding of transformer $TR_1$ is connected to the other side of the resonant tank. A second end of the primary side winding of transformer $TR_1$ is connected to point B between switches $S_2$ and $S_4$.

Likewise, second full bridge inverter cell 1102 includes four switches $S_5$, $S_6$, $S_7$, and $S_8$. Point C between switches $S_5$ and $S_7$ is connected to one end of a resonant tank including a resonant capacitor $C_{r2}$ and a resonant inductor $L_{r2}$ in series. A first end of the primary side winding of transformer $TR_2$ is connected to the other side of the resonant tank. A second end of the primary side winding of transformer $TR_2$ is connected to point D between switches $S_6$ and $S_8$.

Moreover, third full bridge inverter cell 1103 includes four switches $S_9$, $S_{10}$, $S_{11}$, and $S_{12}$. Point E between switches $S_9$ and $S_{11}$ is connected to one end of a resonant tank including a resonant capacitor $C_{r3}$ and a resonant inductor $L_{r3}$ in series. A first end of the primary side winding of transformer $TR_3$ is connected to the other side of the resonant tank. A second end of the primary side winding of transformer $TR_3$ is connected to point F between switches $S_{10}$ and $S_{12}$.

Three phase diode bridges 1120 in parallel perform the secondary side rectification, which is coupled with the secondary side windings of the three transformers $TR_1$, $TR_2$, and $TR_3$.

Figure 11B:
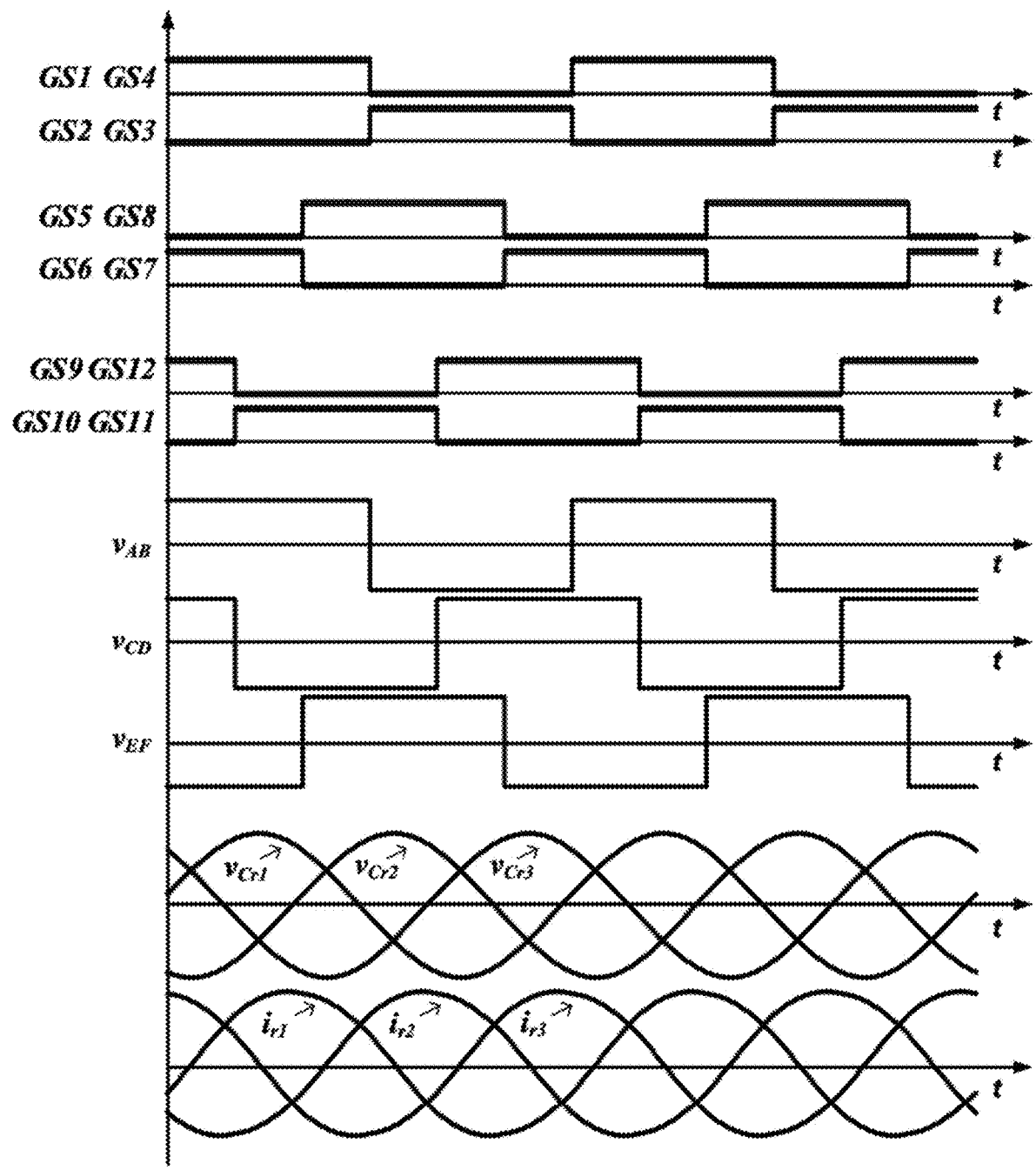
FIG. 11B illustrates the timing diagrams for the converter in FIG. 11A under variable frequency control for switch control signals GS1 to 12 full bridge output voltage $V_{AB}$ to $V_{EF}$, resonant capacitor voltage $V_{cr1}$ to $V_{cr3}$, and resonant current $i_{r1}$ to $i_{r3}$.

Variable switching frequency control can be used to regulate the output voltage and output power of three-stacked full bridge resonant converter. FIG. 11B illustrates the timing diagrams for the converter in FIG. 11A under variable frequency control for switch control signals GS1 to GS12 full bridge output voltage $V_{AB}$ to $V_{EF}$, resonant capacitor voltage $V_{cr1}$ to $V_{cr3}$, and resonant current $i_{r1}$ to $i_{r3}$. shown in FIG. 11B, all switches operate with the same switching frequency and have identical duty cycles of approximately 50%. To achieve zero-voltage-switching of the complementary-operated primary side switches of the same leg, a small dead time is provided between the turn-on and turn-off instants of these complementary-operated switches. The switch control signals of each full bridge are interleaved with each other full bridge control signals with a phase shift of 120°. For example, GS1 and GS4 have 120° phase shift angle with respect to GS5 and GS8. The resonant tank input voltage $V_{AB}$, $V_{CD}$, and $V_{EF}$ do not have a DC bias because each transformer is connected directly to the resonant tank. Similarly, resonant capacitor voltages $V_{cr1}$, $V_{cr2}$, and $V_{cr3}$ do not have a DC bias either. The resonant currents for all three resonant tanks are pure sinusoid if the resonant converter operates at its resonant frequency and the magnetizing current is negligible. Each resonant current is interleaved with each other for a phase shift of 120° due to the interleaved switch control signals. This interleaved current can provide the minimal ripple on the components to further improve the converter performance.

n-stacked full bridge resonant converter

Figure 11C:
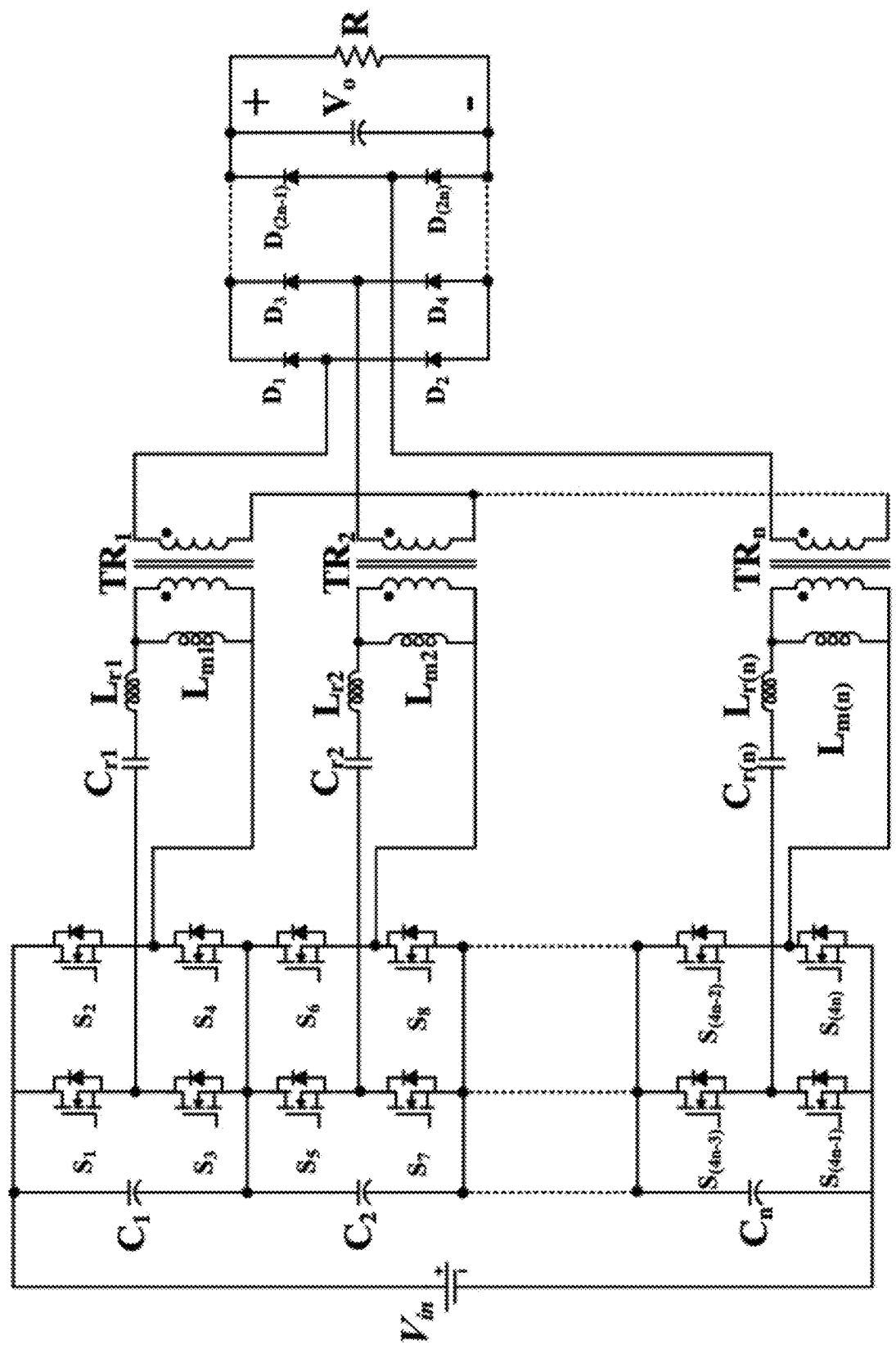
FIG. 11C illustrates an n-stacked full bridge resonant converter, in accordance with an embodiment of the present disclosure.

FIG. 11C illustrates an n-stacked full bridge resonant converter, in accordance with an embodiment of the present disclosure. The converter in FIG. 11 employs n full bridges in stack together with n input capacitors $C_1$ to $C_n$ in series to block the DC input voltage. One of the two middle points of each full bridge is connected to a resonant tank which includes a resonant capacitor and resonant inductor in series. Total n separated transformers are used, and each transformer has one primary side winding and one secondary side winding. The first end of each transformer's primary side winding is connected to the other middle point of the full bridge and the second end of each transformer's primary side winding is connected to the other side of each resonant tank. Total n half-wave diode bridges in parallel perform the secondary side rectification.

Variable switching frequency control can be used to regulate the output voltage and output power of n-stacked full bridge resonant converter. All switches operate with the same switching frequency and have identical duty cycles of approximately 50%. To achieve zero-voltage-switching of the complementary-operated primary side switches of the same leg, a small dead time is provided between the turn-on and turn-off instants of these complementary-operated switches. The switches control signals of each full bridge are interleaved with each other full bridge control signals with a phase shift of 360°/n. The resonant currents for all n resonant tanks are sinusoid if the magnetizing current is negligible when the resonant converter operates at its resonant frequency. Each resonant current is interleaved with each other with a phase shift of 360°/n due to the interleaved switch control signals. The interleaved currents provide the minimal ripple on the components to further improve the converter performance.

Figure 11D:
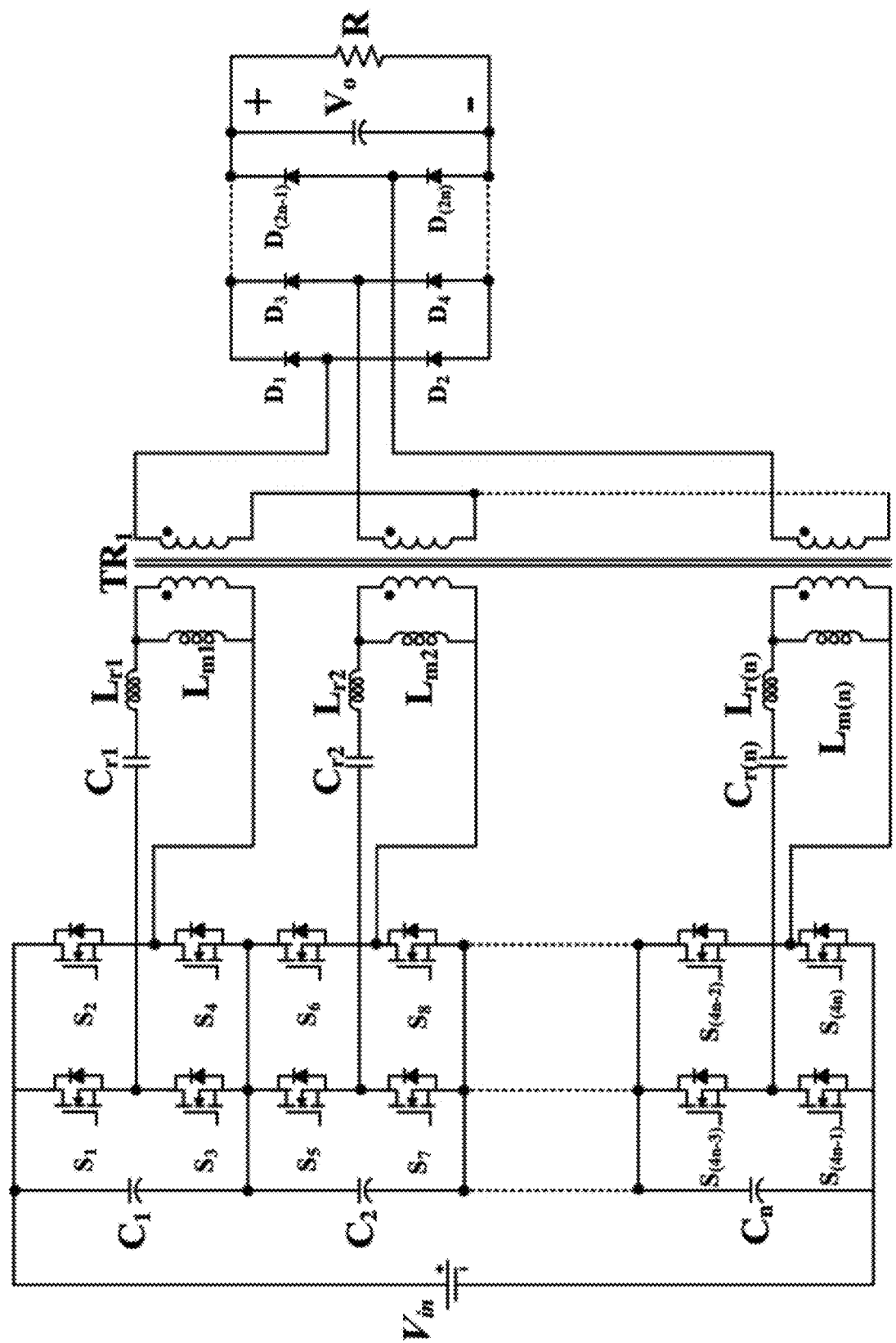
FIG. 11D illustrates an n-stacked full bridge resonant converter with an integrated transformer, in accordance with an embodiment of the present disclosure.

The total n number of the separated transformer can be integrated to less than n number of transformers to reduce the complexity of the system. For example, FIG. 11D illustrates an n-stacked full bridge resonant converter with a single integrated transformer, in accordance with an embodiment of the present disclosure. The single integrated transformer has total n windings on primary side and n windings on secondary side.

Figure 2A:
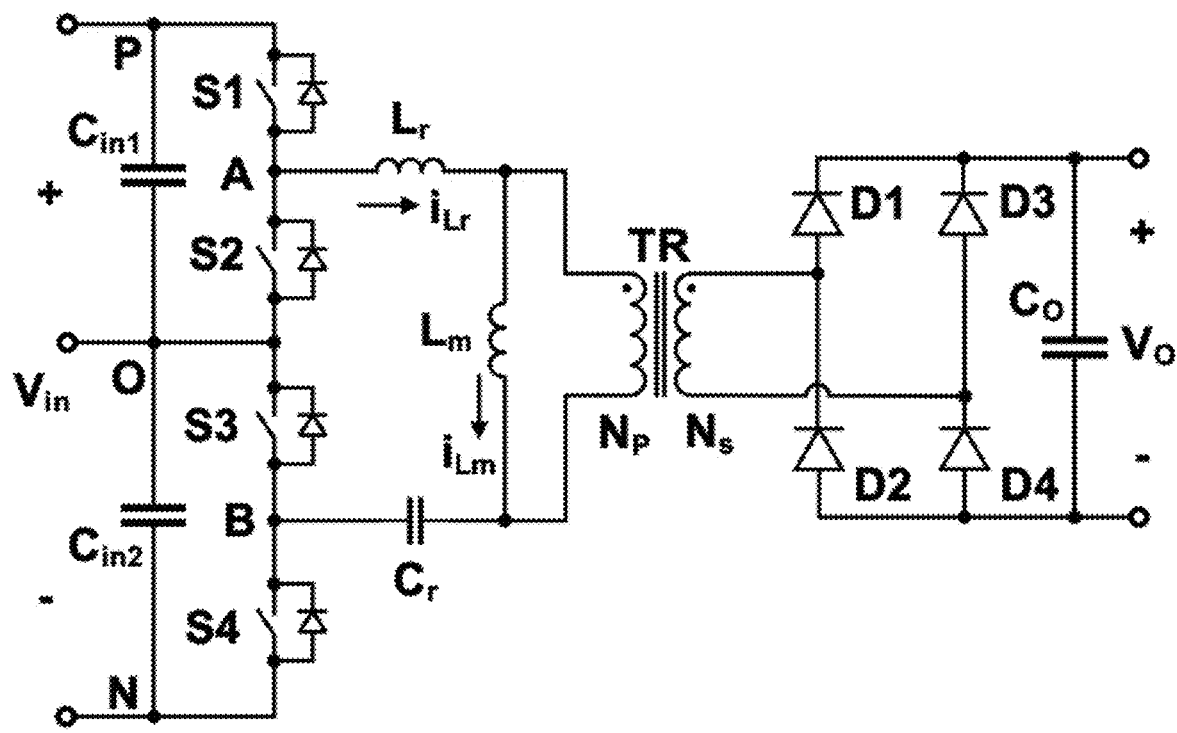
FIGS. 2A and 2B respectively illustrate an exemplary serial half bridge resonant converter and its timing diagrams of control signals for switches $S_1$ to $S_4$ and primary-side full-bridge output voltage $V_{AB}$.
Figure 2B:
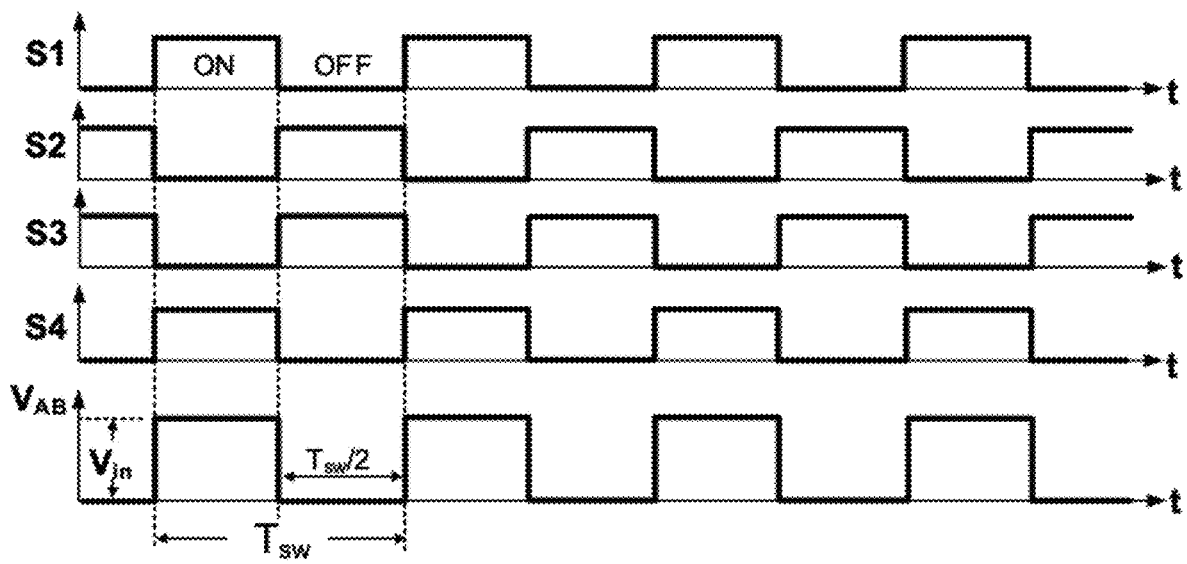
Figure 3A:
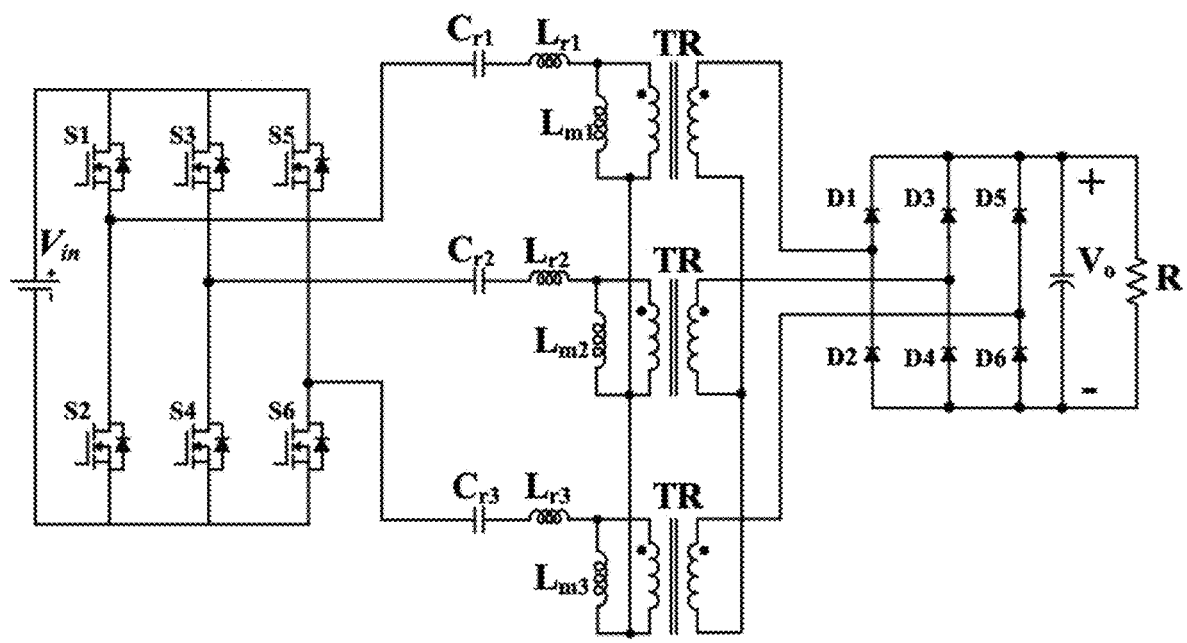
FIGS. 3A and 3B respectively illustrate the topology of a typical three phase LLC converter and its timing diagrams of switch-control.
Figure 3B:
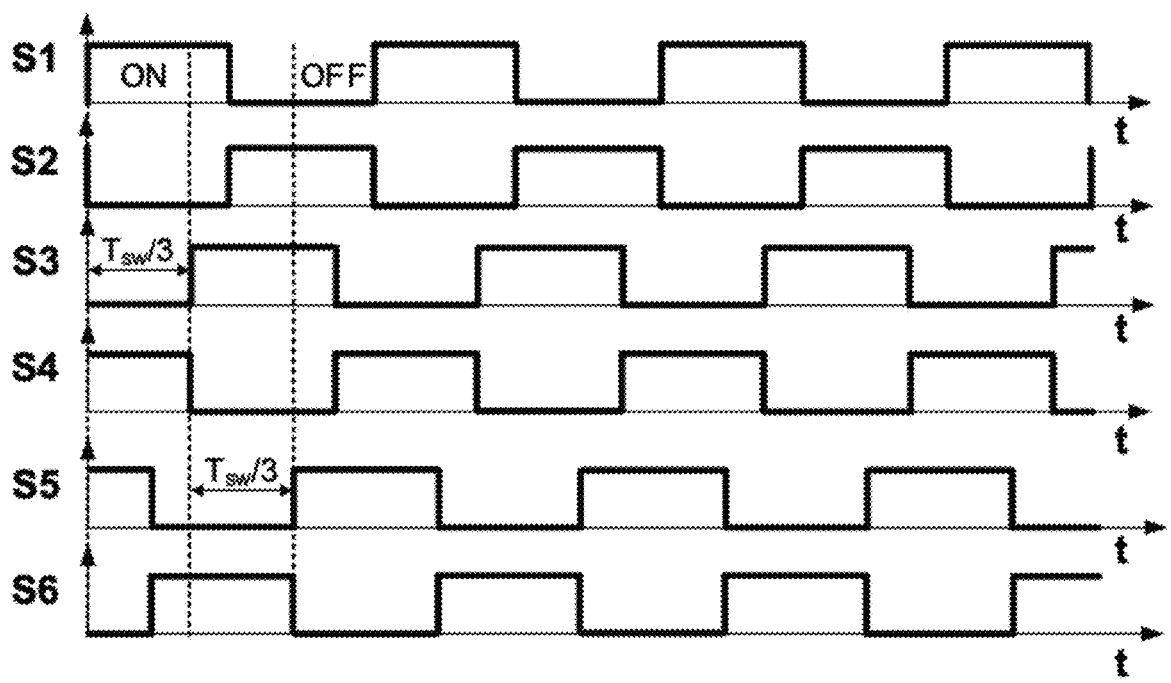
Figure 11E:
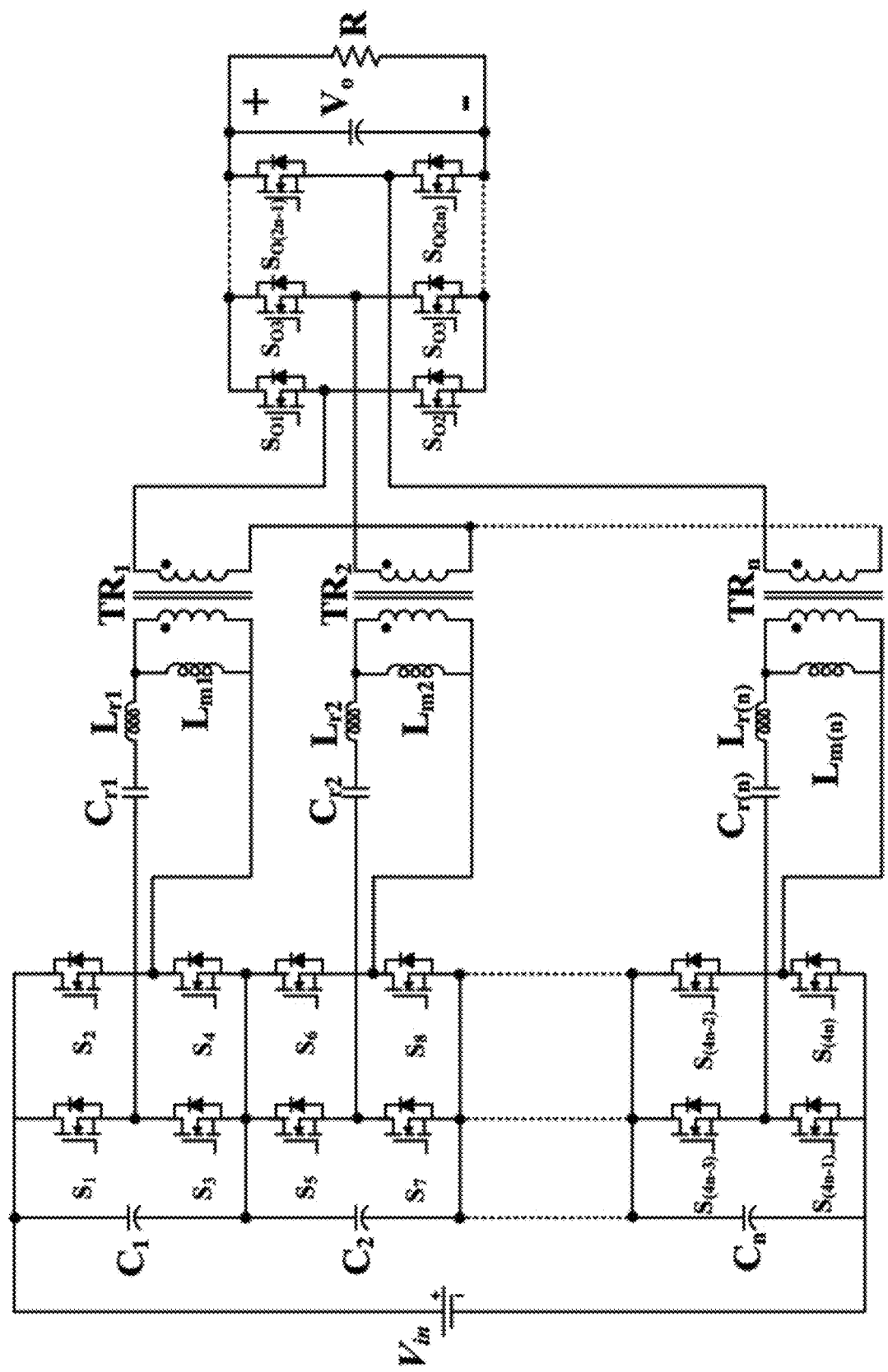
FIG. 11E illustrates an n-stacked full bridge resonant converter with active switches on the secondary side for synchronous rectification and bidirectional operation, in accordance with an embodiment of the present disclosure.

FIG. 11E illustrates an n-stacked full bridge resonant converter with active switches on the secondary side for synchronous rectification and bidirectional operation, in accordance with an embodiment of the present disclosure. As shown in FIG. 11E, 2n diodes are replaced with 2n active switches for synchronous rectification to improve the converter efficiency. The resonant converter is capable of providing bidirectional power flow with the active switches on both input and output side.

Stacked Half Bridge Rectifier with Transformer Star Connection

Figure 12A:
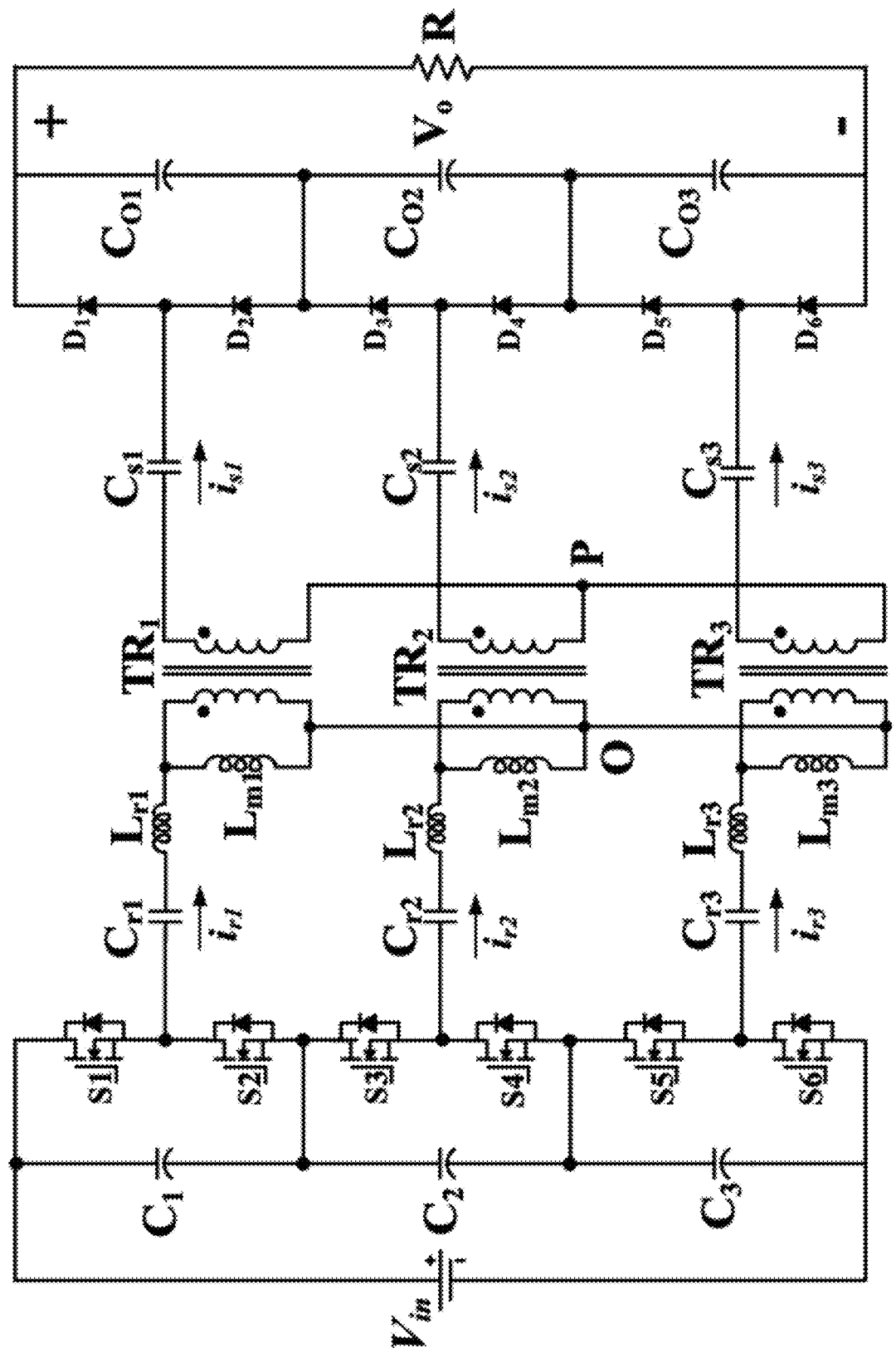
FIG. 12A illustrates a three stacked half bridge rectifier with transformer star connection applied in a three-phase resonant converter, in accordance with an embodiment of the present disclosure.

FIG. 12A illustrates a three stacked half bridge rectifier with transformer star connection applied in a three-phase resonant converter in accordance with an embodiment of the present disclosure. According to the embodiment, the three-phase resonant DC-DC converter includes a primary side, a secondary side, a transformer stage electrically coupled between the primary side and the secondary side, a control circuitry, and at least one resonant tank circuit electrically connected between the primary side and the transformer stage. In the embodiment, the transformer stage includes a first transformer $TR_1$, a second transformer $TR_2$, and a third transformer $TR_3$, and the at least one resonant tank circuit includes a first resonant tank circuit, a second resonant tank circuit, and a third resonant tank circuit. In the embodiment, each of the transformers $TR_1$, $TR_2$, and $TR_3$ includes a transformer core, a primary side winding wound on the transformer core, and a secondary side winding wound on the transformer core. The primary side includes a serial stack of at least two half-bridge inverter cells, each including two active switches $S_1$ and $S_2$, $S_3$ and $S_4$, or $S_5$ and $S_6$ in series in one leg and an input capacitor $C_1$, $C_2$ or $C_3$ in a parallel leg together forming a first loop, wherein each inverter cell is connected from a point between the two active switches thereof through a corresponding resonant tank circuit to a first end of the primary side winding of the corresponding transformer, and through a second end of the primary side winding to a common star connection as point O of the corresponding ends of all the inverter cells, wherein one end of the first loop connecting the legs of one inverter cell is directly connected to the opposite end of the corresponding loop in an inverter cell on which said one inverter cell is stacked, and a primary side voltage $V_{in}$ is applied or produced between the two ends of the first loops of the serial stack of inverter cells that are not directly connected to another inverter cell, and wherein the transformer core is shareable with other inverter cells. In one embodiment, the transformer cores of the transformers $TR_1$, $TR_2$, and $TR_3$ is integrated as one and shareable with the inverter cells. The secondary side includes at least two sets of rectifier circuit elements each coupled to the secondary side winding of the corresponding transformer shared with the corresponding primary side winding and is configured to rectify current induced at the secondary side by current flowing in the corresponding primary side winding, and wherein a secondary side voltage $V_o$ is produced or applied.

This resonant rectifier employs three half bridges $D_1$ to $D_6$ in stack in the secondary side. First diode bridge $D_1$ and $D_2$ is connected in parallel with a first output capacitor $C_{O1}$. Second diode bridge $D_3$ and $D_4$ is connected in parallel with a second output capacitor $C_{O2}$. Third diode bridge $D_5$ and $D_6$ is connected in parallel with a third output capacitor $C_{O3}$. Output capacitors $C_{O1}$, $C_{O2}$, and $C_{O3}$ are connected in series to provide the output voltage $V_O$ to a load R. The middle point of first diode bridge $D_1$ and $D_2$ is connected to one end of the secondary side winding of first transformer $TR_1$ through a DC-blocking capacitor $C_{s1}$. The middle point of second diode bridge $D_3$ and $D_4$ is connected to one end of the secondary side winding of second transformer $TR_2$ through a DC-blocking capacitor $C_{s2}$. The middle point of third diode bridge $D_5$ and $D_6$ is connected to one end of the secondary side winding of third transformer $TR_3$ through a DC-blocking capacitor $C_{s3}$. The other end of the secondary side winding of each transformer is connected together as point P, which is also defined as transformer star connection. The DC-blocking capacitors $C_{s1}$, $C_{s2}$, and $C_{s3}$ establish the required DC bias voltage for the proper operation of the rectifier.

Figure 12B:
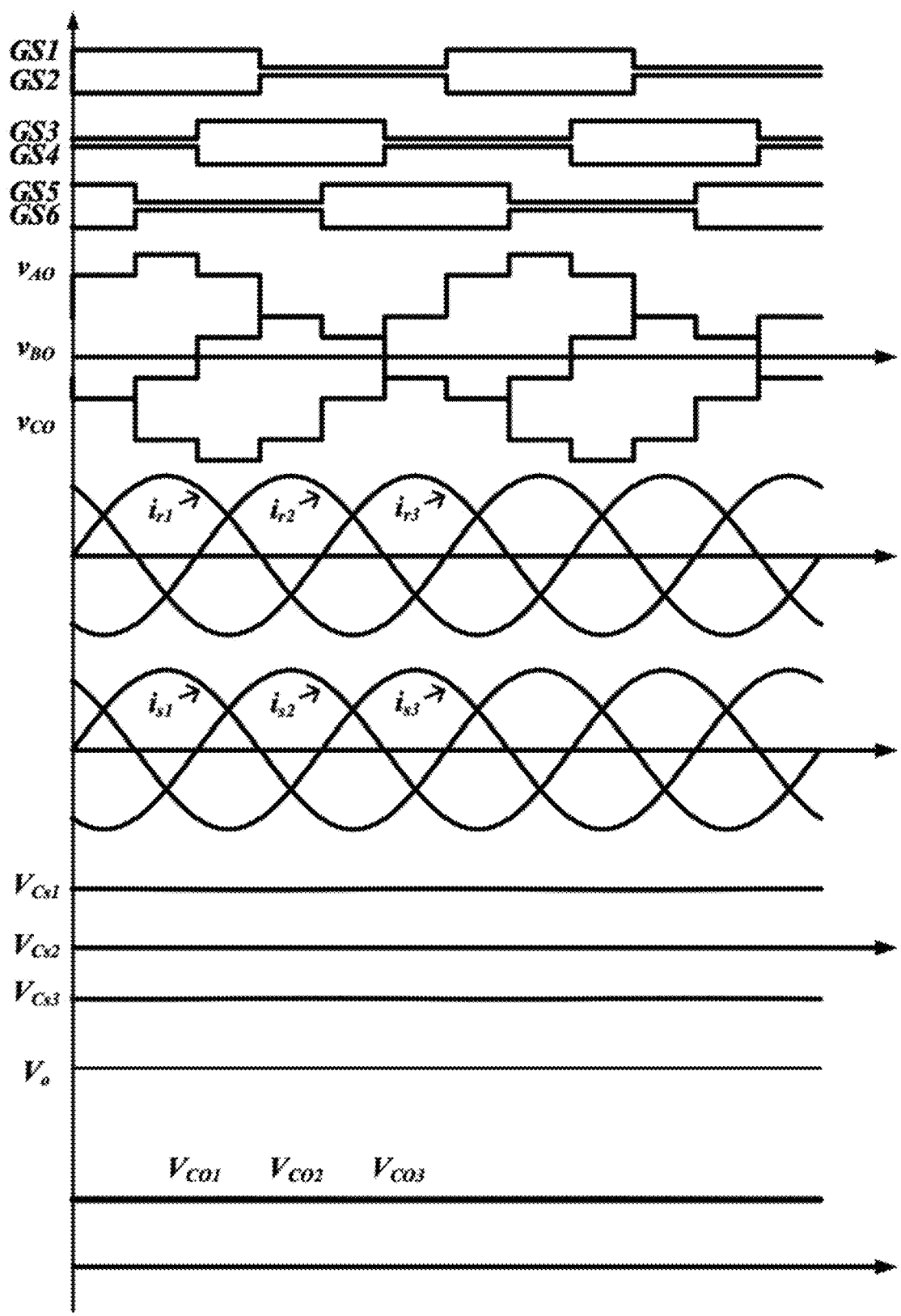
FIG. 12B illustrates the timing diagrams for the converter in FIG. 12A under variable frequency control for switch control signals GS1 to GS6, primary resonant current $i_{r1}$ to $i_{r3}$, secondary current $i_{s1}$ to $i_{s3}$, secondary blocking capacitor voltage $V_{cs1}$ to $V_{cs3}$, output capacitor voltage $V_{CO1}$ to $V_{CO3}$ and output voltage $V_o$.

Variable switching frequency control may be applied to regulate the output voltage and output power of the stacked half bridge resonant converter with the three-stacked half bridge rectifier of one embodiment of the present disclosure. FIG. 12B illustrates the timing diagrams for the converter in FIG. 12A under variable frequency control for switch control signals GS1 to GS6, primary resonant current $i_{r1}$ to $i_{r3}$, secondary current $i_{s1}$ to $i_{s3}$, secondary blocking capacitor voltage $V_{cs1}$ to $V_{cs3}$, output capacitor voltages $V_{CO1}$ to $V_{CO3}$ and output voltage $V_O$. The transformer secondary current $i_{s1}$ to $i_{s3}$ are sinusoid in phase with the primary resonant current $i_{r1}$ to $i_{r3}$. The blocking capacitor $C_{s1}$ has a positive DC bias voltage, the blocking capacitor $C_{s3}$ has a negative DC bias voltage and the blocking capacitor $C_{s2}$ has an almost zero DC voltage. The three output capacitor voltages $V_{CO1}$ to $V_{CO3}$ are self-balanced as shown in FIG. 12B. The output voltage is three times of each output capacitor voltage.

Figure 12C:
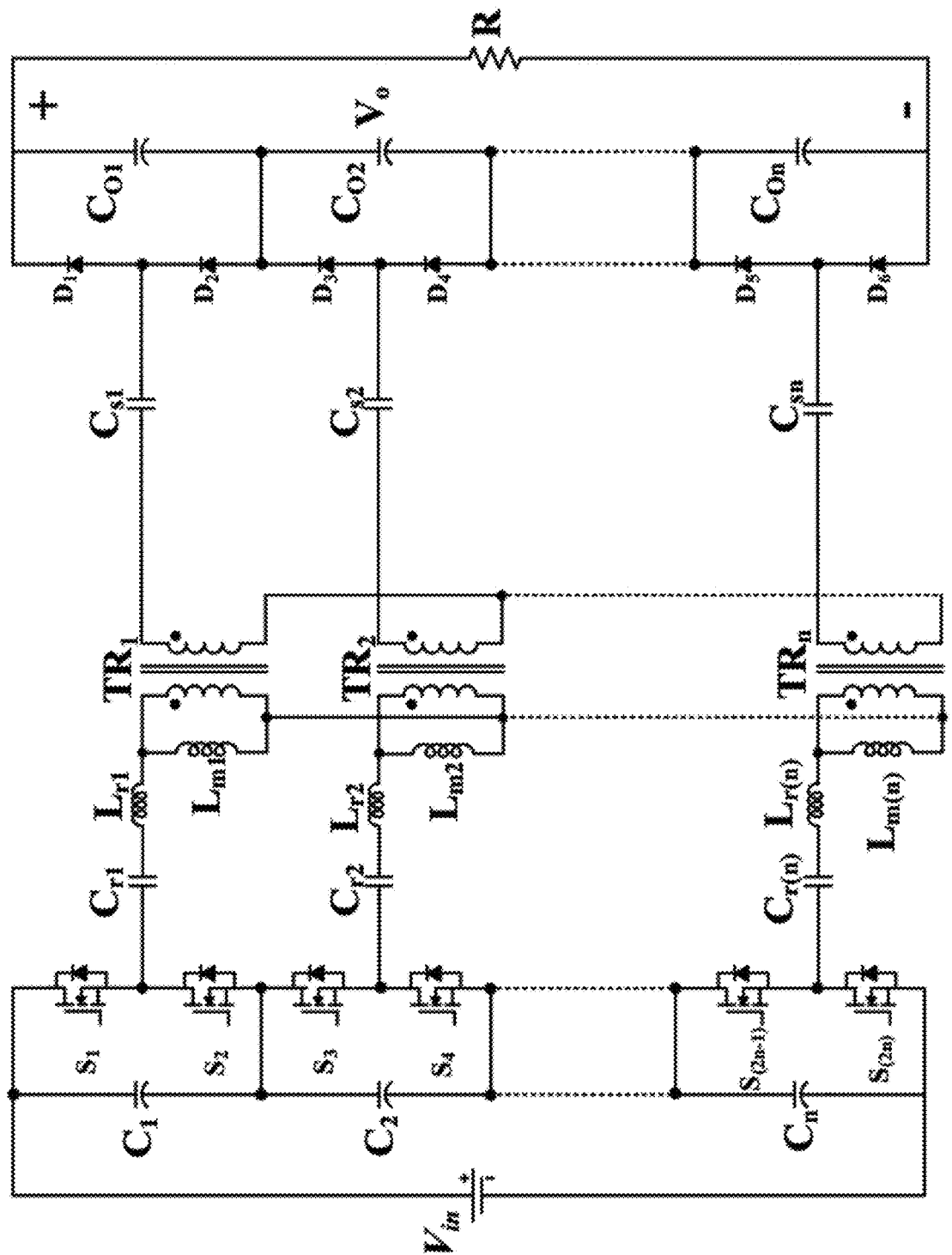
FIG. 12C illustrates an n-stacked half bridge rectifier with transformer star connection applied in an n-phase resonant converter, in accordance with an embodiment of the present disclosure.

FIG. 12C illustrates an n-stacked half bridge rectifier with transformer star connection applied in an n-phase resonant converter, in accordance with an embodiment of the present disclosure. In FIG. 12C, a total of n half bridge are stacked as the rectification stage of the n-stacked half bridge resonant converter. The output voltage is n times of each output capacitor voltage.

Figure 12D:
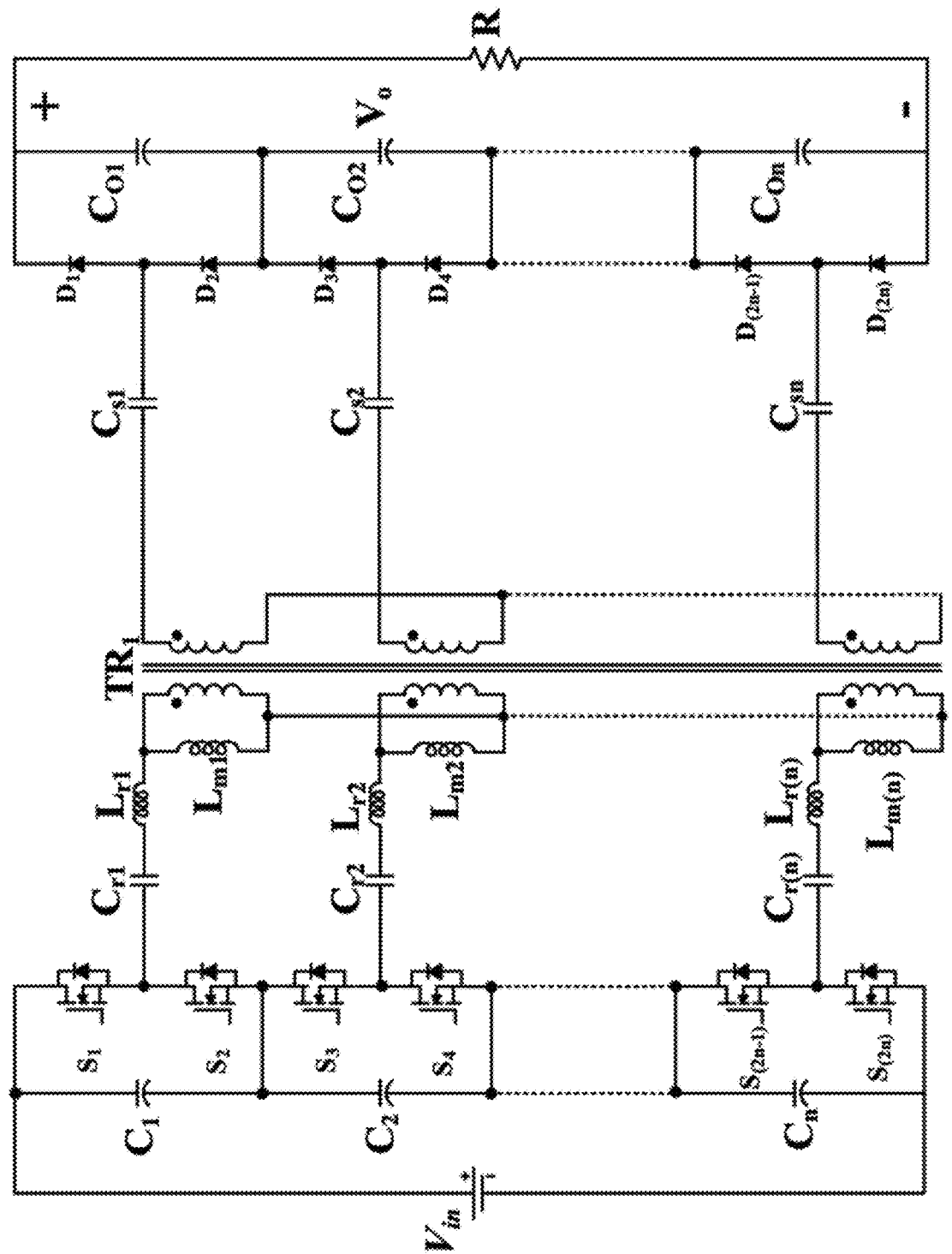
FIG. 12D illustrates an n-stacked half bridge rectifier with transformer star connection applied in an n-phase resonant converter with an integrated transformer, in accordance with an embodiment of the present disclosure.

The total n number of the separated transformer can be integrated to less than n number of transformers. For example, FIG. 12D illustrates an n-stacked half bridge rectifier with transformer star connection applied in an n-phase resonant converter with an integrated transformer, in accordance with an embodiment of the present disclosure. As shown in FIG. 12D, only one integrated transformer is employed for an n-stacked half bridge rectifier. The integrated transformer has a total of n windings on the primary side and n windings on the secondary side.

Figure 12E:
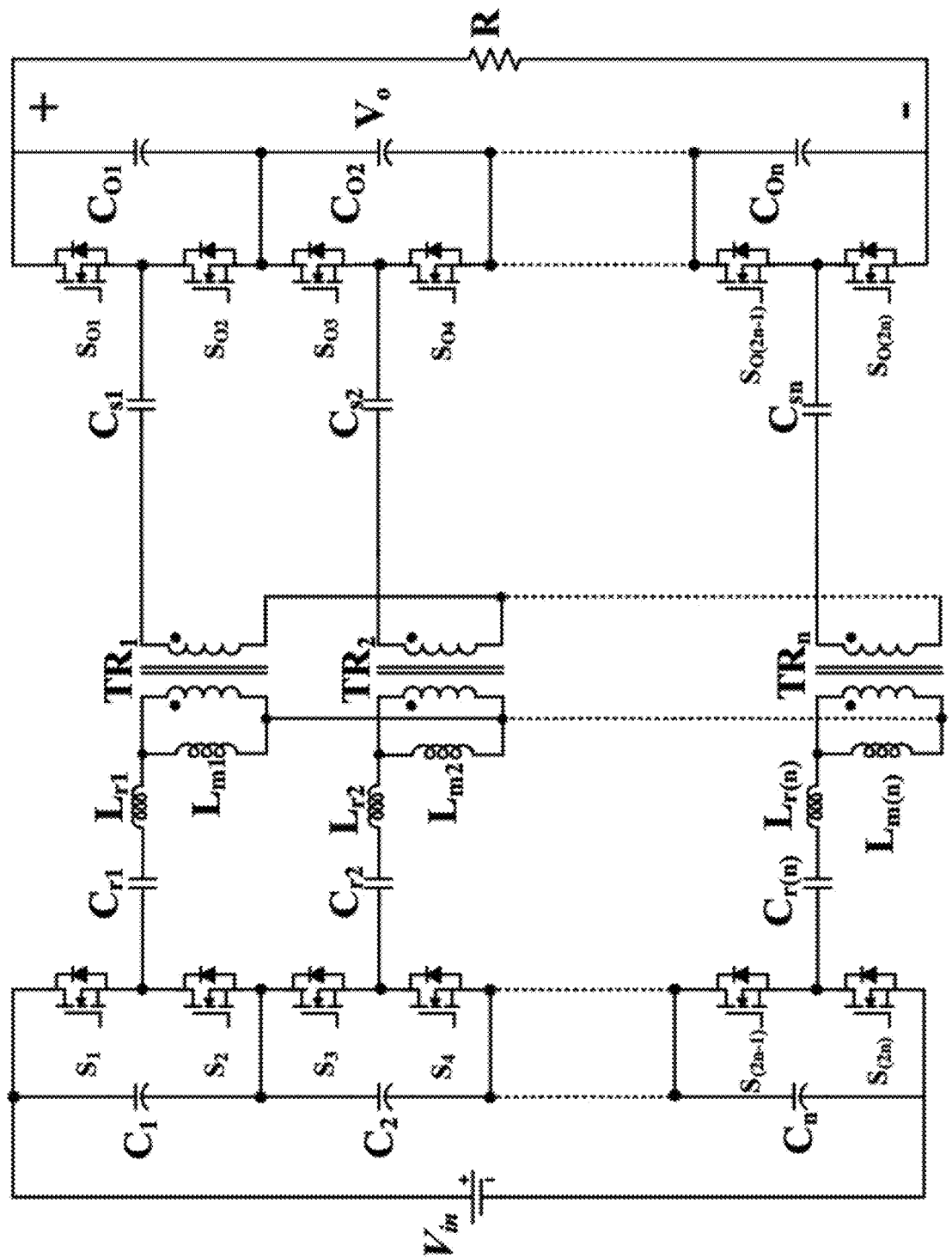
FIG. 12E illustrates an n-stacked active half bridge rectifier with transformer star connection applied in an n-phase resonant converter for synchronous rectification and bidirectional operation, in accordance with an embodiment of the present disclosure.

FIG. 12E illustrates an n-stacked active half bridge rectifier with transformer star connection applied in an n-phase resonant converter for synchronous rectification and bidirectional operation, in accordance with an embodiment of the present disclosure. In FIG. 12E, all diodes of the n-stacked half bridge rectifier are replaced with active switches for synchronous rectification. The resonant converter can provide bidirectional power flow. The phase shift modulation for stacked half bridge resonant converter can also be used in this topology.

Stacked half bridge rectifier

Figure 13A:
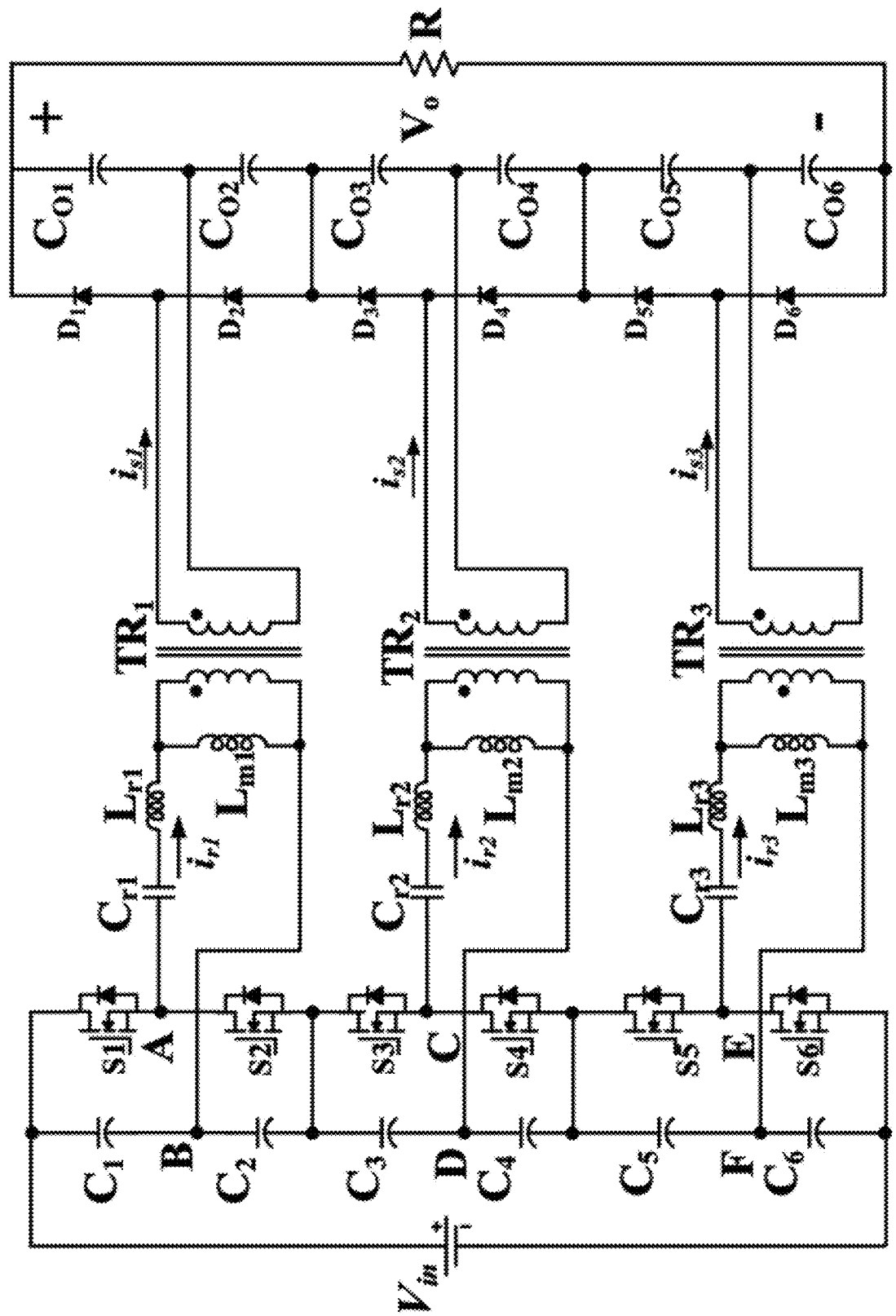
FIG. 13A illustrates a three-stacked half bridge rectifier applied in a three-phase resonant converter, in accordance with an embodiment of the present disclosure.

FIG. 13A illustrates a three-stacked half bridge rectifier applied in a three-phase resonant converter, in accordance with an embodiment of the present disclosure. The resonant rectifier in FIG. 13A employs three half bridges, $D_1$ through $D_6$, in stack in the secondary side. First diode bridge $D_1$ and $D_2$ is connected in parallel with two output capacitors $C_{O1}$ and $C_{O2}$. Second diode bridge $D_3$ and $D_4$ is connected in parallel with two output capacitors $C_{O3}$ and $C_{O4}$. Third diode bridge $D_5$ and $D_6$ is connected in parallel with two output capacitors $C_{O5}$ and $C_{O6}$. A total six output capacitors $C_{O1}$, $C_{O2}$, $C_{O3}$, $C_{O4}$, $C_{O5}$, and $C_{O6}$ are connected in series to provide the output voltage $V_O$ to a load R.

The middle point of first diode bridge $D_1$ and $D_2$ is connected to one end of the secondary side winding of first transformer $TR_1$. The middle point of second diode bridge $D_3$ and $D_4$ is connected to one end of the secondary side winding of second transformer $TR_2$. The middle point of third diode bridge $D_5$ and $D_6$ is connected to one end of the secondary side winding of third transformer $TR_3$. The other end of the secondary side winding of first transformer $TR_1$ is connected to the middle point of output capacitors $C_{O1}$ and $C_{O2}$. The other end of the secondary side winding of second transformer $TR_2$ is connected to the middle point of output capacitors $C_{O3}$ and $C_{O4}$. The other end of the secondary side winding of third transformer $TR_3$ is connected to the middle point of output capacitors $C_{O5}$ and $C_{O6}$.

Figure 13B:
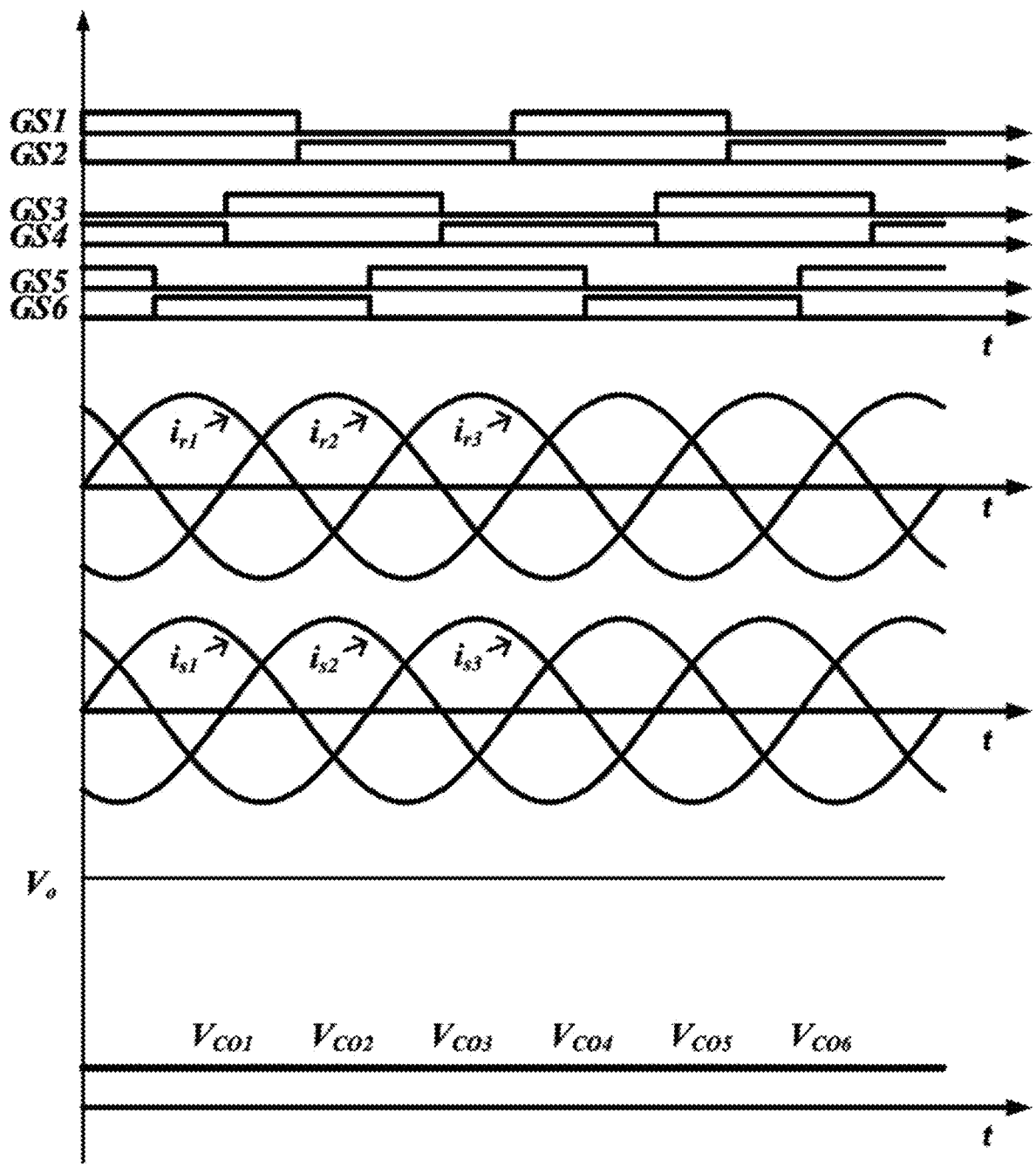
FIG. 13B illustrates the timing diagrams for the converter in FIG. 13A under variable frequency control for switch control signals GS1 to GS6, primary resonant current $i_{r1}$ to $i_{r3}$, secondary current $i_{s1}$ to $i_{s3}$, output capacitor voltage $V_{CO1}$ to $V_{CO6}$ and output voltage $V_O$.

Variable switching frequency control can be applied to regulate the output voltage and output power of the three phase resonant converter with the three-stacked half bridge rectifier of one embodiment of the present disclosure. FIG. 13B illustrates the timing diagrams for the converter in FIG. 13A under variable frequency control for switch control signals GS1 to GS6, primary resonant current $i_{r1}$ to $i_{r3}$, secondary current $i_{s1}$ to $i_{s3}$, output capacitor voltage $V_{CO1}$ to $V_{CO6}$ and output voltage $V_O$. The transformer secondary current $i_{s1}$ to $i_{s3}$ are sinusoid in phase with the primary resonant current $i_{r1}$ to $i_{r3}$. The six output capacitor voltages $V_{CO1}$ to $V_{CO6}$ are self-balanced as shown in FIG.13B. The output voltage is six times of each output capacitor voltage.

Figure 13C:
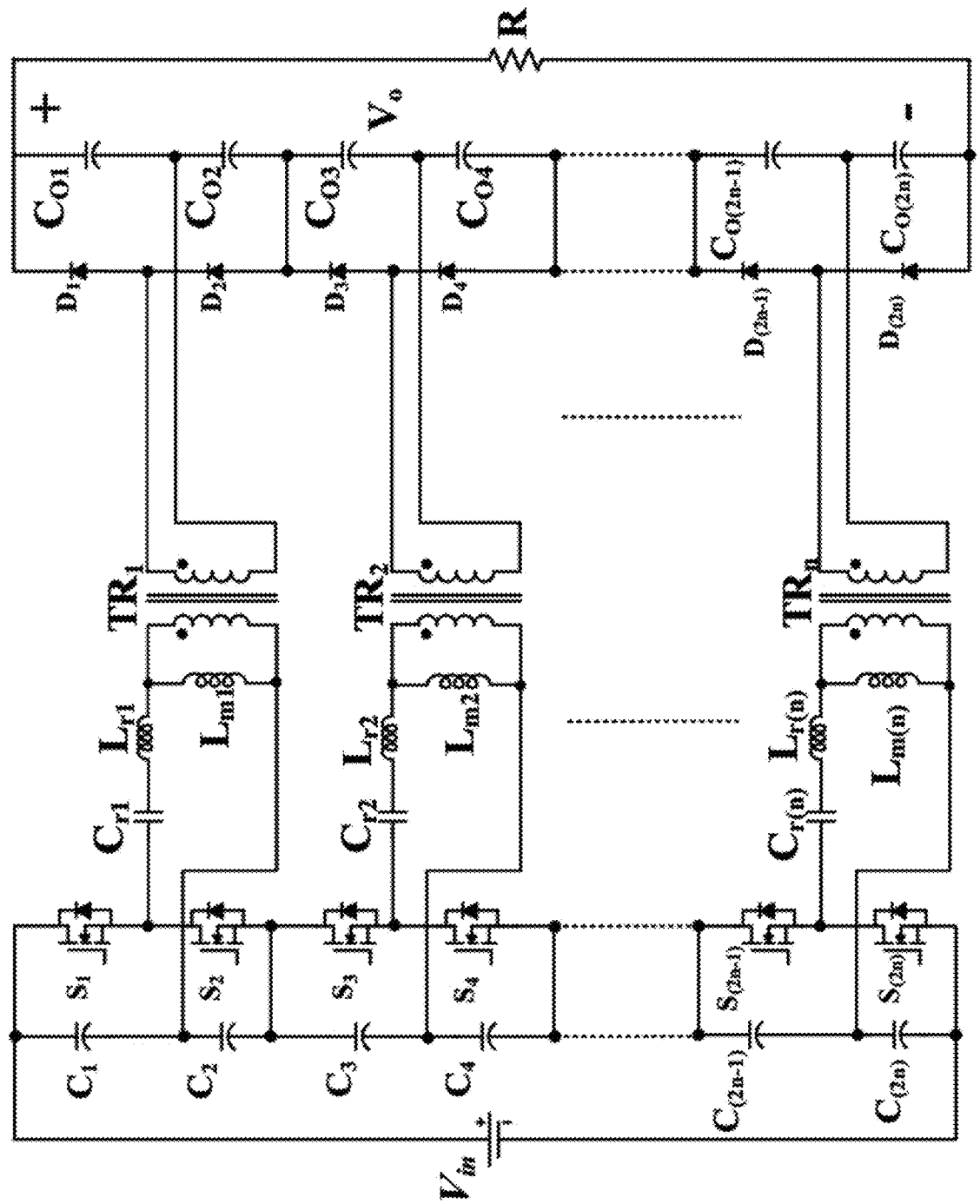
FIG. 13C illustrates an n-stacked half bridge rectifier applied in an n-phase resonant converter, in accordance with an embodiment of the present disclosure.

FIG. 13C illustrates an n-stacked half bridge rectifier applied in an n-phase resonant converter, in accordance with an embodiment of the present disclosure. In FIG. 13C, a total of n number of half bridge are stacked as the rectification stage of the n-phase resonant converter. The output voltage is 2n times of each output capacitor voltage.

Figure 13D:
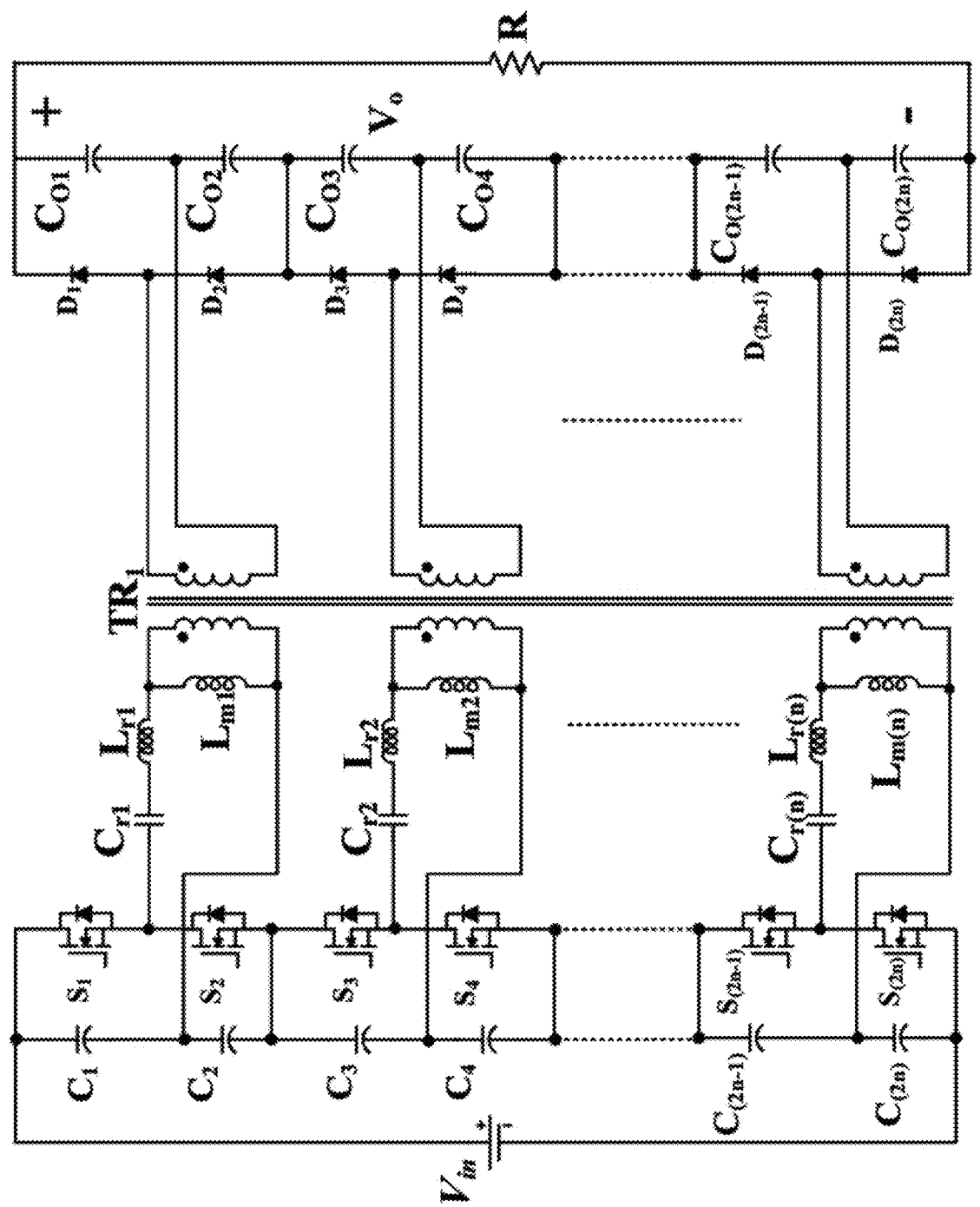
FIG. 13D illustrates an n-stacked half bridge rectifier applied in an n-phase resonant converter with an integrated transformer, in accordance with an embodiment of the present disclosure.

The total n number of the separated transformers as shown in FIG. 13C can be integrated to less than n number of transformers. For example, FIG. 13D illustrates an n-stacked half bridge rectifier applied in an n-phase resonant converter with an integrated transformer, in accordance with an embodiment of the present disclosure. In FIG.13D, only one integrated transformer for an n-stacked half bridge rectifier, which has a total of n windings on the primary side and n windings on the secondary side.

Figure 13E:
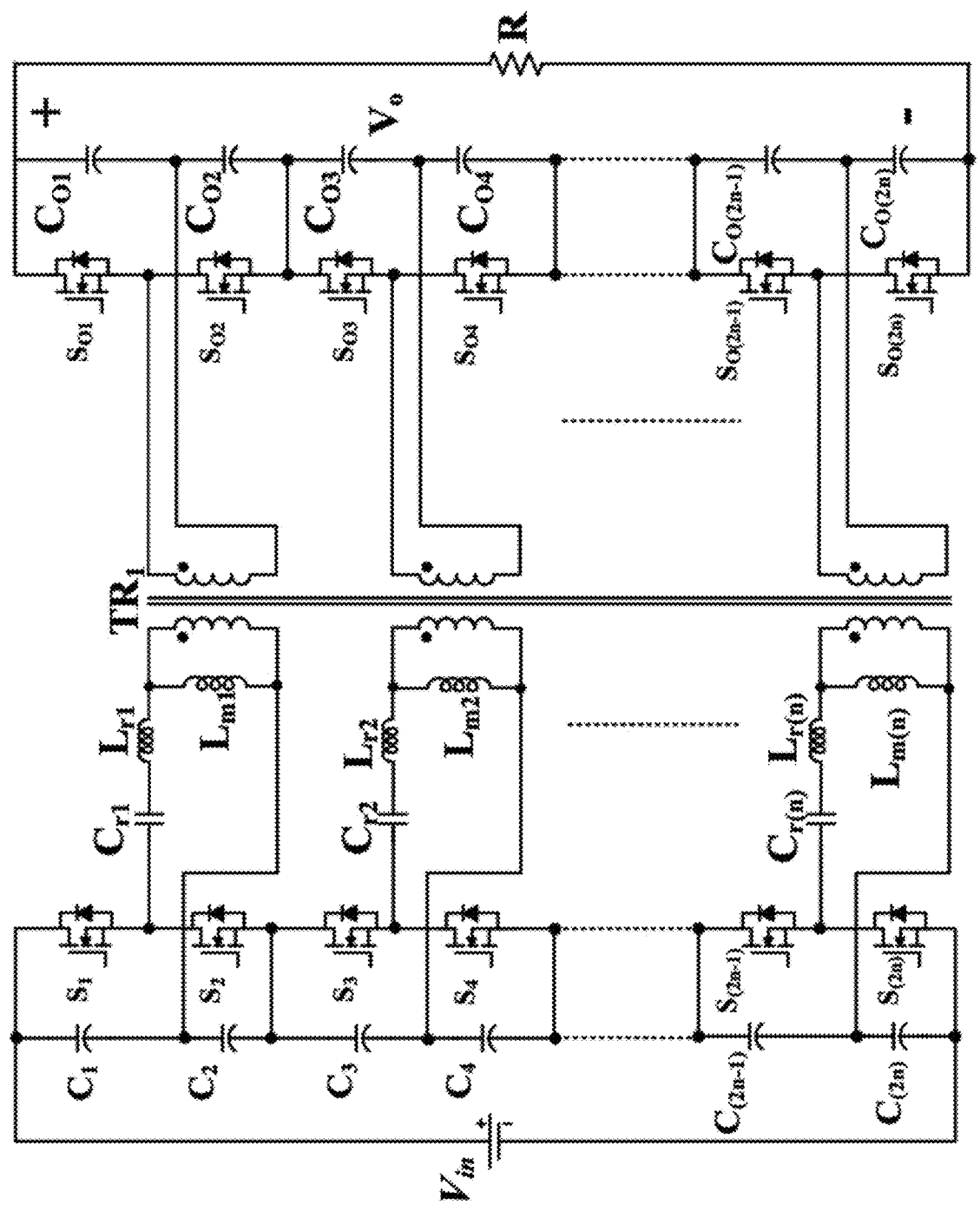
FIG. 13E illustrates an n-stacked active half bridge rectifier applied in an n-phase resonant converter for synchronous rectification and bidirectional operation, in accordance with an embodiment of the present disclosure.

FIG. 13E illustrates an n-stacked active half bridge rectifier applied in an n-phase resonant converter for synchronous rectification and bidirectional operation, in accordance with an embodiment of the present disclosure. In FIG. 13E, all diodes of the n-stacked half bridge rectifier are replaced with active switches for synchronous rectification. The resonant converter can provide bidirectional power flow. The phase shift modulation for stacked half bridge resonant converter can also be used in this topology.

Stacked full bridge rectifier

Figure 14A:
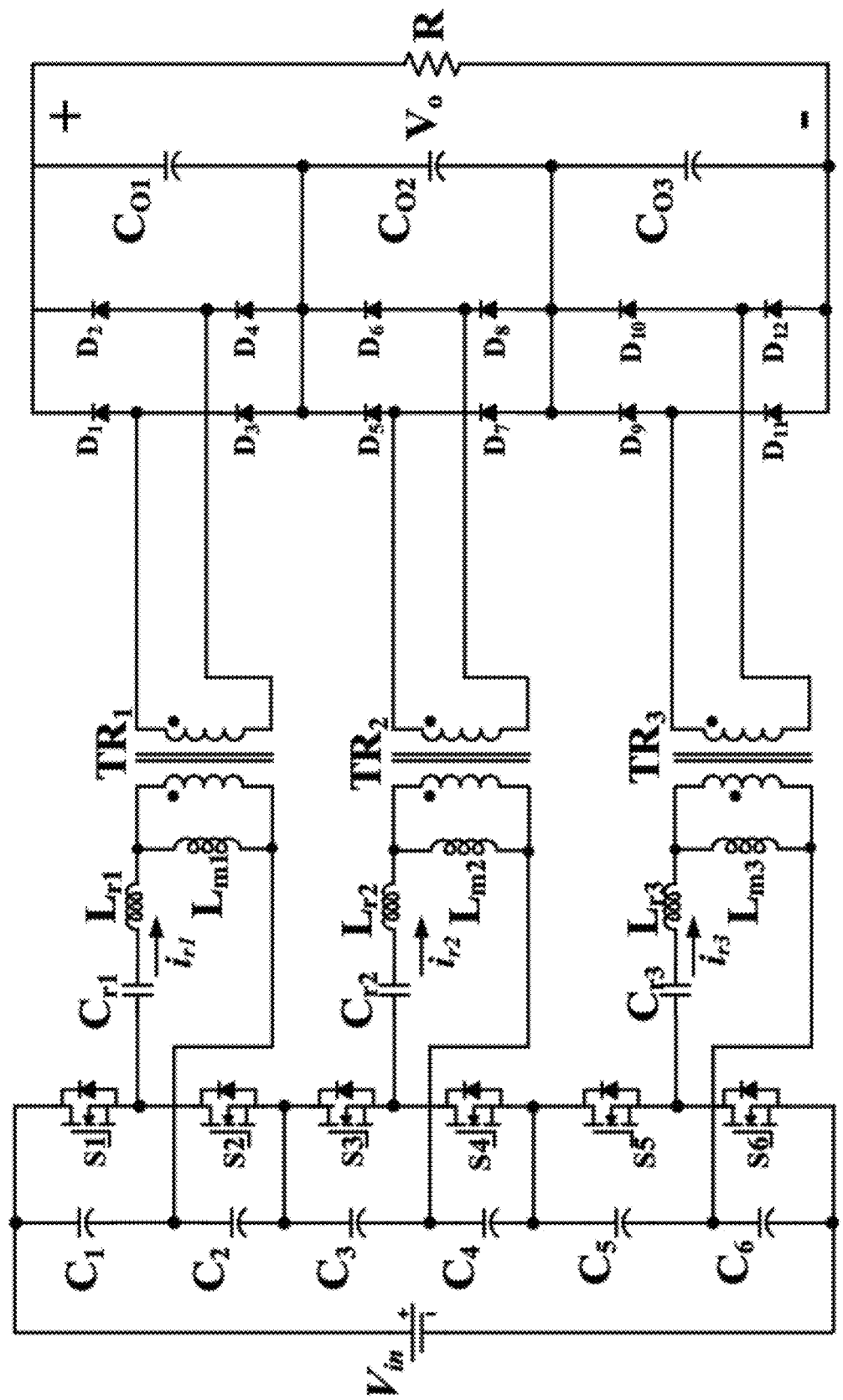
FIG. 14A illustrates a three-stacked full bridge rectifier applied in a three-phase resonant converter, in accordance with an embodiment of the present disclosure.

FIG. 14A illustrates a three-stacked full bridge rectifier applied in a three-phase resonant converter, in accordance with an embodiment of the present disclosure. The resonant rectifier in FIG. 14A employs three full bridges, including diodes $D_1$ through $D_{12}$, in stack on the secondary side. First full bridge including diodes $D_1$ through $D_4$ is connected in parallel with first output capacitor $C_{O1}$. Second full bridge including diodes $D_5$ through $D_8$ is connected in parallel with second output capacitor $C_{O2}$. Third full bridge including diodes $D_9$ through $D_{12}$ is connected in parallel with third output capacitor $C_{O3}$. Output capacitors $C_{O1}$, $C_{O2}$, and $C_{O3}$ are connected in series to provide output voltage $V_O$ to a load R.

One end of the secondary side winding of first transformer $TR_1$ is connected to the middle point between diodes $D_1$ and $D_3$, while the other end of the secondary side winding of first transformer $TR_1$ is connected to the middle point between diodes $D_2$ and $D_4$. One end of the secondary side winding of second transformer $TR_2$ is connected to the middle point between diodes $D_5$ and $D_7$, while the other end of the secondary side winding of second transformer $TR_2$ is connected to the middle point between diodes $D_6$ and $D_8$. One end of the secondary side winding of third transformer $TR_3$ is connected to the middle point between diodes $D_9$ and $D_{11}$, while the other end of the secondary side winding of third transformer $TR_3$ is connected to the middle point between diodes $D_{10}$ and $D_{12}$. Variable switching frequency control can be applied to regulate the output voltage and output power of the stacked half bridge resonant converter with the proposed three-stacked full bridge rectifier. Blocking capacitors are not required in this rectifier.

Figure 14B:
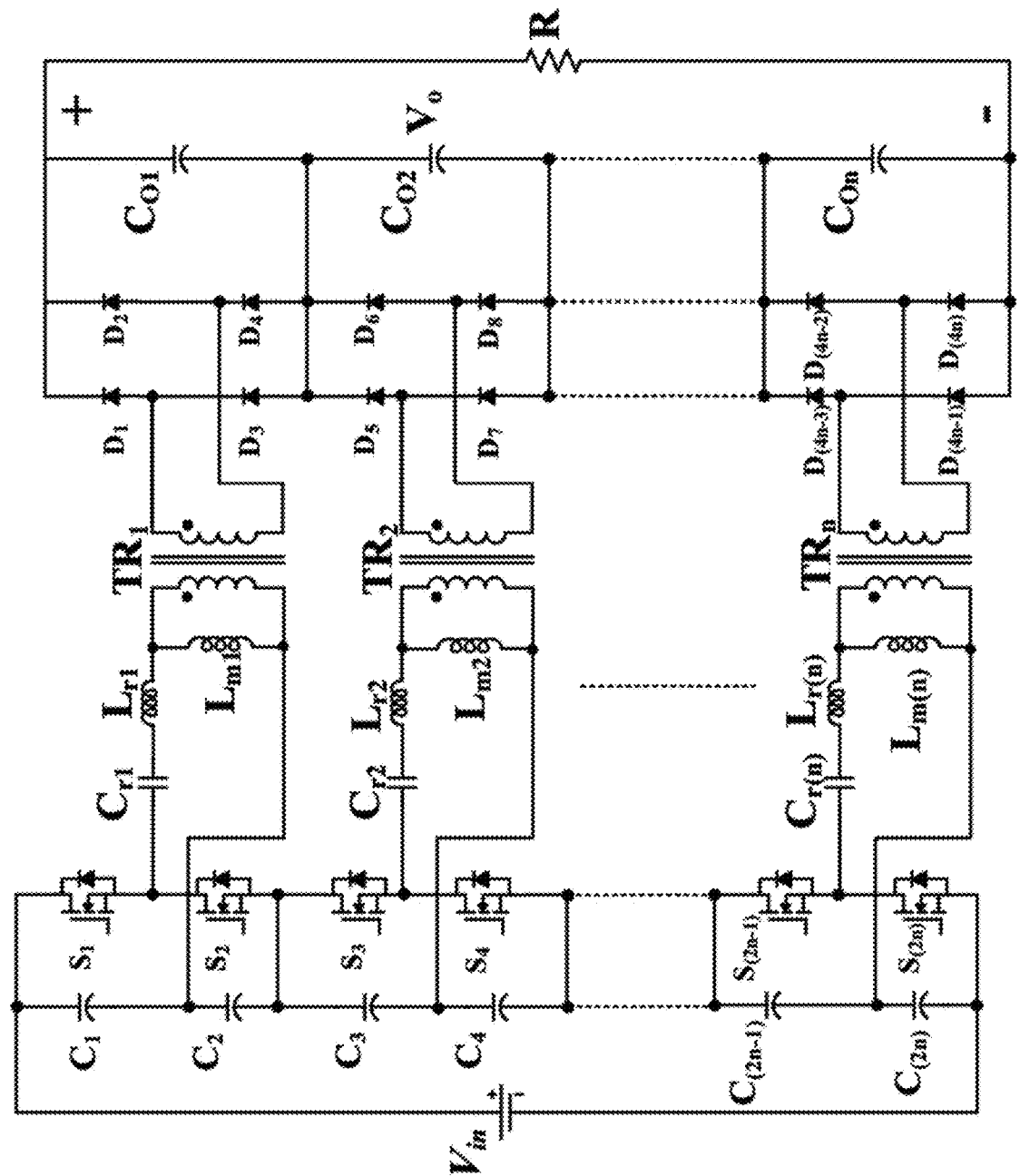
FIG. 14B illustrates an n-stacked full bridge rectifier applied in an n-phase resonant converter, in accordance with an embodiment of the present disclosure.

FIG. 14B illustrates an n-stacked full bridge rectifier applied in an n-phase resonant converter, in accordance with an embodiment of the present disclosure. In FIG. 14B, a total of n number of full bridges is stacked as the rectification stage of the n-stacked half bridge resonant converter. The output voltage is n times of each output capacitor voltage.

Figure 14C:
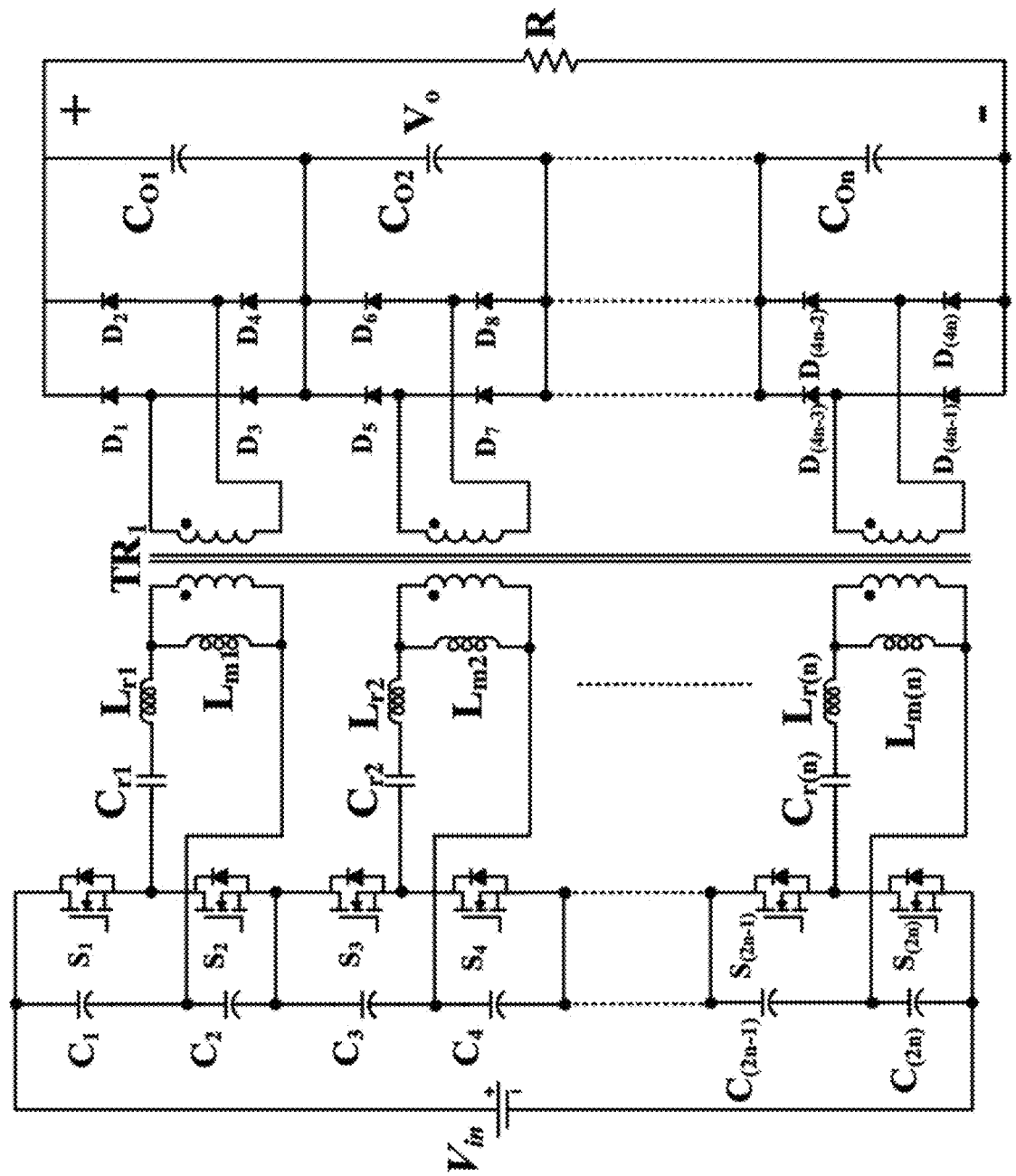
FIG. 14C illustrates an n-stacked full bridge rectifier applied in an n-phase resonant converter with an integrated transformer, in accordance with an embodiment of the present disclosure.

The total n number of the separated transformer can be integrated to less than n number of transformers. FIG. 14C illustrates an n-stacked full bridge rectifier applied in an n-phase resonant converter with an integrated transformer, in accordance with an embodiment of the present disclosure. As shown in FIG.14C, an n-stacked full bridge rectifier employs only one integrated transformer, which has a total n windings on the primary side and n windings on the secondary side.

Figure 14D:
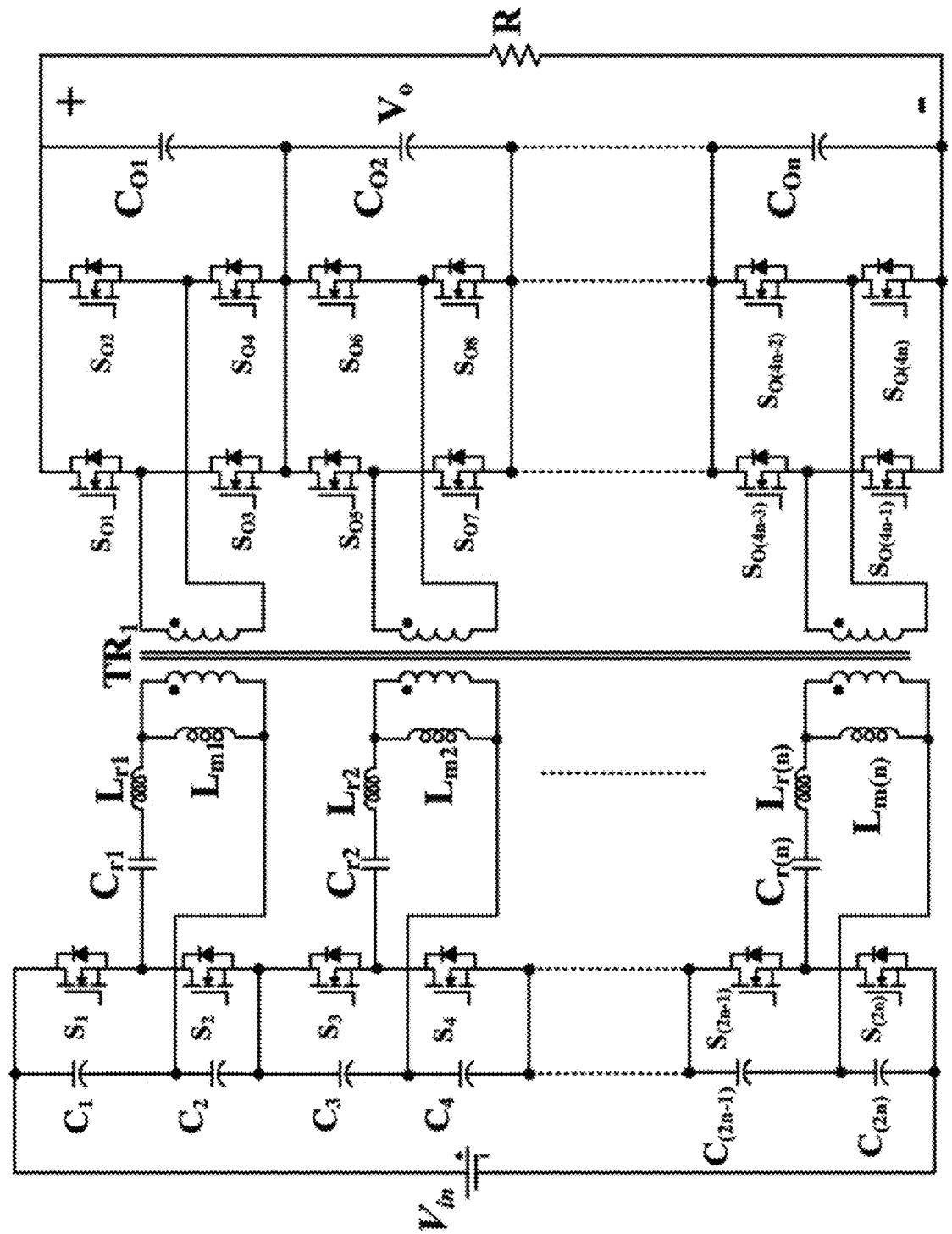
FIG. 14D illustrates an n-stacked active full bridge rectifier applied in an n-phase resonant converter for synchronous rectification and bidirectional operation, in accordance with an embodiment of the present disclosure.

FIG. 14D illustrates an n-stacked active full bridge rectifier applied in an n-phase resonant converter for synchronous rectification and bidirectional operation, in accordance with an embodiment of the present disclosure. In FIG. 14D, all diodes of the n-stacked full bridge rectifier are replaced with a total of 4n active switches for synchronous rectification. The resonant converter can provide bidirectional power flow. The phase shift modulation for stacked half bridge resonant converter can also be used in this topology.

Stacked serial-half-bridge rectifier

Figure 15A:
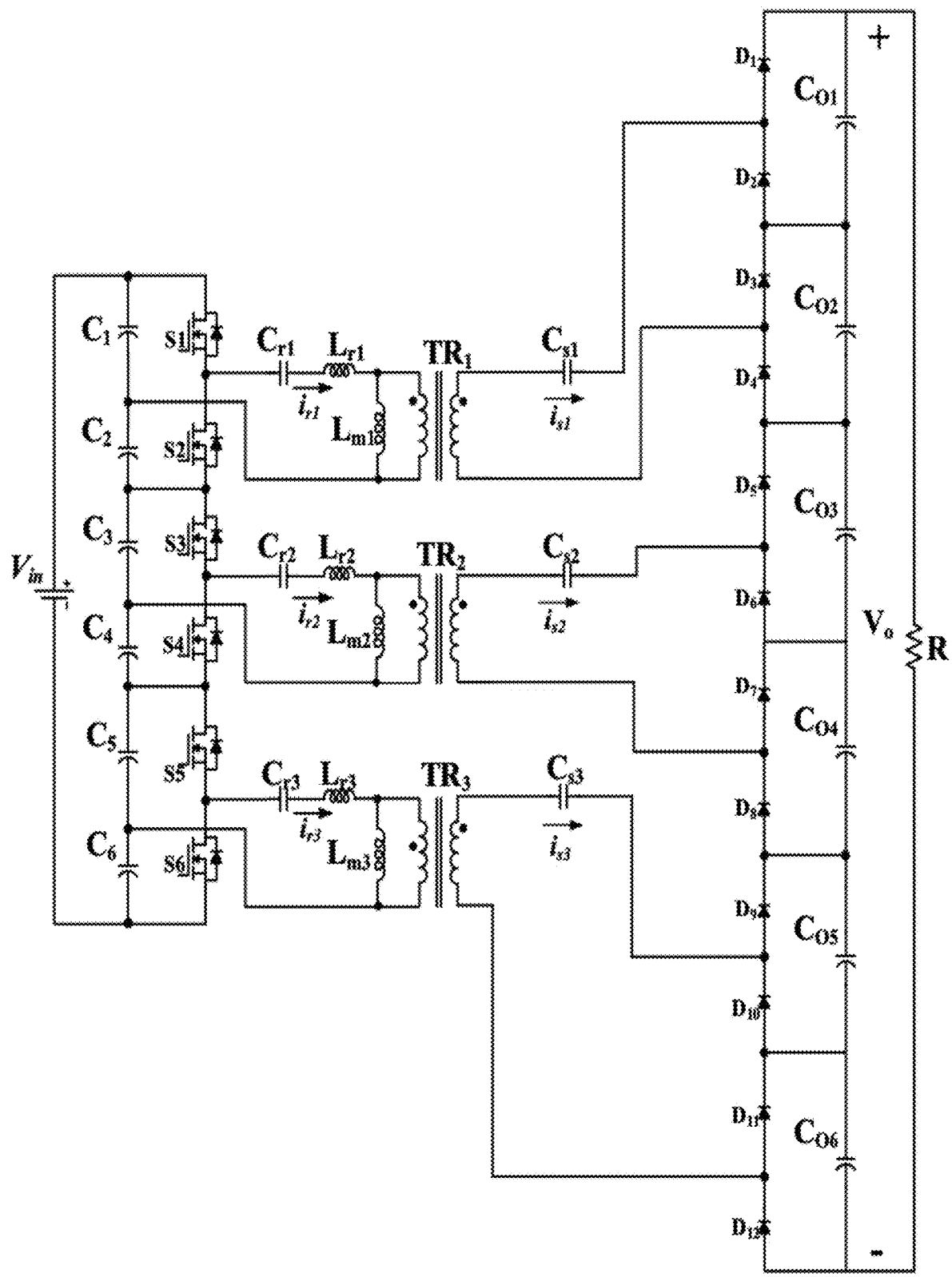
FIG. 15A illustrates a three-stacked serial-half-bridge rectifier applied in a three-phase resonant converter, in accordance with an embodiment of the present disclosure.

FIG. 15A illustrates a three-stacked serial-half-bridge rectifier applied in a three-phase resonant converter, in accordance with an embodiment of the present disclosure. The resonant rectifier in FIG. 15A employs three serial-half-bridges, including diodes $D_1$ through $D_{12}$, in stack on the secondary side. First serial-half-bridge including diodes $D_1$ through $D_4$ is connected in parallel with two output capacitors $C_{O1}$ and $C_{O2}$. Second serial-half-bridge including diodes $D_5$ through $D_8$ is connected in parallel with two output capacitors $C_{O3}$ and $C_{O4}$. Third serial-half-bridge including diodes $D_9$ through $D_{12}$ is connected in parallel with two output capacitors $C_{O5}$ and $C_{O6}$. A total of six output capacitors $C_{O1}$, $C_{O2}$, $C_{O3}$, $C_{O4}$, $C_{O5}$, and $C_{O6}$ are connected in series to provide output voltage $V_O$ to a load R.

One end of the secondary side winding of first transformer $TR_1$ is connected to the middle point between diodes $D_1$ and $D_2$, while the other end of the secondary side winding of first transformer $TR_1$ is connected to the middle point between diodes $D_3$ and $D_4$. One end of the secondary side winding of second transformer $TR_2$ is connected to the middle point between diodes $D_5$ and $D_6$, while the other end of the secondary side winding of second transformer $TR_2$ is connected to the middle point between diodes $D_7$ and $D_8$. One end of the secondary side winding of third transformer $TR_3$ is connected to the middle point between diodes $D_9$ and $D_{10}$, while the other end of the secondary side winding of third transformer $TR_3$ is connected to the middle point between diodes $D_{11}$ and $D_{12}$.

Variable switching frequency control can be applied to regulate the output voltage and output power of the stacked half bridge resonant converter with the three-stacked serial-half-bridge rectifier of one embodiment of the present disclosure. The blocking capacitor $C_{s1}$ to $C_{s3}$ are applied to establish required DC bias voltage for the proper operation of the rectifier in FIG. 15A. The six output capacitor voltages $V_{CO1}$ to $V_{CO6}$ are self-balanced.

Figure 15B:
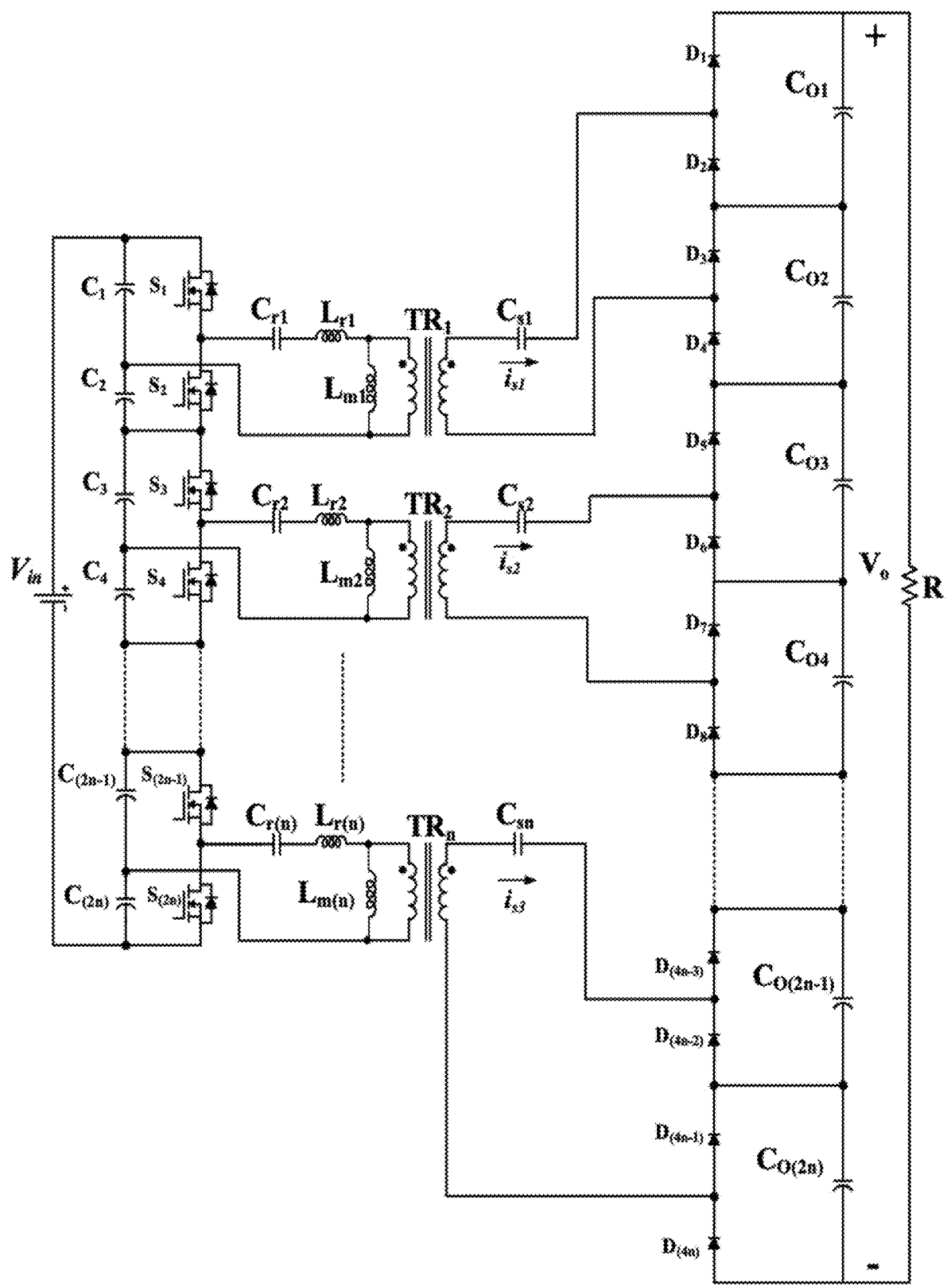
FIG. 15B illustrates an n-stacked serial-half-bridge rectifier applied in an n-phase resonant converter, in accordance with an embodiment of the present disclosure.

FIG. 15B illustrates an n-stacked serial-half-bridge rectifier applied in an n-phase resonant converter, in accordance with an embodiment of the present disclosure. In FIG. 15B, a total of n number of serial-half-bridges are stacked as the rectification stage of the n-stacked half bridge resonant converter. The output voltage is n times of each output capacitor voltage.

Figure 15C:
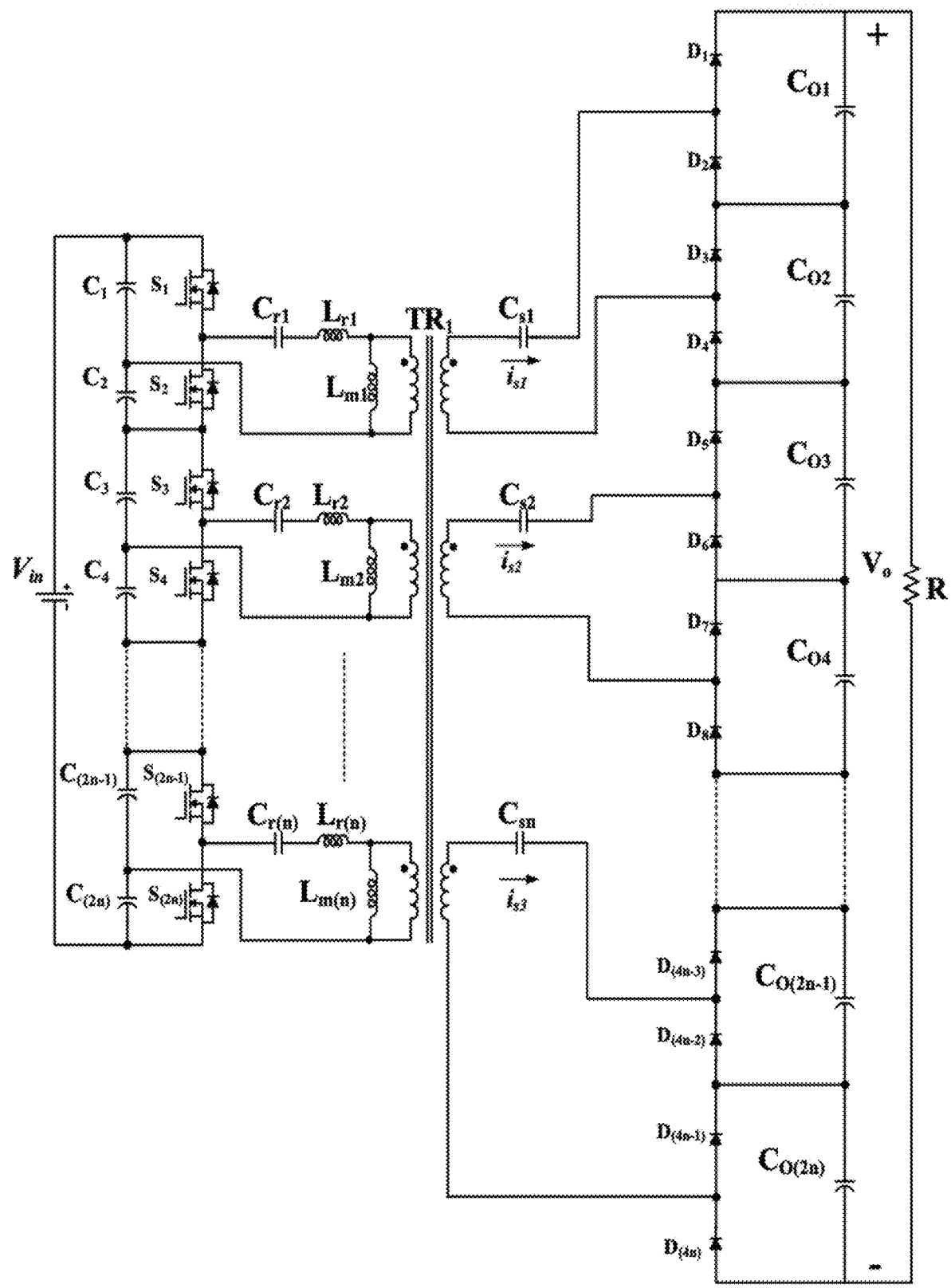
FIG. 15C illustrates an n-stacked serial-half-bridge rectifier applied in an n-phase resonant converter with an integrated transformer, in accordance with an embodiment of the present disclosure.

The total n number of the separated transformer can be integrated to less than n number of transformers. FIG. 15C illustrates an n-stacked serial-half-bridge rectifier applied in an n-phase resonant converter with an integrated transformer, in accordance with an embodiment of the present disclosure.

As shown in FIG. 15C, an n-stacked serial-half-bridge rectifier employs only one integrated transformer, which has a total of n windings on the primary side and n windings on the secondary side.

Figure 15D:
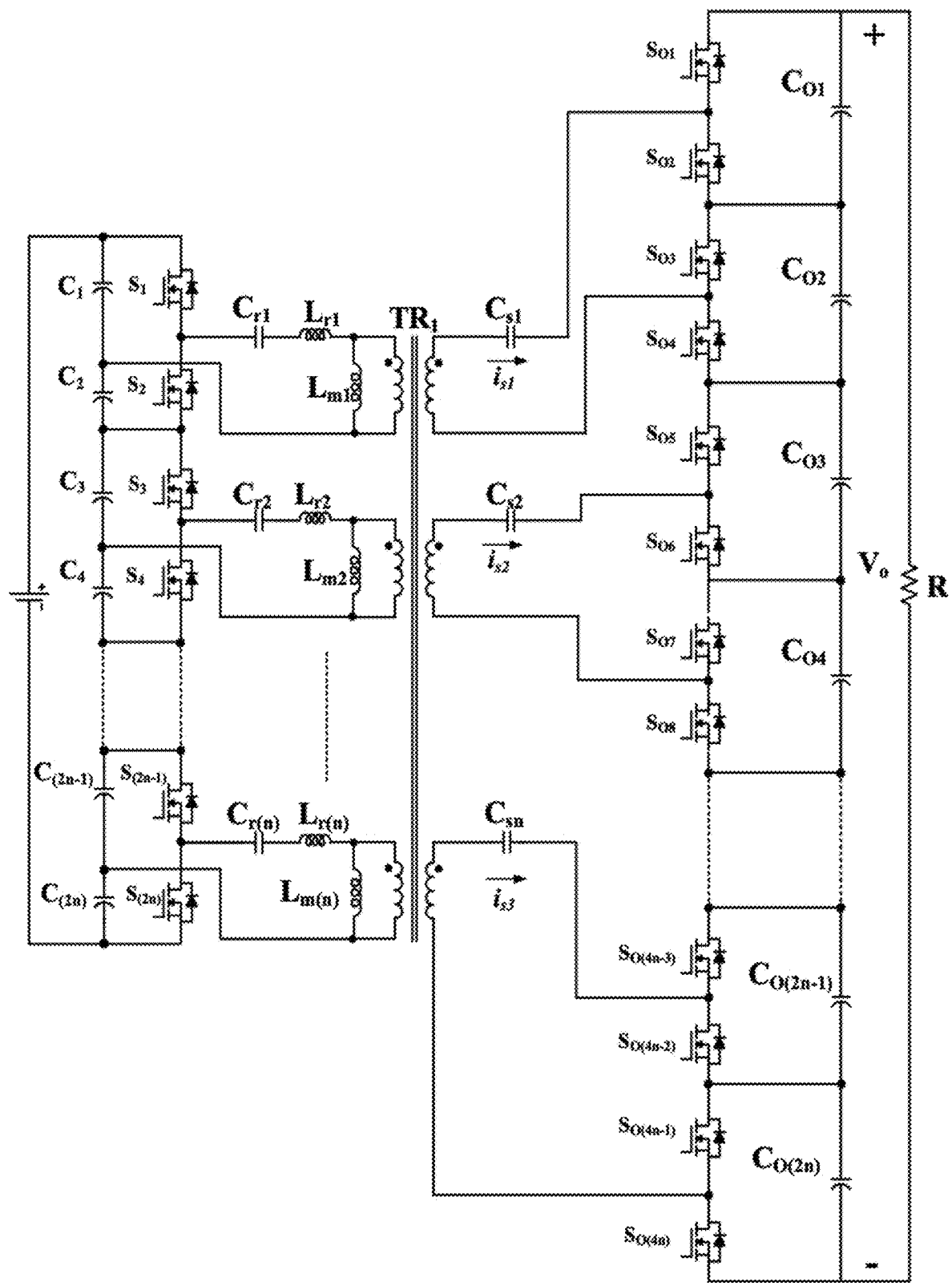
FIG. 15D illustrates an n-stacked serial-half-bridge rectifier applied in an n-phase resonant converter for synchronous rectification and bidirectional operation, in accordance with an embodiment of the present disclosure.

FIG. 15D illustrates an n-stacked serial-half-bridge rectifier applied in an n-phase resonant converter for synchronous rectification and bidirectional operation, in accordance with an embodiment of the present disclosure. In FIG. 15D, all diodes of the n-stacked serial-half-bridges rectifier are replaced with a total of 4n active switches for synchronous rectification. The resonant converter can provide bidirectional power flow.

Generalization of stacked resonant converter

Figure 16:
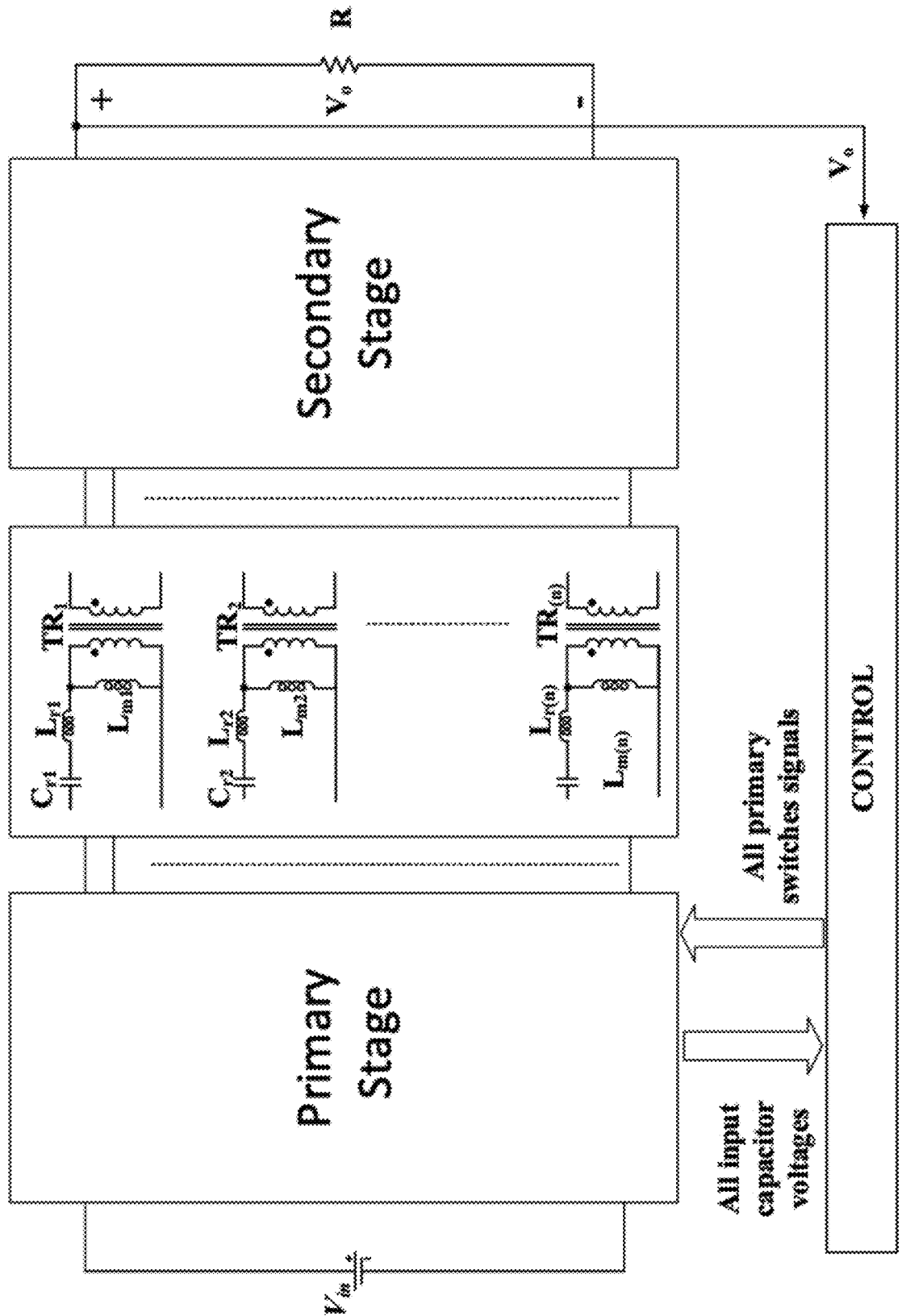
FIG. 16 illustrates a generalized stacked resonant converter, in accordance with an embodiment of the present disclosure.

Various resonant converters and rectifiers based on stacked half bridge, stacked full bridge and stacked serial-half-bridge are described separately in previous sections. FIG. 16 illustrates a generalized stacked resonant converter, in accordance with an embodiment of the present disclosure. A total of n separated transformers is used with a total n primary side windings and n secondary side windings. On the primary side, four different topologies can be used as the inverting stage. The first is the n-stacked half bridge structure with transformer star connection. The second is the n-stacked half bridge structure, which is the primary side of the topology in FIG. 7A. The third topology is the n-stacked serial-half-bridge structure, which is the primary side of the topology in FIG. 9A. The fourth topology is the n-stacked full bridge structure, which is the primary side of the topology in FIG. 11C.

On the secondary side, a total five different topologies can be used as rectifiers. The first is the n-stacked half bridge structure with transformer star connection, which is the rectifier of the topology in FIG. 12C. In this situation, secondary side blocking capacitors are required for proper operation of the rectifier. The second is the n-stacked half bridge structure, which is the rectifier of the topology in FIG. 13C. The third topology is the n-stacked full bridge structure, which is the rectifier of the topology in FIG. 14B. The fourth topology is the n-stacked serial-half-bridge structure, which is the rectifier of the topology in FIG. 15B. In this situation, secondary side blocking capacitors are required for proper operation of the rectifier. The fifth rectifier is the conventional n-phase diode bridges structure, which can have a half-wave or a full-wave structure.

N separated transformers are applied to provide required turns ratio and galvanic isolation. The n transformers can be further integrated into less than n transformers. The rectifier stage diodes can be replaced by active switches for synchronous rectification and bidirectional operation. Variable switching frequency control, PWM duty cycle modulation and phase shift modulation can be applied to regulate the output voltage and output power in this system.

Figure 17:
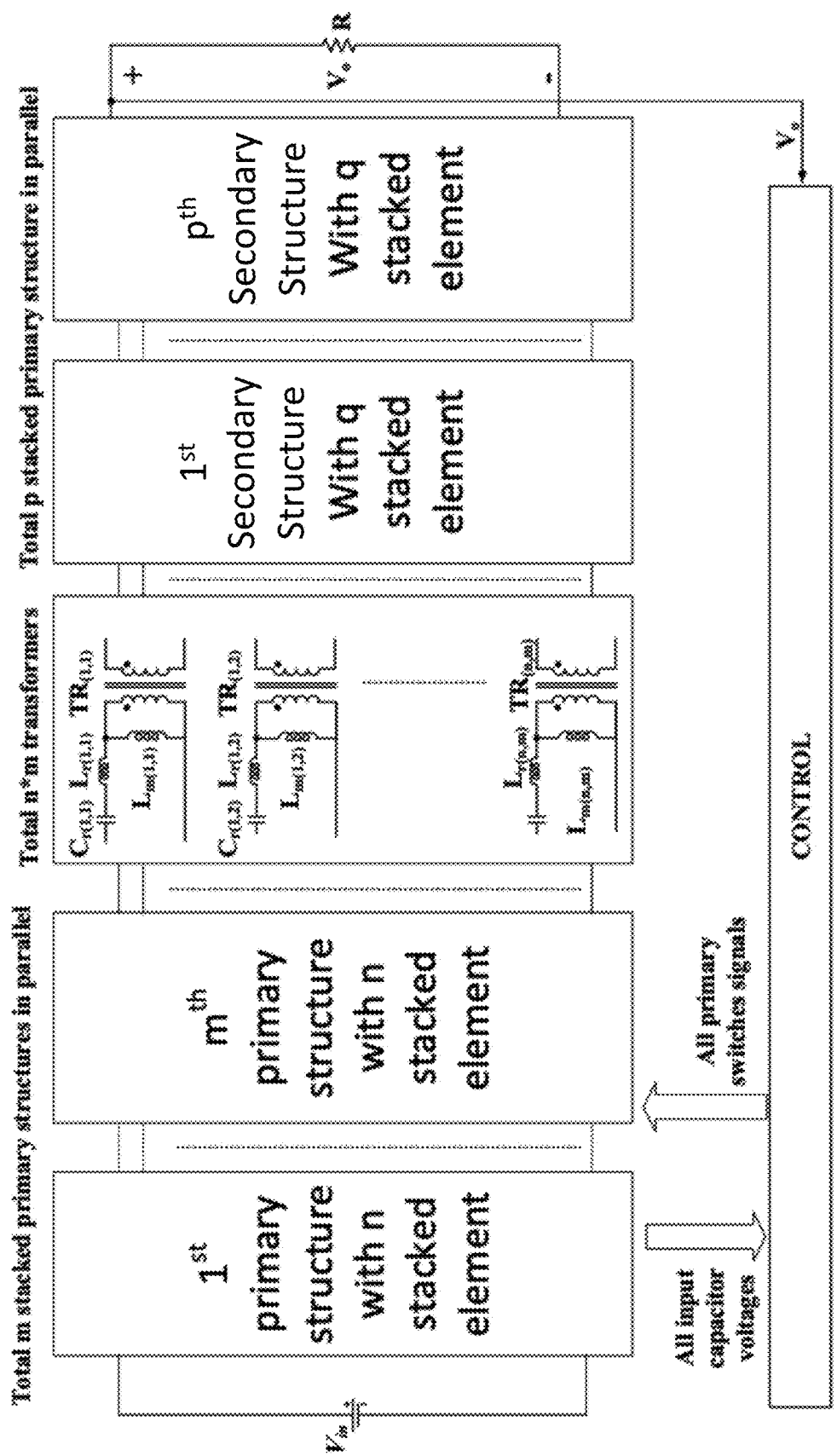
FIG. 17 illustrates a generalized stacked resonant converter including multiple circuits in parallel on both the primary and secondary sides, in accordance with an embodiment of the present disclosure.

FIG. 17 illustrates a generalized stacked resonant converter including multiple circuits in parallel on both the primary and secondary sides, in accordance with an embodiment of the present disclosure. On the primary side, a total of m stacked structures is connected in parallel with the input voltage. Each stacked structure includes n stacked basic elements, which is the primary structure in FIG. 16. Thus, there is a total of m×n basic elements on the primary side with dedicated series and parallel connections. A total of m×n separated transformers, $TR_{(1,1)}$ to $TR_{(n,m)}$, are utilized with a total of m×n primary side windings and m×n secondary side windings. If the basic stacking element is half bridge with transformer star connection, one end of every primary side winding is connected as a single point as star connection and the other end of every primary side winding is coupled to the middle point of every half bridge through the corresponding resonant tank. Otherwise, all the m×n primary side windings are directly coupled to the basic stacking elements through the resonant tanks.

On the secondary side, a total p stacked structures are in connected parallel. Each stacked structure includes q stacked basic circuit elements, which is similar to the rectifier stage in FIG. 16. In order to perform proper rectification, the product of p and q (i.e., p×q) is equal to the product of m and n (i.e., m×n). Similarly, if the basic stacking element is half bridge with transformer star connection, one end of every secondary side winding is connected at a single point as star connection and the other end of every secondary side winding is coupled to the middle point of every half bridge through a blocking capacitor. Otherwise, all the m×n secondary side windings are connected to the basic stacking elements through the blocking capacitors. Variable switching frequency control, PWM duty cycle modulation and phase shift modulation can be applied to regulate the output voltage and output power in this system. The m×n transformers can be integrated to less than m×n transformers for system simplicity. The rectifier stage diodes can be replaced by active switches for synchronous rectification and bidirectional operation.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed to be both the stated value, and alternatively modified by a term of degree (e.g., "about").

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. A DC-DC converter comprising:
a primary side comprising a serial stack of at least two half-bridge inverter cells, each comprising two active switches in series in one leg and an input capacitor in a parallel leg together forming a loop wherein each inverter cell is connected from a point between the active switches to a resonant tank circuit to a primary side winding wound on a transformer core, and through the other end of the winding to a common star connection of the corresponding ends of all the inverter cells, wherein one end of the loop connecting the legs of one inverter cell is directly connected to the opposite end of the corresponding loop in an inverter cell on which said one inverter cell is stacked and a primary side voltage is applied or produced between the two ends of the loops of the serial stack of inverter cells that are not directly connected to another inverter cell and wherein the transformer core is sharable with other inverter cells;

a secondary side comprising at least two sets of rectifier circuit elements each coupled to a secondary side winding wound on a transformer core shared with a corresponding primary side winding and is configured to rectify current induced at the secondary stage by current flowing in the corresponding primary side winding, and wherein a secondary side voltage is produced or applied; and control circuitry configured to activate the active switches in the converter to vary the pulse frequency or width or phase shift angle of voltage or current through said serial stack of at least two half-bridge inverter cells;

wherein the control circuitry is configured to perform at least one of (1) determining whether the voltage detected across the input capacitor of an inverter cell is greater than a reference voltage and, if so, adjusts the inverter cell duty cycles through the two active switches to balance the capacitor voltage; and (2) determining whether any of the average voltages across the input capacitors of each inverter cell minus a reference voltage is greater than a threshold voltage and, if so, determines the greatest difference among the cells and adjusts the phase shift angle to each phase leg through the two active switches to balance the capacitor voltages.

2. The DC-DC converter of claim 1, wherein the rectifier circuit elements are each a half-bridge rectifier cell comprising in a leg two diodes in series and oriented in the same direction between the two diodes being a connection to the corresponding secondary side winding to a common star connection of the corresponding ends of all the rectifier cells, wherein corresponding ends of the diode legs form common connections with a parallel capacitor legs such that the secondary side voltage is produced between the two ends of the parallel legs.

3. The DC-DC converter of claim 1, wherein the rectifier circuit elements are each an active half-bridge rectifier cell comprising in a leg two active switches in series, each controlled by the control circuitry, between which active switches is a connection to the corresponding secondary side winding to a common star connection of the corresponding ends of all the rectifier cells, wherein corresponding ends of the legs of the rectifier circuit elements form common connections with a parallel capacitor leg such that the secondary side voltage is produced or applied between the two ends of the parallel legs.

4. The DC-DC converter of claim 1, wherein the rectifier circuit elements are each a full-bridge rectifier cell comprising two parallel legs of two diodes in series oriented in the same direction wherein each rectifier cell is connected from a point between the diodes of one leg to one end of the corresponding secondary side winding wound on the transformer core and through the other end of the winding to a point between the diodes of the other leg, wherein corresponding ends of the diode legs form common connections with a parallel capacitor leg such that the secondary side voltage is produced between the two ends of the parallel legs.

5. The DC-DC converter of claim 1, wherein the rectifier circuit elements are each a full-bridge rectifier cell comprising two parallel legs of two active switches in series, each controlled by the control circuitry, between the active switches in a leg being a connection to one end of the corresponding secondary side winding wound on the transformer core and through the other end of the winding to a point between the active switches of the other leg, wherein corresponding ends of the active switch legs form common connections with a parallel capacitor leg such that the secondary side voltage is produced or applied between the two ends of the parallel legs.

6. The DC-DC converter of claim 1, wherein the rectifier circuit elements form a serial stack of half-bridge rectifier cells, each comprising two diodes in series oriented in the same direction in one leg and two capacitors in series in a parallel leg together forming a loop wherein each rectifier cell is connected from a point between the diodes to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier cell on which said one rectifier cell is stacked and a secondary side voltage is produced between the two ends of the loops of the secondary stack of rectifier cells that are not directly connected to another rectifier cell.

7. The DC-DC converter of claim 1, wherein the rectifier circuit elements form a serial stack of half-bridge rectifier cells, each comprising two active switches in series in one leg, each controlled by the control circuitry, and two capacitors in series in a parallel leg together forming a loop wherein each rectifier cell is connected from a point between the active switches to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier cell on which said one rectifier cell is stacked and a secondary side voltage is produced or applied between the two ends of the loops of the serial stack of rectifier cells that are not directly connected to another rectifier cell.

8. The DC-DC converter of claim 1, wherein the rectifier circuit elements form a serial stack of half-bridge rectifier cells, each comprising two diodes in series oriented in the same direction in one leg and a capacitor in a parallel leg together forming a loop wherein each rectifier cell is connected from a point between the diodes through a blocking capacitor to one end of the corresponding secondary side winding wound on the transformer core and through the other end of the winding to a common star connection of the corresponding ends of all the rectifier cells, wherein one end of the loop connecting the parallel legs of one rectifier cell is directly connected to the opposite end of the corresponding loop in a rectifier cell on which said one rectifier cell is stacked and a secondary side voltage is produced between the two ends of the loops of the serial stack of rectifier cells that are not directly connected to another rectifier cell.

9. The DC-DC converter of claim 1, wherein the rectifier circuit elements form a serial stack of half-bridge rectifier cells, each comprising two active switches in series in one leg, each controlled by the control circuitry, and a capacitor in a parallel leg together forming a loop wherein each rectifier cell is connected from a point between the active switches through a blocking capacitor to one end of the corresponding secondary side winding wound on the transformer core and through the other end of the winding to a common star connection of the corresponding ends of all the rectifiers, wherein one end of the loop connecting the parallel legs of one rectifier cell is directly connected to the opposite end of the corresponding loop in a rectifier cell on which said one rectifier cell is stacked and a secondary side voltage is produced or applied between the two ends of the loops of the secondary stack of rectifier cells that are not directly connected to another rectifier cell.

10. The DC-DC converter of claim 1, wherein the rectifier circuit elements form a serial stack of full-bridge rectifier cells, each comprising two legs of two diodes in series oriented in the same direction and a capacitor leg in parallel connected at each end of the respective legs wherein each rectifier cell is connected from a point between the diodes of one leg to one end of the corresponding secondary side winding wound on the transformer core and through the other end of the winding to a point between the diodes of the other leg, wherein one connection of the parallel legs of one rectifier cell is directly connected to the opposite side connection of the parallel legs of a rectifier cell on which said one rectifier cell is stacked and a secondary side voltage is produced or applied between the two connections of parallel legs of the secondary stack of rectifier cells that are not directly connected to another rectifier cell.

11. The DC-DC converter of claim 1, wherein the rectifier circuit elements form a serial stack of full-bridge rectifier cells, each comprising two legs of two active switches in series, each controlled by the control circuitry, and a capacitor leg in parallel connected at each end of the respective legs wherein each rectifier cell is connected from a point between the active switches of one leg to one end of the corresponding secondary side winding wound on the transformer core and through the other end of the winding to a point between the active switches of the other leg, wherein one connection of the parallel legs of one rectifier cell is directly connected to the opposite side connection of the parallel legs of a rectifier cell on which said one rectifier cell is stacked and a secondary side voltage is produced or applied between the two connections of parallel legs of the secondary stack of rectifier cells that are not directly connected to another rectifier cell.

12. The DC-DC converter of claim 1, wherein the rectifier circuit elements form a serial stack of serial-half-bridge rectifier cells, each comprising a first set of two diodes oriented in the same direction in a first series leg and a capacitor in a parallel leg connected at each end of the legs to form a first loop connecting at its reverse end to the forward end of a second loop of two diodes oriented in the same direction in a second series leg and a capacitor in a parallel leg, wherein each rectifier cell is connected from a point between the diodes of the first series leg through a blocking capacitor to one end of the corresponding secondary side winding wound on the transformer core and through the other end of the winding to a point between the diodes of the second series leg, wherein the reverse end of the stacked loops of one rectifier cell is directly connected to the forward end of the stacked loops of a rectifier cell on which said one rectifier cell is stacked and a secondary side voltage is produced between the two ends of the loops of the serial stack of rectifier cells that are not directly connected to another loop.

13. The DC-DC converter of claim 1, wherein the rectifier circuit elements form a serial stack of serial-half-bridge rectifier cells, each comprising a first set of two active switches, each controlled by the control circuitry, in a first series leg and a capacitor in a parallel leg connected at each end of the legs to form a first loop connecting at a reverse end to a forward end of a second loop of two active switches, each controlled by the control circuitry, in a second series leg and a capacitor in a parallel leg, wherein each rectifier cell is connected from a point between the active switches of the first series leg through a blocking capacitor to one end of the corresponding secondary side winding wound on the transformer core and through the other end of the winding to a point between the active switches of the second series leg, wherein the reverse end of the stacked loops of one rectifier cell is directly connected to the forward end of the stacked loops of a rectifier cell on which said one rectifier cell is stacked and a secondary side voltage is produced or applied between the two ends of the loops of the secondary stack of rectifier cells that are not directly connected to another loop.

14. A DC-DC converter comprising:
a primary side comprising a serial stack of at least two full-bridge inverter cells, each comprising in parallel a capacitor leg and two half bridge legs each comprising two active switches in series, connected at each end of the respective legs, wherein each inverter cell is connected from a point between the active switches of one half bridge leg through a resonant tank circuit, through the primary side winding wound on a transformer core, and to a point between the active switches of the second half-bridge leg, wherein a primary side voltage is applied or produced between each end of the serial stack, wherein one connection of the parallel legs of one inverter cell is directly connected to the opposite side connection of the parallel legs of an inverter cell on which it is stacked, and a primary side voltage is applied or produced between the two connections of parallel legs of the serial stack of inverter cells that are not directly connected to another inverter cell, wherein the transformer core is sharable with other inverter cells;
a secondary side comprising at least two sets of rectifier circuit elements each coupled to a secondary side winding wound on a transformer core shared with a corresponding primary side winding and is configured to rectify current induced at the secondary stage by current flowing in the corresponding primary side winding, and wherein a secondary side voltage is produced or applied; and
control circuitry configured to activate the active switches in the converter to vary the pulse frequency or width or phase shift angle of voltage or current through the inverter cells or the rectifier circuit elements;
wherein the control circuitry determines whether the voltage detected across the input capacitor of an inverter cell is greater than a reference voltage and, if so, adjusts one or more of the inverter cell duty cycles and phase shift angle through the switches to balance the capacitor voltages.

15. The DC-DC converter of claim 14, wherein the rectifier circuit elements are each a half-bridge rectifier cell comprising in a leg two diodes in series and oriented in the same direction between the two diodes being a connection to the corresponding secondary side winding to a common star connection of the corresponding ends of all the rectifier cells, wherein corresponding ends of the diode legs form common connections with a parallel capacitor legs such that the secondary side voltage is produced between the two ends of the parallel legs.

16. The DC-DC converter of claim 14, wherein the rectifier circuit elements are each an active half-bridge rectifier cell comprising in a leg two active switches in series, each controlled by the control circuitry, between the two active switches being a connection to the corresponding secondary side winding to a common star connection of the corresponding ends of all the rectifier cells, wherein corresponding ends of the legs of the rectifier circuit elements form common connections with a parallel capacitor leg such that the secondary side voltage is produced or applied between the two ends of the parallel legs.

17. The DC-DC converter of claim 14, wherein the rectifier circuit elements are each a full-bridge rectifier cell comprising two parallel legs of two diodes in series oriented in the same direction wherein each rectifier cell is connected from a point between the diodes of one leg to one end of the corresponding secondary side winding wound on the transformer core and through the other end of the winding to a point between the diodes of the other leg, wherein corresponding ends of the diode legs form common connections with a parallel capacitor leg such that the secondary side voltage is produced between the two ends of the parallel legs.

18. The DC-DC converter of claim 14, wherein the rectifier circuit elements are each a full-bridge rectifier cell comprising two parallel legs of two active switches in series, each controlled by the control circuitry, between the two active switches in a leg being a connection to one end of the corresponding secondary side winding wound on the transformer core and through the other end of the winding to a point between the active switches of the other leg, wherein corresponding ends of the legs of the rectifier circuit elements form common connections with a parallel capacitor leg such that the secondary side voltage is produced or applied between the two ends of the parallel legs.

19. The DC-DC converter of claim 14, wherein the rectifier circuit elements form a serial stack of half-bridge rectifier cells, each comprising two diodes in series oriented in the same direction in one leg and two capacitors in series in a parallel leg together forming a loop wherein each rectifier cell is connected from a point between the diodes to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier cell on which said one rectifier cell is stacked and a secondary side voltage is produced between the two ends of the loops of the serial stack of rectifier cells that are not directly connected to another rectifier cell.

20. The DC-DC converter of claim 14, wherein the rectifier circuit elements form a serial stack of half-bridge rectifier cells, each comprising two active switches in series in one leg, each controlled by the control circuitry, and two capacitors in series in a parallel leg together forming a loop wherein each rectifier cell is connected from a point between the active switches to one end of the corresponding secondary side winding wound on the transformer core and through the other end of the winding to a point between the two capacitors, wherein one end of the loop connecting the parallel legs of one rectifier cell is directly connected to the opposite end of the corresponding loop in a rectifier cell on which said one rectifier cell is stacked and a secondary side voltage is produced or applied between the two ends of the loops of the secondary stack of rectifier cells that are not directly connected to another rectifier cell.

21. The DC-DC converter of claim 14, wherein the rectifier circuit elements form a serial stack of half-bridge rectifier cells, each comprising two diodes in series oriented in the same direction in one leg and a capacitor in a parallel leg together forming a loop wherein each rectifier cell is connected from a point between the diodes through a blocking capacitor to one end of the corresponding secondary side winding wound on the transformer core and through the other end of the winding to a common star connection of the corresponding ends of all the rectifier cells, wherein one end of the loop connecting the parallel legs of one rectifier cell is directly connected to the opposite end of the corresponding loop in a rectifier cell on which said one rectifier cell is stacked and a secondary side voltage is produced between the two ends of the loops of the secondary stack of rectifier cells that are not directly connected to another rectifier cell.

22. The DC-DC converter of claim 14, wherein the rectifier circuit elements form a serial stack of half-bridge rectifier cells, each comprising two active switches in series in one leg, each controlled by the control circuitry, and a capacitor in a parallel leg together forming a loop wherein each rectifier cell is connected from a point between the active switches through a blocking capacitor to one end of the corresponding secondary side winding wound on the transformer core and through the other end of the winding to a common star connection of the corresponding ends of all the rectifier cells, wherein one end of the loop connecting the parallel legs of one rectifier cell is directly connected to the opposite end of the corresponding loop in a rectifier cell on which said one rectifier cell is stacked and a secondary side voltage is produced or applied between the two ends of the loops of the secondary stack of rectifier cells that are not directly connected to another rectifier cell.

23. The DC-DC converter of claim 14, wherein the rectifier circuit elements form a serial stack of full-bridge rectifier cells, each comprising two legs of two diodes in series oriented in the same direction and a capacitor leg in parallel connected at each end of the respective legs wherein each rectifier cell is connected from a point between the diodes of one leg to one end of the corresponding secondary side winding wound on the transformer core and through the other end of the winding to a point between the diodes of the other leg, wherein one connection of the parallel legs of one rectifier cell is directly connected to the opposite side connection of the parallel legs of a rectifier cell on which said one rectifier cell is stacked and a secondary side voltage is produced or applied between the two connections of parallel legs of the secondary stack of rectifier cells that are not directly connected to another rectifier cell.

24. The DC-DC converter of claim 14, wherein the rectifier circuit elements form a serial stack of full-bridge rectifier cells, each comprising two legs of two active switches in series, each controlled by the control circuitry, and a capacitor leg in parallel connected at each end of the respective legs wherein each rectifier cell is connected from a point between the active switches of one leg to one end of the corresponding secondary side winding wound on the transformer core and through the other end of the winding to a point between the active switches of the other leg, wherein one connection of the parallel legs of one rectifier cell is directly connected to the opposite side connection of the parallel legs of a rectifier cell on which said one rectifier cell is stacked and a secondary side voltage is produced or applied between the two connections of parallel legs of the secondary stack of rectifier cells that are not directly connected to another rectifier cell.

25. The DC-DC converter of claim 14, wherein the rectifier circuit elements form a serial stack of serial-half-bridge rectifier cells, each comprising a first set of two diodes oriented in the same direction in a first series leg and a capacitor in a parallel leg connected at each end of the legs to form a first loop connecting at its reverse end to the forward end of a second loop of two diodes oriented in the same direction in a second series leg and a capacitor in a parallel leg, wherein each rectifier cell is connected from a point between the diodes of the first series leg through a blocking capacitor to one end of the corresponding secondary side winding wound on the transformer core and through the other end of the winding to a point between the diodes of the second series leg, wherein the reverse end of the stacked loops of one rectifier cell is directly connected to the forward end of the stacked loops of a rectifier cell on which said one rectifier cell is stacked and a secondary side voltage is produced between the two ends of the loops of the serial stack of rectifier cells that are not directly connected to another loop.

26. The DC-DC converter of claim 14, wherein the rectifier circuit elements form a serial stack of serial-half-bridge rectifier cells, each comprising a first set of two active switches, each controlled by the control circuitry, in a first series leg and a capacitor in a parallel leg connected at each end of the legs to form a first loop connecting at a reverse end to a forward end of a second loop of two active switches, each controlled by the control circuitry, in a second series leg and a capacitor in a parallel leg, wherein each rectifier cell is connected from a point between the active switches of the first series leg through a blocking capacitor to one end of the corresponding secondary side winding wound on the transformer core and through the other end of the winding to a point between the active switches of the second series leg, wherein the reverse end of the stacked loops of one rectifier cell is directly connected to the forward end of the stacked loops of a rectifier cell on which said one rectifier cell is stacked, and a secondary side voltage is produced or applied between the two ends of the loops of the secondary stack of rectifier cells that are not directly connected to another loop.

27. A DC-DC converter comprising:
a primary side comprising a serial stack of at least two half-bridge inverter cells, each comprising two active switches in series in one leg and an input capacitor in a parallel leg together forming a loop wherein each inverter cell is connected from a point between the active switches to a resonant tank circuit to a primary side winding wound on a transformer core, and through the other end of the winding to a common star connection of the corresponding ends of all the inverter cells, wherein one end of the loop connecting the legs of one inverter cell is directly connected to the opposite end of the corresponding loop in an inverter cell on which said one inverter cell is stacked and a primary side voltage is applied or produced between the two ends of the loops of the serial stack of inverter cells that are not directly connected to another inverter cell and wherein the transformer core is sharable with other inverter cells;
a secondary side comprising at least two sets of rectifier circuit elements each coupled to a secondary side winding wound on a transformer core shared with a corresponding primary side winding and is configured to rectify current induced at the secondary stage by current flowing in the corresponding primary side winding, and wherein a secondary side voltage is produced or applied; and
control circuitry configured to activate the active switches in the converter to vary the pulse frequency or width or phase shift angle of voltage or current through said serial stack of at least two half-bridge inverter cells;
wherein the control circuitry determines whether the voltage detected across the input capacitor of an inverter cell is greater than a reference voltage and, if so, adjusts one or more of the inverter cell duty cycles and phase shift angle through the switches to balance the capacitor voltages.

28. A DC-DC converter comprising:
a primary side comprising a serial stack of at least two full-bridge inverter cells, each comprising in parallel a capacitor leg and two half bridge legs each comprising two active switches in series, connected at each end of the respective legs, wherein each inverter cell is connected from a point between the active switches of one half bridge leg through a resonant tank circuit, through the primary side winding wound on a transformer core, and to a point between the active switches of the second half-bridge leg, wherein a primary side voltage is applied or produced between each end of the serial stack, wherein one connection of the parallel legs of one inverter cell is directly connected to the opposite side connection of the parallel legs of an inverter cell on which it is stacked, and a primary side voltage is applied or produced between the two connections of parallel legs of the serial stack of inverter cells that are not directly connected to another inverter cell, wherein the transformer core is sharable with other inverter cells;
a secondary side comprising at least two sets of rectifier circuit elements each coupled to a secondary side winding wound on a transformer core shared with a corresponding primary side winding and is configured to rectify current induced at the secondary stage by current flowing in the corresponding primary side winding, and wherein a secondary side voltage is produced or applied; and
control circuitry configured to activate the active switches in the converter to vary the pulse frequency or width or phase shift angle of voltage or current through the inverter cells or the rectifier circuit elements;
wherein the control circuitry is configured to perform at least one of
(1) determining whether the voltage detected across the input capacitor of an inverter cell is greater than a reference voltage and, if so, adjusts the inverter cell duty cycles through the two active switches to balance the capacitor voltage; and
(2) determining whether any of the average voltages across the input capacitors of each inverter cell minus a reference voltage is greater than a threshold voltage and, if so, determines the greatest difference among the cells and adjusts the phase shift angle to each phase leg through the two active switches to balance the capacitor voltages.

* * * * *